(12) United States Patent
Carpenter et al.

(10) Patent No.: US 10,054,094 B2
(45) Date of Patent: Aug. 21, 2018

(54) MICROSTRUCTURED PATTERN FOR FORMING A NOZZLE PRE-FORM

(75) Inventors: Barry S. Carpenter, Oakdale, MN (US); Ryan C. Shirk, Mendota Heights, MN (US); Robert J. DeVoe, Mahtomedi, MN (US); James C. Novack, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 558 days.

(21) Appl. No.: 13/982,866

(22) PCT Filed: Feb. 2, 2012

(86) PCT No.: PCT/US2012/023624
§ 371 (c)(1),
(2), (4) Date: Jul. 31, 2013

(87) PCT Pub. No.: WO2012/106512
PCT Pub. Date: Aug. 9, 2012

(65) Prior Publication Data
US 2013/0313339 A1    Nov. 28, 2013

Related U.S. Application Data

(60) Provisional application No. 61/438,848, filed on Feb. 2, 2011.

(51) Int. Cl.
*B29C 33/42* (2006.01)
*F02M 61/16* (2006.01)
(Continued)

(52) U.S. Cl.
CPC ......... *F02M 61/168* (2013.01); *B29C 33/424* (2013.01); *C25D 1/10* (2013.01);
(Continued)

(58) Field of Classification Search
CPC ............. F02M 61/168; F02M 61/1846; F02M 61/184; F02M 43/04; F02M 61/1833;
(Continued)

(56) References Cited

U.S. PATENT DOCUMENTS

| 3,018,262 A | 1/1962 | Schroeder |
| 3,729,313 A | 4/1973 | Smith |

(Continued)

FOREIGN PATENT DOCUMENTS

| EP | 0667450 | 8/1995 |
| JP | S59-123628 A | 7/1984 |

(Continued)

OTHER PUBLICATIONS

Allen, "193nm single layer positive resists building etch resistance into a high resolution imaging system", Proc. SPIE, 1995, vol. 2438, pp. 474-485.

(Continued)

*Primary Examiner* — Sarang Afzali
*Assistant Examiner* — Ruth G Hidalgo-Hernande
(74) *Attorney, Agent, or Firm* — Harold C. Knecht, III

(57) ABSTRACT

Nozzle and a method of making the same are disclosed. The method includes (a) providing a microstructured mold pattern defining at least a portion of a mold and comprising a plurality of replica nozzle holes and replica planar control cavities; (b) molding a first material into a nozzle forming microstructured pattern using the microstructured mold pattern, with the nozzle forming microstructured pattern comprising a plurality of nozzle hole forming features and planar control cavity forming features; (c) forming a second material into a nozzle pre-form using the nozzle forming microstructured pattern, with the nozzle pre-form comprising a plurality of nozzle pre-form holes and sacrificial planar control cavities; and (d) forming a nozzle from the nozzle (Continued)

pre-form, said forming the nozzle comprising removing enough of the second material to remove the sacrificial planar control cavities so as to form a top surface of the nozzle pre-form into a planar top surface of the nozzle, and to form each of the nozzle pre-form holes into a nozzle through hole.

13 Claims, 32 Drawing Sheets

(51) Int. Cl.
    *F02M 61/18* (2006.01)
    *F02M 43/04* (2006.01)
    *C25D 1/10* (2006.01)

(52) U.S. Cl.
    CPC .......... *F02M 43/04* (2013.01); *F02M 61/184* (2013.01); *F02M 61/1833* (2013.01); *F02M 61/1846* (2013.01); *F02M 61/1853* (2013.01); *F02M 2200/8046* (2013.01); *F02M 2200/8069* (2013.01); *F02M 2200/9092* (2013.01); *Y10T 29/4998* (2015.01); *Y10T 29/49405* (2015.01); *Y10T 428/24273* (2015.01)

(58) Field of Classification Search
    CPC ....... F02M 61/1853; F02M 2200/9092; F02M 2200/8046; F02M 2200/8069; B29C 33/424; C25D 1/10; Y10T 29/4998; Y10T 428/24273
    See application file for complete search history.

(56) References Cited

U.S. PATENT DOCUMENTS

| | | |
|---|---|---|
| 3,741,769 A | 6/1973 | Smith |
| 3,779,778 A | 12/1973 | Smith |
| 3,808,006 A | 4/1974 | Smith |
| 4,250,053 A | 2/1981 | Smith |
| 4,279,717 A | 7/1981 | Eckberg |
| 4,394,403 A | 7/1983 | Smith |
| 4,491,628 A | 1/1985 | Ito |
| 4,642,126 A | 2/1987 | Zador |
| 4,652,274 A | 3/1987 | Boettcher |
| 4,859,572 A | 8/1989 | Farid |
| 5,127,156 A | 7/1992 | Yokoyama |
| 5,235,015 A | 8/1993 | Ali |
| 5,545,676 A | 8/1996 | Palazzotto |
| 5,716,009 A | 2/1998 | Ogihara |
| 5,753,346 A | 5/1998 | Leir |
| 5,766,441 A | 6/1998 | Arndt et al. |
| 5,770,737 A | 6/1998 | Reinhardt |
| 5,856,373 A | 1/1999 | Kaisaki |
| 5,859,251 A | 1/1999 | Reinhardt |
| 5,899,390 A | 5/1999 | Arndt |
| 5,921,474 A | 7/1999 | Zimmermann et al. |
| 5,924,634 A | 7/1999 | Arndt |
| 5,933,700 A | 8/1999 | Tilton |
| 5,998,495 A | 12/1999 | Oxman |
| 6,025,406 A | 2/2000 | Oxman |
| 6,100,405 A | 8/2000 | Reinhardt |
| 6,387,981 B1 | 5/2002 | Zhang |
| 6,572,693 B1 | 6/2003 | Wu |
| 6,824,378 B2 * | 11/2004 | King .................. B29C 33/10 425/363 |
| 6,848,636 B2 | 2/2005 | Munezane et al. |
| 6,899,948 B2 | 5/2005 | Zhang |
| 7,237,730 B2 * | 7/2007 | Prociw et al. ................ 239/406 |
| 7,297,374 B1 | 11/2007 | Arney |
| 7,393,882 B2 | 7/2008 | Wu |
| 7,582,685 B2 | 9/2009 | Arney |
| 7,583,444 B1 | 9/2009 | DeVoe |
| 8,215,572 B2 | 7/2012 | Vogel |
| 2009/0099537 A1 | 4/2009 | DeVoe |
| 2009/0175050 A1 | 7/2009 | Marttila |
| 2009/0206181 A1 | 8/2009 | Arndt et al. |
| 2009/0308953 A1 | 12/2009 | Palestrant |

FOREIGN PATENT DOCUMENTS

| | | |
|---|---|---|
| JP | H0395073 U | 9/1991 |
| JP | 07-286571 A | 10/1995 |
| JP | 2001-030306 A | 2/2001 |
| JP | 2002-115627 A | 4/2002 |
| JP | 2004-316598 | 11/2004 |
| JP | 2006-002720 A | 1/2006 |
| JP | 2009-098237 A | 5/2009 |
| WO | WO 1998-21521 | 5/1998 |
| WO | WO 1999-53242 | 10/1999 |
| WO | WO 2009-048705 | 4/2009 |

OTHER PUBLICATIONS

Allen, "High Performance Acrylic Polymers for Chemically Amplified Photoresist Applications," J. Vac. Sci. Technol. B, 1991,vol. 9, No. 6, pp. 3357-3361.

Beringer, "Diaryliodonium Salts IX. The Synthesis of Substituted Diaryliodonium Salts", J. Am. Chem. Soc., 1959, vol. 81, pp. 342-351.

Eaton, "Dye Sensitized Photopolymerization", Advances in Photochemistry, 1986, vol. 13, pp. 427-487.

Trausch, "New photolithographic Strukturerzeugong for production of precision flat parts in the electroplating procedure," Siemens Forsch.-u. Entwickl.-Ber., Bd.8, Nr.6, 1979.

Sellnau, "Gasoline Direct Injection Compression Ignition (GDCI)-Diesel-like Efficiency with Low CO2 Emissions", SAE International, Delphi Corporation, 2011, 13pages.

Xu, "Measurement of two-photon excitation cross sections of molecular fluorophores with data from 690 to 1050 nm", J. Opt. Soc. Am.B, Mar. 1996, vol. 13, No. 3, pp. 481-491.

Zhou, "A Efficient Two-Photon-Generated Photoacid Applied to Positive-Tone 3D Microfabrication", Science, May 10, 2002, vol. 296, No. 5570, pp. 1106-1109.

Large, R.F., "The Use of Electrochemical Potential Data in Studies of Spectral Sensitization," Photographic Sensitivity, Proceedings of the Symposium on Photographic Sensitivity Held at Gonville and Caius College and Little Hall, Cambridge, Sep. 1972, pp. 241-263.

International Search Report for PCT International Application No. PCT/US2012/023624, dated Sep. 19, 2012, 5 pages.

* cited by examiner

MICROSTRUCTURED PATTERN FOR FORMING A NOZZLE PRE-FORM

CROSS REFERENCE TO RELATED APPLICATIONS

This application is a national stage filing under 35 U.S.C. 371 of PCT/US2012/023624, filed Feb. 2, 2012, which claims priority to U.S. Provisional Application No. 61/438,848, filed Feb. 2, 2011, the disclosures of which are incorporated by reference in their entireties herein.

FIELD OF THE INVENTION

This invention generally relates to nozzles, including nozzles suitable for use in a fuel injector for an internal combustion engine. The invention is further applicable to fuel injectors incorporating such nozzles. This invention also relates to methods of making such nozzles. The invention is also applicable to methods of making fuel injectors incorporating such nozzles.

BACKGROUND

Fuel injection is increasingly becoming the preferred method for mixing fuel and air in internal combustion engines. Fuel injection generally can be used to increase fuel efficiency of the engine and reduces hazardous emissions. Fuel injectors generally include a nozzle with a plurality of nozzle through-holes for atomizing the fuel under pressure for combustion. Increasing stringent environmental standards require more efficient fuel injectors.

SUMMARY OF THE INVENTION

In one aspect of the present invention, a method is provided for making a nozzle. The method comprises: (a) providing a microstructured mold pattern defining at least a portion of a mold and comprising a plurality of replica nozzle holes and replica planar control cavities; (b) molding a first material into a nozzle forming microstructured pattern using the microstructured mold pattern, with the nozzle forming microstructured pattern comprising a plurality of nozzle hole forming features and planar control cavity forming features; (c) forming a second material into a nozzle pre-form using the nozzle forming microstructured pattern, with the nozzle pre-form comprising a plurality of nozzle pre-form holes and sacrificial planar control cavities; and (d) forming a nozzle from the nozzle pre-form, the forming the nozzle comprising removing enough of the second material to remove the sacrificial planar control cavities so as to form a top surface of the nozzle pre-form into a planar top surface of the nozzle, and to form each of the nozzle pre-form holes into a nozzle through hole.

In one embodiment of this method, the microstructured mold pattern can be provided by (a) forming a third material into a mold forming microstructured pattern comprising a plurality of replica nozzle hole forming features and replica planar control cavity forming features; and (b) forming a fourth material into the microstructured mold pattern using the mold forming microstructured pattern, with the replica nozzle hole forming features being substantially negative replicas of the replica nozzle holes, and the replica planar control cavity forming features being substantially negative replicas of the replica planar control cavities.

In another aspect of the present invention, another method is provided for making a nozzle. The method comprises: (a) providing a microstructured mold pattern defining at least a portion of a mold and comprising a plurality of replica nozzle holes; (b) molding a first material into a nozzle forming microstructured pattern using the microstructured mold pattern, with the nozzle forming microstructured pattern comprising a plurality of nozzle hole forming features; (c) forming a second material into a nozzle pre-form using the nozzle forming microstructured pattern, with the nozzle pre-form comprising a plurality of nozzle pre-form holes, the second material comprising a plurality of different second materials, and the nozzle pre-form is formed by sequentially depositing each of the second materials as a layer onto the nozzle forming microstructured pattern so that the resulting nozzle pre-form comprises a build-up of multiple layers, with each layer being a different second material; and (d) forming a nozzle from the nozzle pre-form, the forming the nozzle comprising removing enough of the second material to open an outlet opening in each of the nozzle pre-form holes and form each of the nozzle pre-form holes into a nozzle through hole.

In one embodiment of this method, the microstructured mold pattern can be provided by: (a) forming a third material into a mold forming microstructured pattern comprising a plurality of replica nozzle hole forming features; and (b) forming a fourth material into the microstructured mold pattern using the mold forming microstructured pattern, with the replica nozzle hole forming features being substantially negative replicas of the replica nozzle holes.

In an addition aspect of the present invention, a microstructured pattern is provided for forming a nozzle pre-form comprising a plurality of nozzle pre-form holes, sacrificial planar control cavities and an outer planar periphery. The microstructured pattern comprises a plurality of nozzle hole forming features that are substantially negative replicas of the nozzle pre-form holes, and a plurality of planar control cavity forming features that are substantially negative replicas of the sacrificial planar control cavities.

In a further aspect of the present invention, a nozzle pre-form is provided for forming a nozzle comprising a plurality of nozzle through-holes, each nozzle through-hole comprising an inlet opening and at least one outlet opening connected to the inlet opening by a hollow cavity defined by an interior surface. The nozzle pre-form comprises a plurality of nozzle pre-form holes corresponding to the nozzle through-holes; and a plurality of sacrificial planar control cavities, wherein each of the nozzle pre-form holes is connected to at least one of the sacrificial planar control cavities.

In another aspect of the present invention, a nozzle is provided that comprises a microstructured pattern comprising a plurality of nozzle through-holes, each nozzle through-hole comprising an inlet opening and at least one outlet opening connected to the inlet opening by a hollow cavity defined by an interior surface, wherein the microstructured pattern has an outer periphery, and the nozzle comprises a build-up of multiple layers, with each layer being a different material, and with either (a) none of the multiple layers being in the form of a thin electrically conductive seed layer, (b) the multiple layers being at least three layers, or (c) both (a) and (b).

In an additional aspect of the present invention, a nozzle is provided that comprises a microstructured pattern comprising a plurality of nozzle through-holes, with each nozzle through-hole comprising an inlet opening and at least one outlet opening connected to the inlet opening by a hollow cavity defined by an interior surface, and the microstructured pattern having an outer periphery; and at least one fluid channel feature connecting at least one nozzle through-hole to (a) at least one other nozzle through-hole, (b) a portion of the outer periphery of the microstructured pattern, or (c) both (a) and (b).

In a further aspect of the present invention, a nozzle is provided that comprises a microstructured pattern comprising a plurality of nozzle through-holes, with each nozzle through-hole comprising an inlet opening and at least one outlet opening connected to the inlet opening by a hollow cavity defined by an interior surface, and the microstructured pattern having an outer periphery; and at least one fluid plume shape-control feature for controlling the shape of a plume formed by a fluid flowing through and exiting the outlet openings of the nozzle through-holes.

In another aspect of the present invention, a nozzle is provided that comprises a microstructured pattern comprising a plurality of nozzle through-holes, with each nozzle through-hole comprising an inlet opening and at least one outlet opening connected to the inlet opening by a hollow cavity defined by an interior surface, and the microstructured pattern having an outer periphery; and at least one nozzle through-hole having an interior surface that comprises at least one fluid flow affecting feature for causing cavitations, turbulence, or otherwise obstructing the flow of a fluid through the nozzle so as to positively affect a plume of droplets formed by the fluid passing through the nozzle through-hole and exiting the corresponding outlet opening of the nozzle through-hole.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

Figure 1A:
FIGS. 1A-1M are schematic representations of constructions at intermediate stages or steps in a process for fabricating a nozzle.

The disclosed nozzles include one or more through-holes designed to improve spray direction and fluid dynamics at the hole inlet, within the hole wall, and at the hole outlet. The disclosed nozzles can advantageously be incorporated into fuel injector systems to improve fuel efficiency. The disclosed nozzles can be fabricated using multiphoton, such as two photon, processes. In particular, multiphoton processes can be used to fabricate various microstructures. These microstructure can at least include one or more hole forming features, which can, in turn, be used as molds to fabricate holes for use in nozzles or other applications.

It should be understood that the term "nozzle" may have a number of different meanings in the art. In some specific references, the term nozzle has a broad definition. For example, U.S. Patent Publication No. 2009/0308953 A1 (Palestrant et al.), discloses an "atomizing nozzle" which includes a number of elements, including an occluder chamber 50. This differs from the understanding and definition of nozzle put forth herewith. For example, the nozzle of the current description would correspond generally to the orifice insert 24 of Palestrant et al. In general, the nozzle of the current description can be understood as the final tapered portion of an atomizing spray system from which the spray is ultimately emitted, see e.g., Merriam Webster's dictionary definition of nozzle ("a short tube with a taper or constriction used (as on a hose) to speed up or direct a flow of fluid." Further understanding may be gained by reference to U.S. Pat. No. 5,716,009 (Ogihara et al.) issued to Nippondenso Co., Ltd. (Kariya, Japan). In this reference, again, fluid injection "nozzle" is defined broadly as the multi-piece valve element 10 ("fuel injection valve 10 acting as fluid injection nozzle . . . "—see col. 4, lines 26-27 of Ogihara et al.). The current definition and understanding of the term "nozzle" as used herein would relate to first and second orifice plates 130 and 132 and potentially sleeve 138 (see FIGS. 14 and 15 of Ogihara et al.), for example, which are located immediately proximate the fuel spray. A similar understanding of the term "nozzle" to that described herein is used in U.S. Pat. No. 5,127,156 (Yokoyama et al.) to Hitachi, Ltd. (Ibaraki, Japan). There, the nozzle 10 is defined separately from elements of the attached and integrated structure, such as "swirler" 12 (see FIG. 1(II)). The above-defined understanding should be understood when the term "nozzle" is referred to throughout the remainder of the description and claims.

Figure 2:
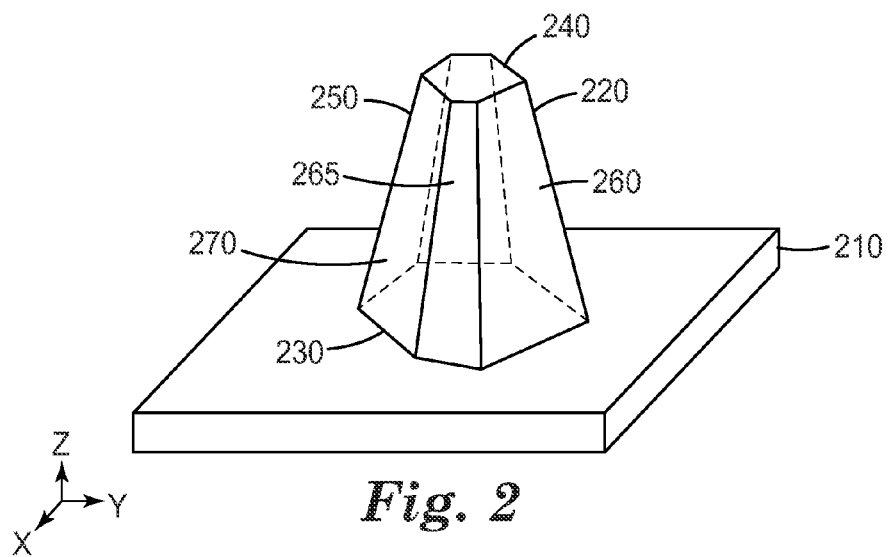
FIG. 2 is a schematic three-dimensional view of a microstructure.

In some cases, a disclosed microstructure can be a three-dimensional rectilinear body such as a polyhedron, such as a tetrahedron or a hexahedron, a prism, or a pyramid, or a portion, or a combination, of such bodies, such as a frustum. For example, FIG. 2 is a schematic three-dimensional view of a microstructure 220 that is disposed on a substrate 210 and includes a planar or flat base 230, a planar or flat top 240 and a side 250 that connects the top to the base. Side 250 includes a plurality of planar or flat facets, such as facets 260, 265 and 270. Microstructure 220 can be used as a mold to fabricate holes for use in, for example, a nozzle.

Figure 3:
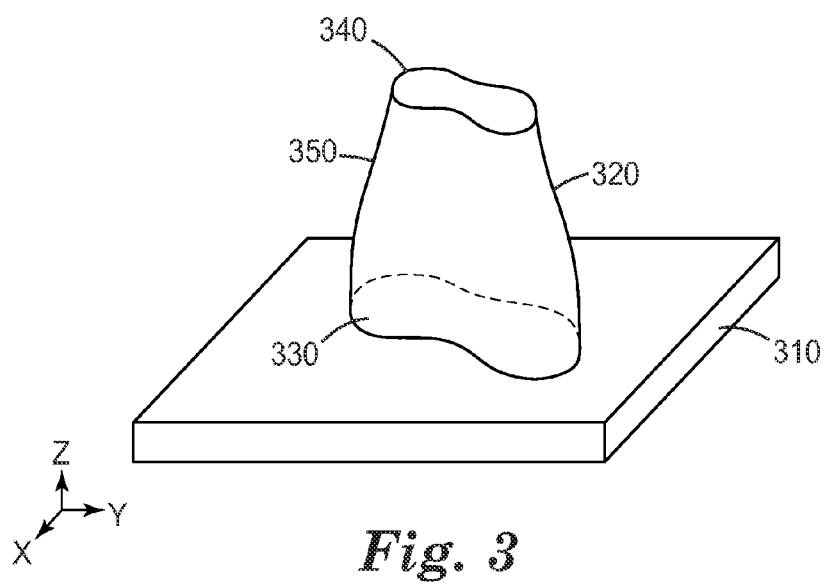
FIG. 3 is a schematic three-dimensional view of another microstructure.

In some cases, a disclosed microstructure can be a three-dimensional curvilinear body or a portion of such body, such as a segment of a sphere, an asphere, an ellipsoid, a spheroid, a paraboloid, a cone or a truncated cone, or a cylinder. For example, FIG. 3 is a schematic three-dimensional view of a microstructure 320 that is disposed on a substrate 310 and includes a planar or flat base 330, a planar or flat top 340 and a curvilinear side 350 that connects the top to the base. In the exemplary microstructure 320, top 340 and base 330 have the same shape but different size. Microstructure 320 tapers narrower from base 330 to top 340. As a result, top 340 has a smaller area than base 330. Microstructure 320 can be used as a mold to fabricate holes for use in, for example, a nozzle.

Figure 4:
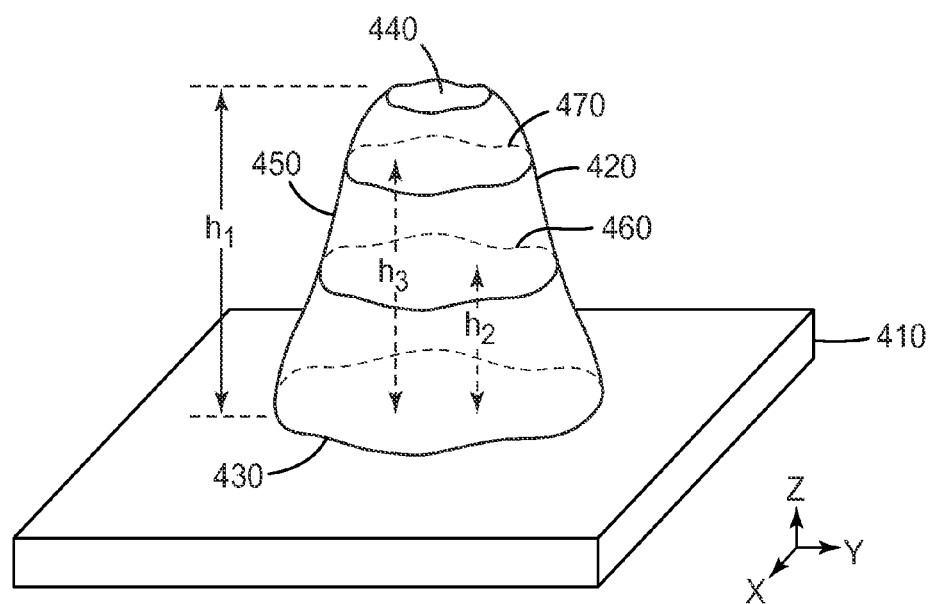
FIG. 4 is a schematic three-dimensional view of another microstructure.

In some cases, some of the characteristics of a disclosed microstructure changes from the base to the top. For example, in some cases, a disclosed microstructure can be a tapered microstructure. For example, FIG. 4 is a schematic three-dimensional view of a microstructure 420 that can be fabricated using a multiphoton process. Microstructure 420 can be used as a mold to fabricate holes for use in, for example, a nozzle. Microstructure 420 is disposed on a substrate 410 and includes a base 430, a top 440, and a side 450 connecting the top to the base. Microstructure 420 has a height or thickness $h_1$ which is the distance between base 430 and top 440 along the z-axis. Microstructure 420 is tapered. In particular, the cross-sectional area of the microstructure along the thickness of the microstructure decreases from base 430 to top 440. For example, microstructure 420 includes a cross-section 460 at height $h_2$ in the xy-plane and a cross-section 470 at height $h_3>h_2$ in the xy-plane. The area of cross-section 470 is less than the area of cross-section 460, and the area of cross-section 460 is less than the area of base 430.

Figure 5:
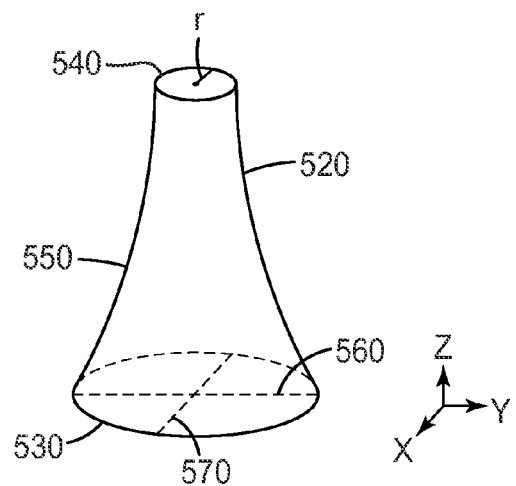
FIG. 5 is a schematic three-dimensional view of another microstructure.

Base 430 has a first shape and top 440 has a second shape that is different than the first shape. In some cases, the first shape is an elliptical shape and the second shape is a circular shape. For example, FIG. 5 is a schematic three-dimensional view of a microstructure 520 that includes an elliptical base 530, a circular top 540, and a side 550 that connects the top to the base. Elliptical base 530 has a major axis 560 along the y-direction having a length "a" and a minor axis 570 along the x-direction having a length "b" different than "a". Circular top 540 has a radius "r". Microstructure 520 is tapered. In particular, the area of circular top 540 is less than the area of elliptical base 530.

Figure 6:
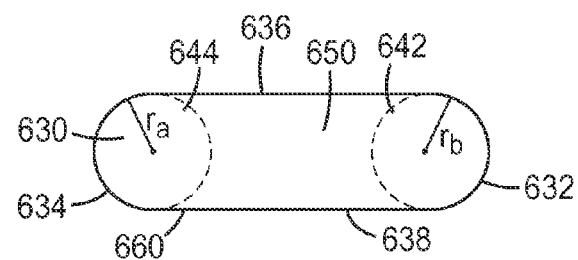
FIG. 6 is a schematic of a base of a microstructure.

As another example, the first shape can be a racetrack or oval and the second shape can, for example, be a circle. For example, FIG. 6 is a schematic of a base 630 that can be the base of a disclosed microstructure. Base 630 includes two circles 642 and 644 and a middle portion 650. Base 630 has a perimeter 660 that includes curved portions or arcs 632 and 634 and linear portions 636 and 638. The circles 642 and 644 have a radius $r_a$ and $r_b$, respectively, where $r_a$ and $r_b$ can be the same or different. Curved portions 632 and 634 are portions of respective circles 642 and 644.

Figure 7:
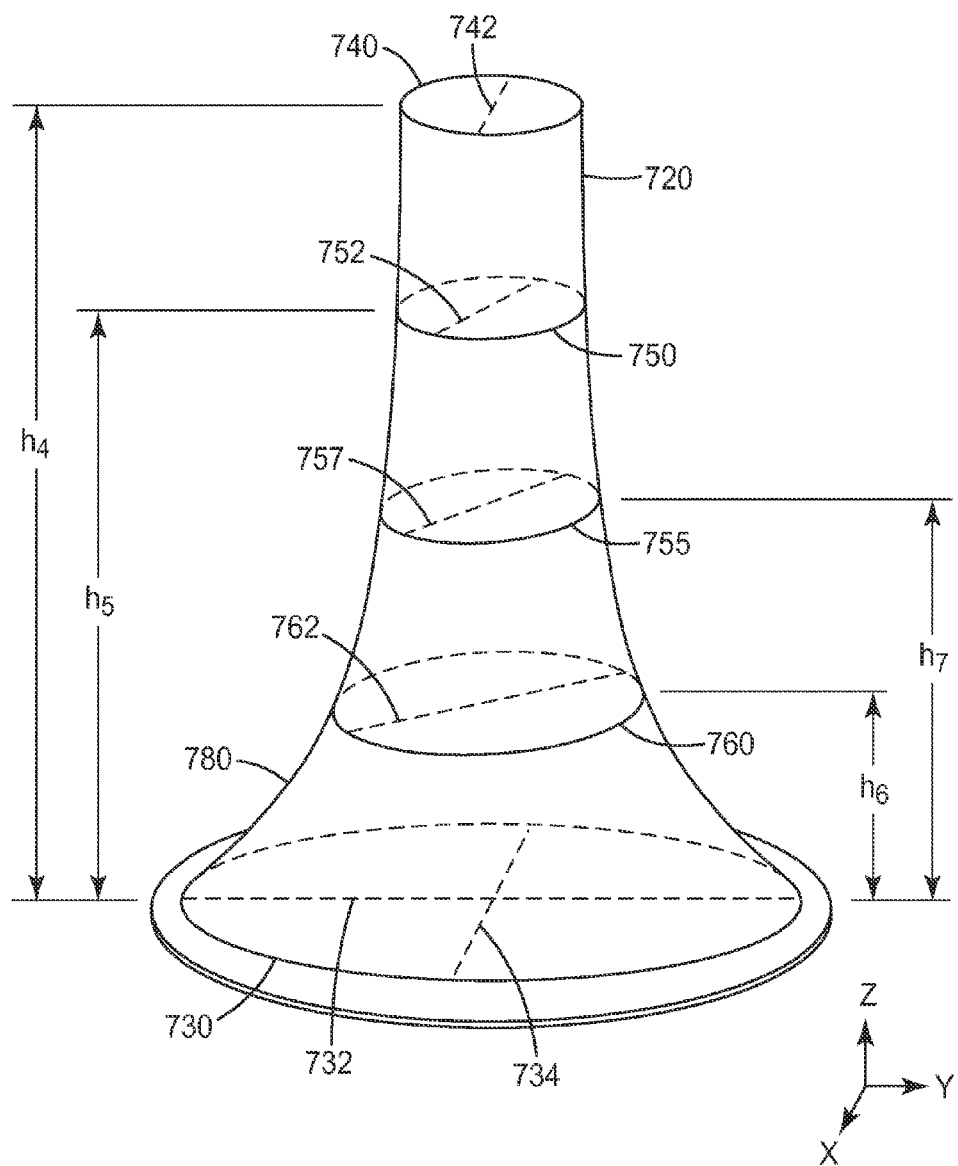
FIGS. 7 and 8 are respective schematic three-dimensional and top views of a microstructure.
Figure 8:
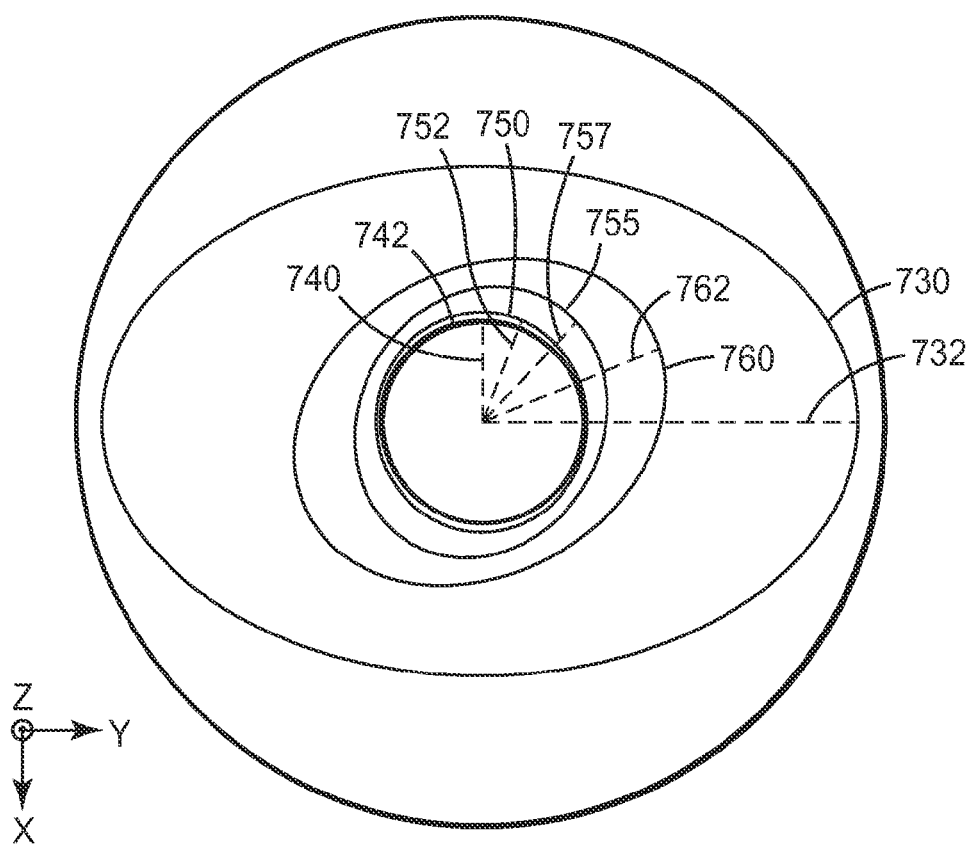

In some cases, a disclosed microstructure has a cross-section along the thickness or height direction of the microstructure that rotates from the base of the microstructure to the top of the microstructure. For example, FIG. 7 is a schematic three-dimensional view of a microstructure 720 that includes a base 730 disposed in the xy-plane, a top 740 disposed in the xy-plane, and a side 780 that connects the top to the base. Microstructure 720 has a height $h_4$. Microstructure 720 has an xy cross-section that rotates clockwise from top 740 to base 730. In particular, top 740 has an axis of symmetry 742 along the x-direction, an xy cross-section 750 of the microstructure at a height $h_5<h_4$ has an axis of symmetry 752 that is rotated clockwise relative to axis of symmetry 742, an xy cross-section 755 of the microstructure at a height $h_6<h_5$ has an axis of symmetry 757 that is rotated clockwise relative to axis of symmetry 752, an xy cross-section 760 of the microstructure at height a $h_7<h_6$ has an axis of symmetry 762 that is rotated clockwise relative to axis of symmetry 757, and base 730 has an axis of symmetry 732 along the y-axis that is rotated clockwise relative to axis of symmetry 762. Equivalently, microstructure 720 has an xy cross-section that rotates counter clockwise from base 730 to top 740. FIG. 8 is a schematic top-view of microstructure 720 illustrating top 740 and its axis of symmetry 742, cross-section 750 and its axis of symmetry 752, cross-section 755 and its axis of symmetry 757, cross-section 760 and its axis of symmetry 762, and base 730 and its axis of symmetry 732. Viewed from the top, the axes of symmetry of the cross-sections rotate clockwise from the top to the base. Such a rotation results in a twist in the microstructure along its height or thickness. In some cases, each cross-section can be an ellipse with a corresponding major axis acting as an axis of symmetry. In such cases, the major axis rotates from the base to the top. In some cases, such as when the microstructure is tapered and twisted, the cross-sections rotate and become smaller from the base to the top. For example, an elliptical base 730 has a major axis 732 along the y-direction having a length "a" and a minor axis 734 along the x-direction having a length "b" different than "a". As the major axis rotates from the base to the top, the ratio a/b is reduced by, for example, decreasing "a" resulting in a smaller ellipse that eventually can become a circle at the top (a=b). In general, a disclosed microstructure can include a taper and/or a twist or spiral along the thickness of the microstructure from the base to the top.

Microstructure 720 can be used as a mold to fabricate one or more holes in a nozzle with the holes having substantially the same profile as microstructure 720. For example, the fabrication results in a hole 720 having a hole entry 730, a hole exit 740 and a wall 752 extending from the hole entry to the hole exit. The hole tapers and spirals or twists from the hole entry to the hole exit. A disclosed spiraling or twisting nozzle hole can advantageously be used in a fuel injector to change the flow velocity of the fuel, reduce droplet size, and improve the mixing of fuel with air.

The microstructure may be understood as having a "diameter" at different heights of the microstructure (e.g. $h_6$, $h_5$, etc.). The diameter may be understood as the maximum distance between the edges of the microstructure at a common height. In the situation, where there is an elliptical base, such as at hole entry 730, the diameter will be the distance between the edges of the microstructure along the major axis 732. At the opposite end of the structure, corresponding to hole exit 740, the diameter will similarly be the maximum distance between the edges of the microstructure at the common height (here, $h_4$). Thus, the distance between the edges of the microstructure along axis 742 will correspond to the diameter of the hole exit. In some embodiments the hole entry may have a diameter of less than 300 microns, or of less than 200 microns, or of less than or equal to 160 microns, or of less than 140 microns. In some embodiments the hole exit may have a diameter of less than 300 microns, or less than 200 microns, or less than 100 microns, or less than or equal to 40 microns, or less than 25 microns.

In some cases, the cross-section of nozzle hole 720 has an increasing rotation rate from the hole entry to the hole exit. In some cases, the cross-section of nozzle hole 720 has a decreasing rotation rate from the hole entry to the hole exit. In some cases, the cross-section has a constant rotation rate from the hole entry to the hole exit.

Figure 9A:
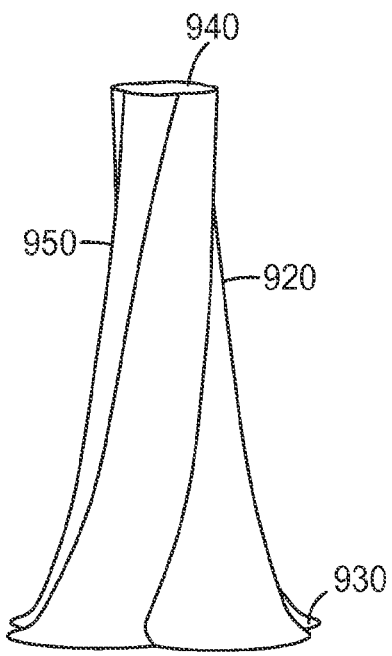
FIG. 9A is a schematic three-dimensional view of a nozzle hole forming feature or microstructure used to form a nozzle hole.
Figure 9B:
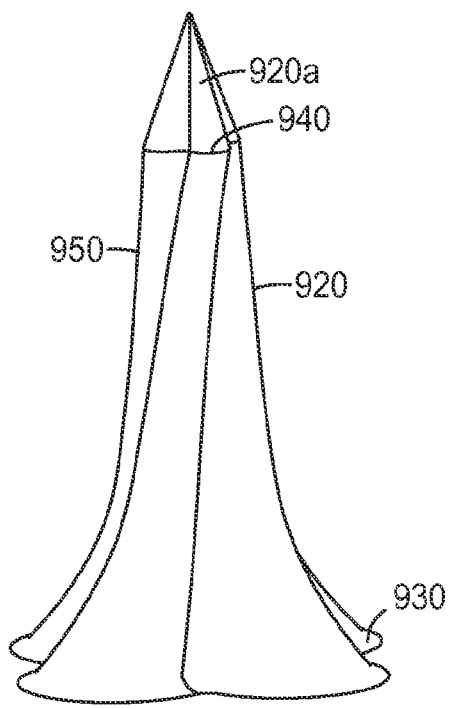
FIG. 9B is a schematic three-dimensional view of the microstructure of FIG. 9A with a planar control cavity forming feature.
Figure 10:
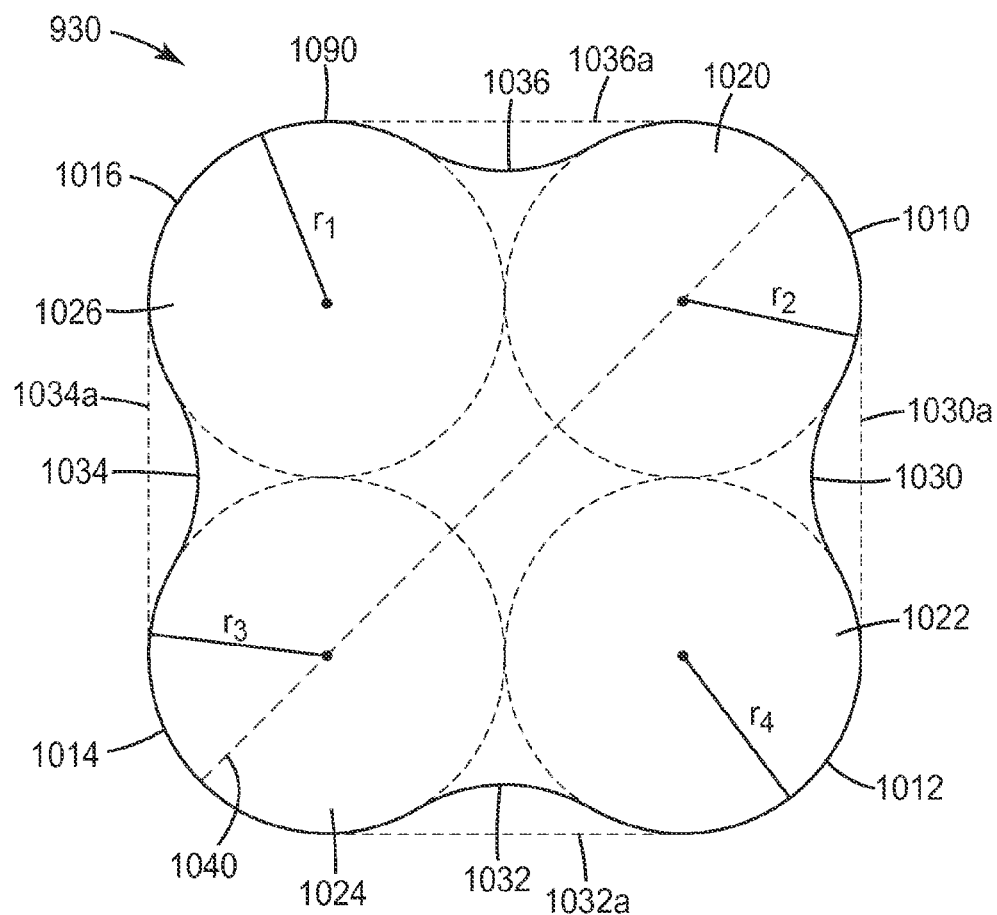
FIG. 10 is a schematic of the base (hole entry) of the microstructure (nozzle hole) shown in FIG. 9.

In general, a base or a lateral cross-section of a disclosed microstructure, or an entry hole or a lateral cross-section of a disclosed nozzle hole, can have any cross-section that may be desirable in an application. In some cases, the base or the entry hole can have a perimeter that includes the outer arcs of closely packed circles, where the outer arcs are connected by curve-like fillets. For example, FIG. 9A is a schematic three-dimensional view of a hole forming feature or microstructure 920 that includes a base 930 used to form the hole entry, a top 940 that can define the hole exit, and a side 950 that connects the base to the top and is used to define the walls of the hole. FIG. 9B is a schematic three-dimensional view of the hole forming feature or microstructure 920 with a replica planar control cavity forming feature 920a that is used to form a planar control cavity or planarization cone. FIG. 10 is a schematic of base 930 having a perimeter 1090 that includes the outer arcs of four closely packed circles, where the outer arcs are connected by curve-like fillets. In particular, perimeter 1090 includes an outer arc 1010 of a circle 1020, an outer arc 1012 of a circle 1022, an outer arc 1011 of a circle 1024, and an outer arc 1016 of a circle 1026, where outer arcs 1010 and 1012 are connected by curve-like fillet 1030 or straight line 1030a (shown in phantom), outer arcs 1012 and 1014 are connected by curve-like fillet 1032 or straight line 1032a (shown in phantom), outer arcs 1014 and 1016 are connected by curve-like fillet 1034 or straight line 1034a (shown in phantom), and outer arcs 1016 and 1010 are connected by curve-like fillet 1036 or straight line 1036a (shown in phantom). Circles 1010, 1012, 1014 and 1016 form a square array of equal and touching circles where each circle has a radius $r_1$, $r_2$, $r_3$ and $r_4$ that are all the same or different.

Base 930 includes an axis of symmetry 1040. The lateral cross-sections of microstructure 920 rotate and the radius $r_1$ decreases from base 930 to top 940 resulting in a microstructure that spirals and tapers narrower from base 930 to top 940.

Equivalently, a nozzle hole 920 includes a hole entry 930, a hole exit 940 and a wall 950 extending from the hole entry to the hole exit. Hole 920 has a lateral cross-section that rotates and becomes smaller from the hole entry to the hole exit.

Figure 11:
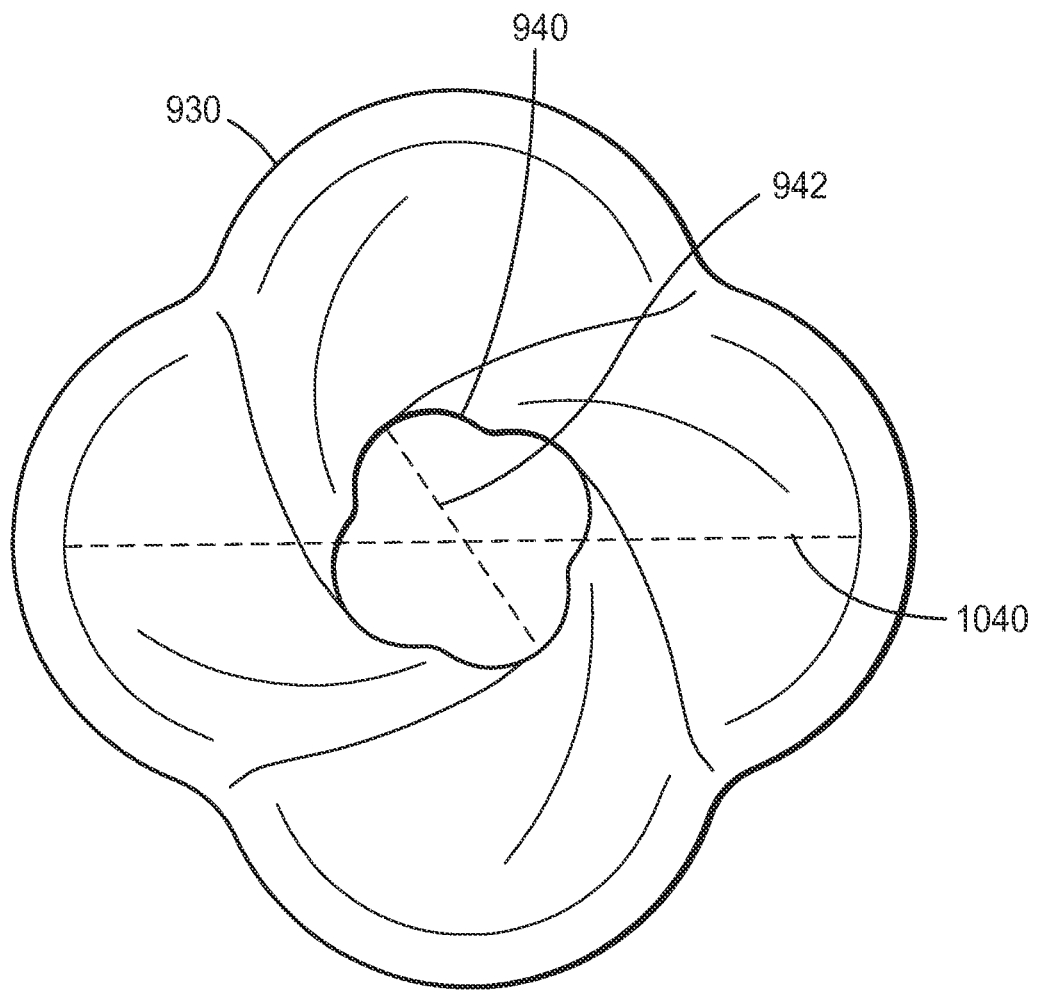
FIG. 11 is a schematic top-view of the microstructure (nozzle hole) shown in FIG. 9.

FIG. 11 is a schematic top-view of nozzle hole (or microstructure) 920 illustrating hole entry 930 having axis of symmetry 1040 and hole exit 940 having axis of symmetry 942. Viewed from the top, the axes of symmetry of the cross-sections of hole 920 rotate counter clockwise from the hole entry to the hole exit. Such a rotation results in a twist in the hole along its height or thickness.

Figure 12:
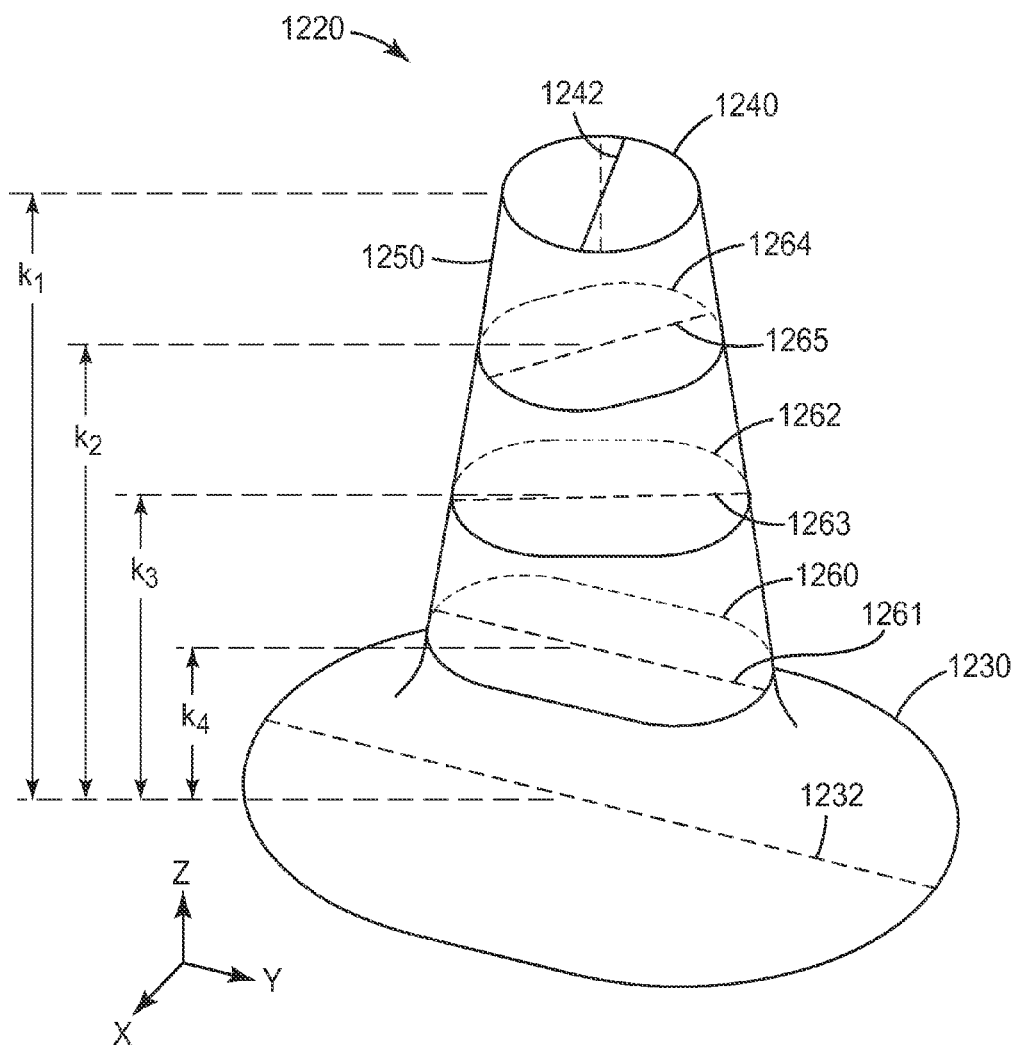
FIG. 12 is a schematic three-dimensional view of a nozzle hole (microstructure)
Figure 13:
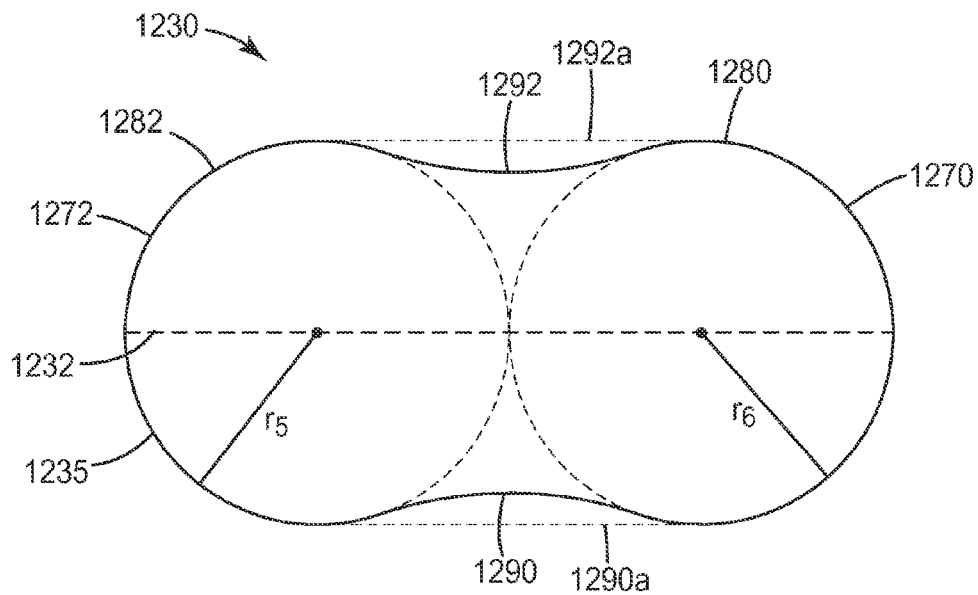
FIG. 13 is a schematic of the hole entry (base) of the nozzle hole (microstructure) shown in FIG. 12.

As another example, FIG. 12 is a schematic three-dimensional view of a nozzle hole (or microstructure) 1220 that has a height $k_1$ and includes a hole entry 1230, a hole exit 1240, and a wall 1250 that extends from the hole entry to the hole exit. FIG. 13 is a schematic of hole entry 1230 having a perimeter 1235 that includes the outer arcs of two closely packed or touching circles, where the outer arcs are connected by curve-like fillets. In particular, perimeter 1090 includes an outer arc 1270 of a circle 1280 and an outer arc 1272 of a circle 1282, where each circle has a radius $r_2$ and outer arcs 1270 and 1272 are connected by curve-like fillets 1290 and 1292.

Figure 14:
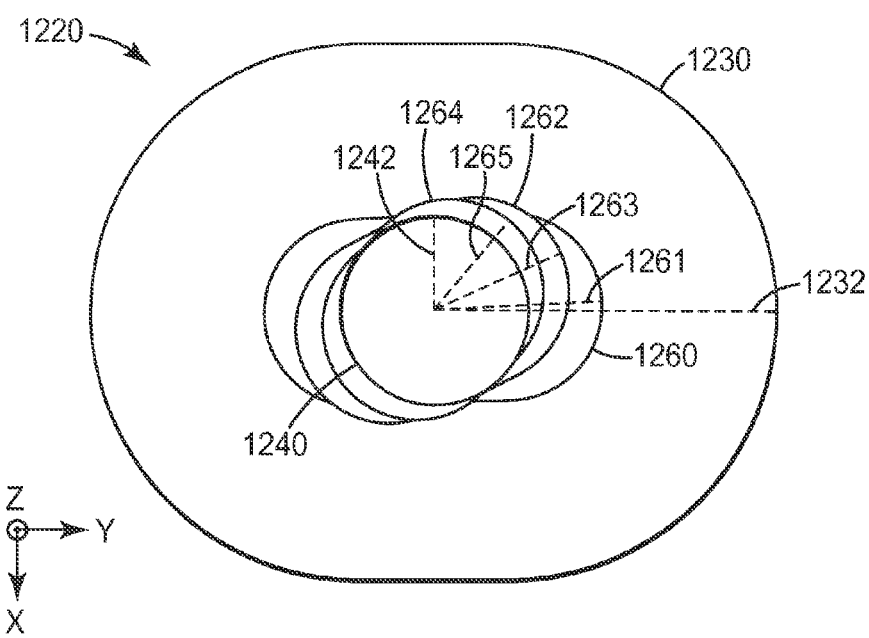
FIG. 14 is a schematic top-view of the nozzle hole (microstructure) shown in FIG. 12.

Hole entry 1230 includes an axis of symmetry 1232. The lateral cross-sections of nozzle hole 1220 rotate and the radius $r_2$ decreases from hole entry 1230 to hole exit 1240 resulting in a microstructure that spirals and tapers narrower from hole entry 1230 to hole exit 1240. In particular, top 1240 has an axis of symmetry 1242 along the x-direction, an xy cross-section 1264 of the hole at a height $k_2 < k_1$ has an axis of symmetry 1265 that is rotated clockwise relative to axis of symmetry 1242, an xy cross-section 1262 of the hole at a height $k_3 < k_2$ has an axis of symmetry 1263 that is rotated clockwise relative to axis of symmetry 1265, an xy cross-section 1260 of the hole at a height $k_4 < k_3$ has an axis of symmetry 1261 that is rotated clockwise relative to axis of symmetry 1263, and hole entry 1230 has an axis of symmetry 1232 along the y-axis that is rotated clockwise relative to axis of symmetry 1261. Hence, hole 1220 has an xy cross-section that rotates clockwise from hole exit 1240 to hole entry 1230. Equivalently, hole 1220 has an xy cross-section that rotates counter clockwise from the hole entry to the hole exit. FIG. 14 is a schematic top-view of nozzle hole 1220 illustrating hole exit 1242 and its axis of symmetry 1242 along the x-axis, cross-section 1264 and its axis of symmetry 1265, cross-section 1262 and its axis of symmetry 1263, cross-section 1260 and its axis of symmetry 1261, and hole entry 1230 and its axis of symmetry 1232 along the y-axis. Viewed from the top, the axes of symmetry of the lateral cross-sections of the hole rotate clockwise from the hole exit to the hole entry.

Equivalently, a microstructure 1220 includes a base 1230, a top 1240 and a side 1250 that connects the base to the top. Microstructure 1220 has a cross-section that rotates and becomes smaller from the base to the top.

As shown in FIGS. 2 through 14, the microstructures disclosed herein that serve as nozzles may be monolithic structures. In other words, the microstructures 220, 320, 420 etc. that forms the actual nozzles are created from, and ultimately form a common, single piece of material. This may be understood as different from nozzles that are formed through a combination of a number of different parts, where such parts are potentially made up of different materials. In this regard, as shown in the above-mentioned figures, the nozzles disclosed herein may be monolithic structures.

Figure 15A:
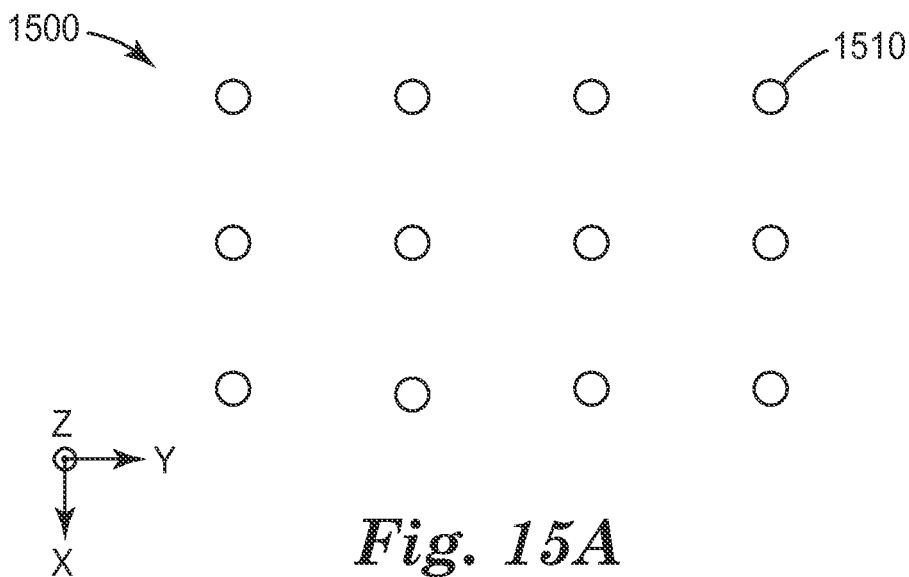
FIGS. 15A and B are schematic top-views of two different arrays of holes (microstructures)
Figure 15B:
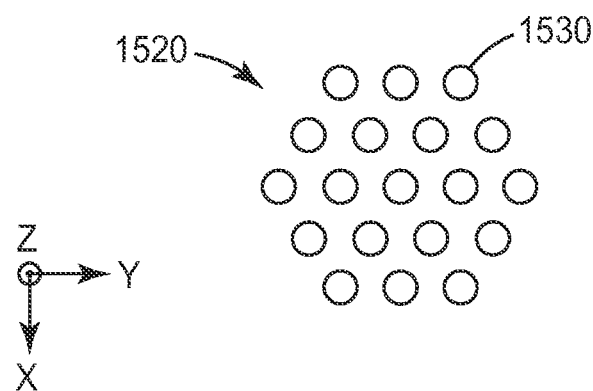
Figure 16:
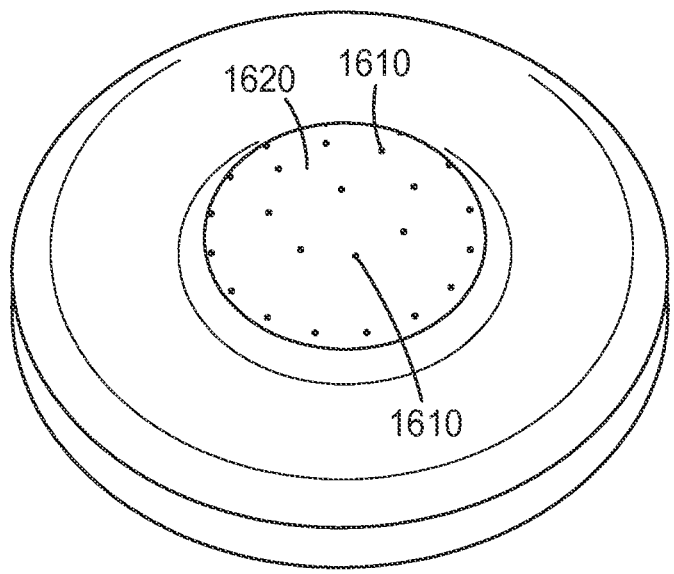
FIG. 16 is a schematic three-dimensional view of a plurality of nozzle holes (microstructures)

In general, a plurality of disclosed microstructures or holes can have any arrangement that may be desirable in an application. For example, in some cases, the disclosed holes can be arranged regularly or irregularly. For example, FIG. 15A is a schematic top-view of a two-dimensional square array 1500 of holes or microstructures 1510, and FIG. 15B is a schematic top-view of a two-dimensional hexagonal array 1520 of holes or microstructures 1530, where holes or microstructures 1510 and 1530 can be any nozzle hole or microstructure disclosed herein. In some cases, a plurality of disclosed microstructures or holes may be arranged on a non-planar surface. For example, FIG. 16 is a schematic three-dimensional view of a plurality of nozzle holes or microstructures 1610 disposed or arranged on a spherical surface 1620.

Figure 17:
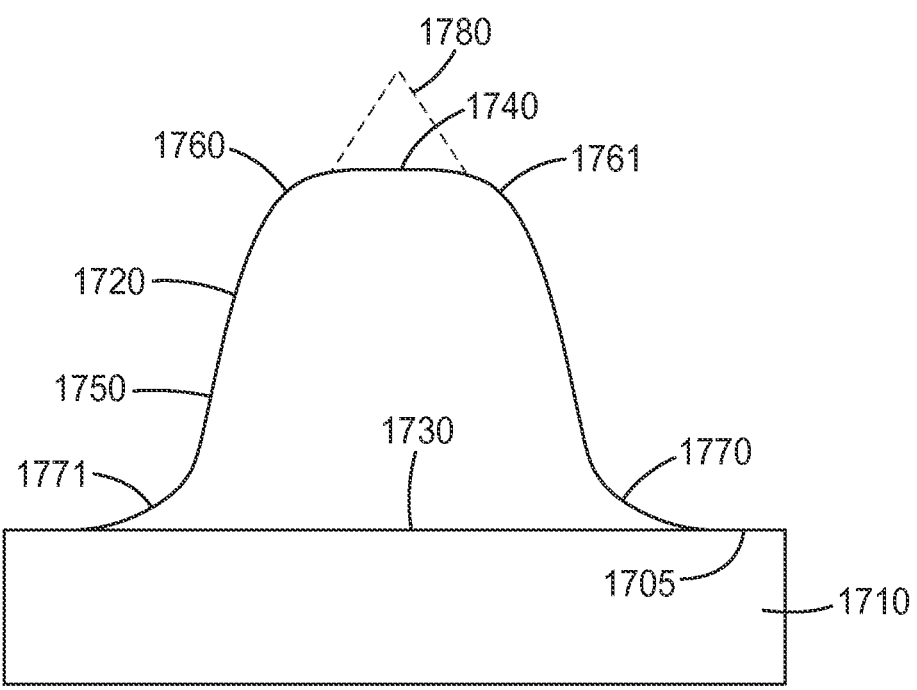
FIG. 17 is a schematic side-view of a microstructure.

In some cases, a disclosed microstructure or hole may have one or more fillets for ease of manufacturing and/or to reduce local stress. For example, FIG. 17 is a schematic side-view of a microstructure 1720 that is disposed on a substrate 1710 and includes a base 1730, a top 1740, and a side 1750 connecting the base to the top. Microstructure 1720 includes fillets 1760 and 1761 smoothly joining side 1750 and top 1740, and fillets 1770 and 1771 smoothly joining side 1750 and top surface 1705 of substrate 1710.

The nozzle through-holes or holes and the microstructured patterns or microstructures disclosed herein can be fabricated using the various methods disclosed herein, including the one outlined in reference to FIGS. 1A-1M. The method provides flexibility and control in producing a variety of individual microstructures and holes in a single array, yet can be used to achieve desirably low levels of average surface roughness while maintaining industrially acceptable fabrication speeds or "throughput."

FIG. 1A is a schematic side-view of a layer 115 of a first material disposed on a substrate 110. The first material is capable of undergoing multiphoton reaction by simultaneously absorbing multiple photons. For example, in some cases, the first material is capable of undergoing a two photon reaction by simultaneously absorbing two photons. The first material can be any material or material system that is capable of undergoing multiphoton, such as two photon, reaction, such as those describe in pending U.S. application Ser. No. 11/313,482, "Process For Making Microlens Arrays And Masteroforms", filed Dec. 21, 2005; U.S. Patent Application Publication US 2009/0175050, "Process For Making Light Guides With Extraction Structures And Light Guides Produced Thereby", filed May 17, 2007; and PCT Publication WO 2009/048705, "Highly Functional Multiphoton Curable Reactive Species", filed Sep. 9, 2008; all of which are incorporated herein by reference.

In some cases, the first material can be a photoreactive composition that includes at least one reactive species that is capable of undergoing an acid- or radical-initiated chemical reaction, and at least one multiphoton photoinitiator system. Reactive species suitable for use in the photoreactive compositions include both curable and non-curable species. Exemplary curable species include addition-polymerizable monomers and oligomers and addition-crosslinkable polymers (such as free-radically polymerizable or crosslinkable ethylenically-unsaturated species including, for example, acrylates, methacrylates, and certain vinyl compounds such as styrenes), as well as cationically-polymerizable monomers and oligomers and cationically-crosslinkable polymers (which species are most commonly acid-initiated and which include, for example, epoxies, vinyl ethers, cyanate esters, etc.), and the like, and mixtures thereof. Exemplary non-curable species include reactive polymers whose solubility can be increased upon acid- or radical-induced reaction. Such reactive polymers include, for example, aqueous insoluble polymers bearing ester groups that can be converted by photogenerated acid to aqueous soluble acid groups (for example, poly(4-tert-butoxycarbonyloxystyrene). Non-curable species also include the chemically-amplified photoresists.

The multiphoton photoinitiator system enables polymerization to be confined or limited to the focal region of a focused beam of light used to expose the first material. Such a system preferably is a two- or three-component system that includes at least one multiphoton photosensitizer, at least one photoinitiator (or electron acceptor), and, optionally, at least one electron donor.

Layer 115 of the first material can be coated on substrate 110 using any coating method that may be desirable in an application. For example, the first material can be coated on substrate 110 by flood coating. Other exemplary coating methods include knife coating, notch coating, reverse roll coating, gravure coating, spray coating, bar coating, spin coating and dip coating.

Substrate 110 can be chosen from a wide variety of films, sheets, and other surfaces (including silicon wafers and glass plates), depending upon the particular application and the method of exposure to be utilized. In some cases, substrate 110 is sufficiently flat so that layer 115 of the first material has a uniform thickness. In some cases, layer 115 can be exposed in bulk form. In such cases, substrate 110 may be excluded from the fabrication process. In some cases, such as when the process includes one or more electroplating steps, substrate 110 can be electrically conductive or semi-conductive.

Next, the first material is selectively exposed to an incident light having sufficient intensity to cause simultaneous absorption of multiple photons by the first material in the exposed region. The exposure can be accomplished by any method that is capable of providing light with sufficient intensity. Exemplary exposure methods are described in U.S. Patent Application Publication US 2009/0099537, "Process For Making Microneedles, Microneedle Arrays, Masters, And Replication Tools", filed Mar. 23, 2007, which is incorporated herein by reference.

Figure 18:
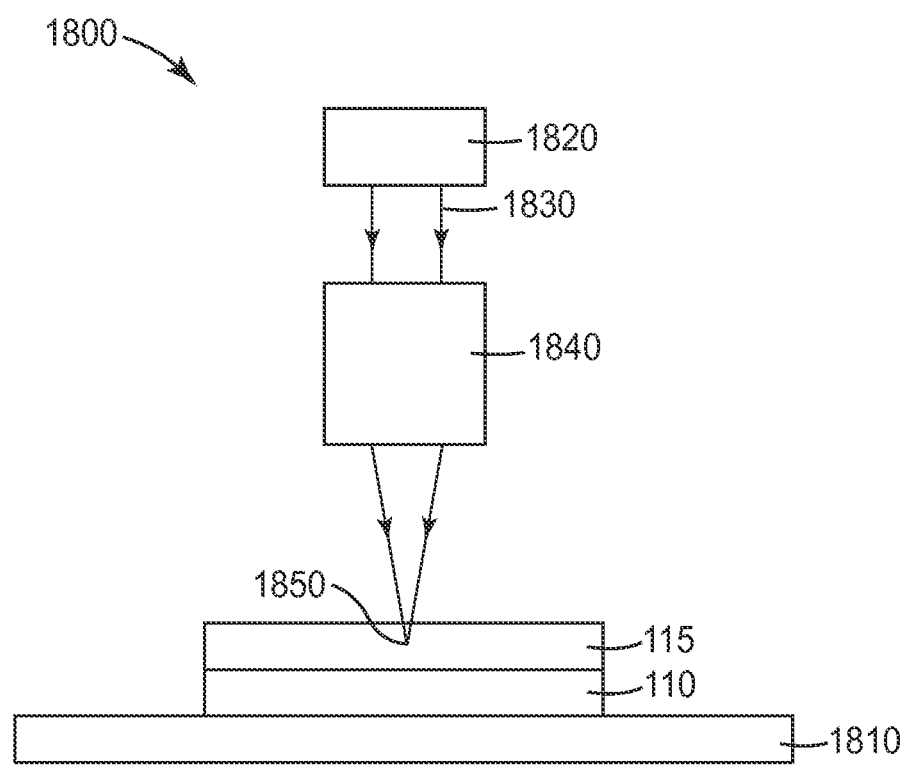
FIG. 18 is a schematic side-view of an exposure system.

FIG. 18 is a schematic side-view of an exemplary exposure system 1800 for exposing layer 115 of the first material. The exposure system includes a light source 1820 emitting light 1830 and a stage 1810 that is capable of moving in one, two, or three dimensions. Substrate 110 coated with layer of first material 115 is placed on the stage. Optical system 1840 focuses emitted light 1830 at a focal region 1850 within the first material. In some cases, optical system 1840 is designed so that simultaneous absorption of multiple photons by the first material occurs only at or very near focal region 1850. Regions of layer 115 that undergo the multiphoton reaction become more, or less, soluble in at least one solvent compared to regions of layer 115 that do not undergo the multiphoton reaction.

Focal region 1850 can scan a three-dimensional pattern within the first material by moving stage 1810 and/or light 1830 and/or one or more components, such as one or more mirrors, in optical system 1840. In the exemplary process illustrated in FIGS. 1A and 18, layer 115 is disposed on a planar substrate 110. In general, substrate 110 can have any shape that may be desirable in an application. For example, in some cases, substrate 110 can have a spherical shape.

Light source 1820 can be any light source that is capable of producing sufficient light intensity to effect multiphoton absorption. Exemplary light sources include lasers, such as femtosecond lasers, operating in a range from about 300 nm to about 1500 nm, or from about 400 nm to about 1100 nm, or from about 600 nm to about 900 nm, or from about 750 nm to about 850 nm.

Optical system 1840 can include, for example, refractive optical elements (for example, lenses or microlens arrays), reflective optical elements (for example, retroreflectors or focusing mirrors), diffractive optical elements (for example, gratings, phase masks, and holograms), polarizing optical elements (for example, linear polarizers and waveplates), dispersive optical elements (for example, prisms and gratings), diffusers, Pockels cells, waveguides, and the like. Such optical elements are useful for focusing, beam delivery, beam/mode shaping, pulse shaping, and pulse timing.

Figure 1B:
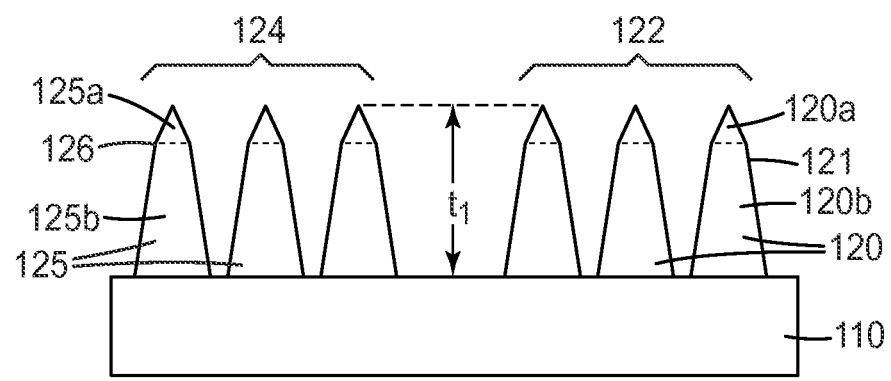

After selective exposure of layer 115 of the first material by exposure system 1800, the exposed layer is placed in a solvent to dissolve regions of higher solvent solubility. Exemplary solvents that can be used for developing the exposed first material include aqueous solvents such as, for example, water (for example, having a pH in a range of from 1 to 12) and miscible blends of water with organic solvents (for example, methanol, ethanol, propanol, acetone, acetonitrile, dimethylformamide, N-methylpyrrolidone, and the like, and mixtures thereof); and organic solvents. Exemplary useful organic solvents include alcohols (for example, methanol, ethanol, and propanol), ketones (for example, acetone, cyclopentanone, and methyl ethyl ketone), aromatics (for example, toluene), halocarbons (for example, methylene chloride and chloroform), nitriles (for example, acetonitrile), esters (for example, ethyl acetate and propylene glycol methyl ether acetate), ethers (for example, diethyl ether and tetrahydrofuran), amides (for example, N-methylpyrrolidone), and the like, and mixtures thereof. FIG. 1B is a schematic side-view of a first microstructured pattern 121 formed in the first material using the multiphoton process. The first microstructured pattern includes a first cluster 122 of microstructures or features 120 and a second cluster 124 of microstructures or features 125, where microstructures 120 and 125 can be any microstructures including any microstructures disclosed herein. In some cases, microstructures 120 and 125 have different structures. In some cases, microstructures 120 and 125 have the same structure. In the exemplary first microstructured pattern 121, microstructures 120 and 125 have heights $t_1$. Each microstructure 120 and 125 includes a replica nozzle hole forming feature 120b and 125b, and (differentiated by phantom lines) replica planar control cavity forming features 120a and 125a, which are used to form the planar control cavities or planarization cones. When planarization cones are used, it can be preferable for them to have a cone angle of about 45 degrees.

Figure 19:
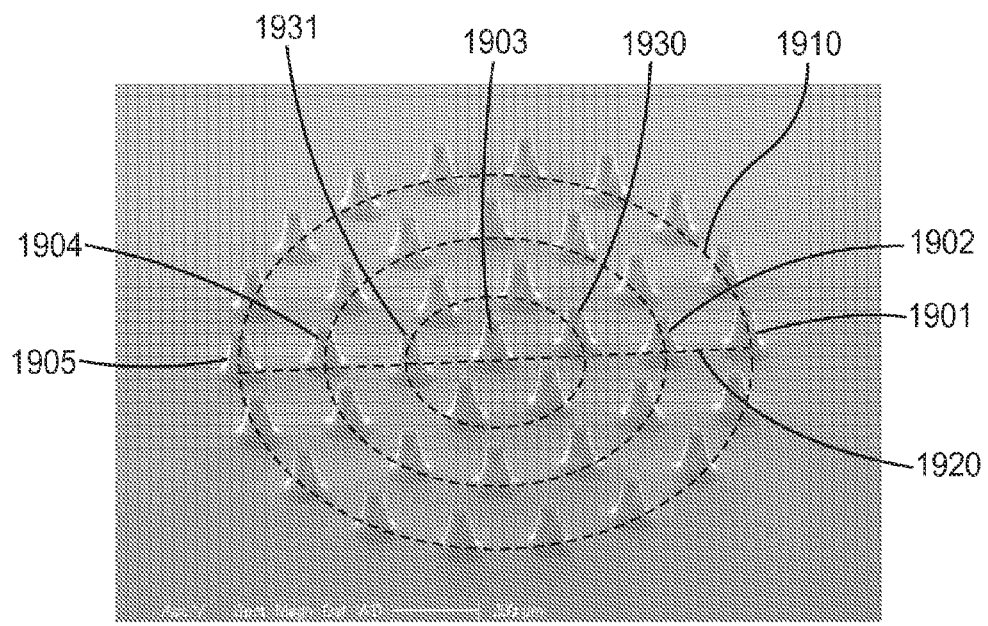
FIGS. 19 and 20 are two scanning electron micrographs (SEM) of a cluster of microstructures.
Figure 20:
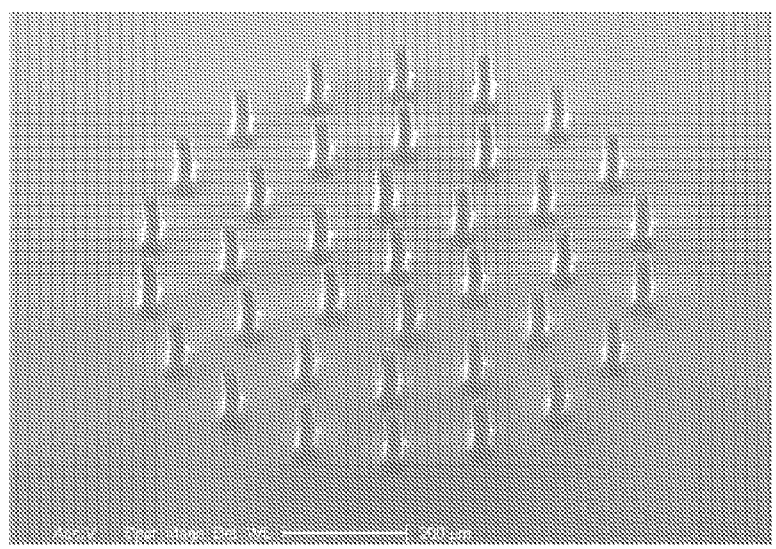
Figure 21:
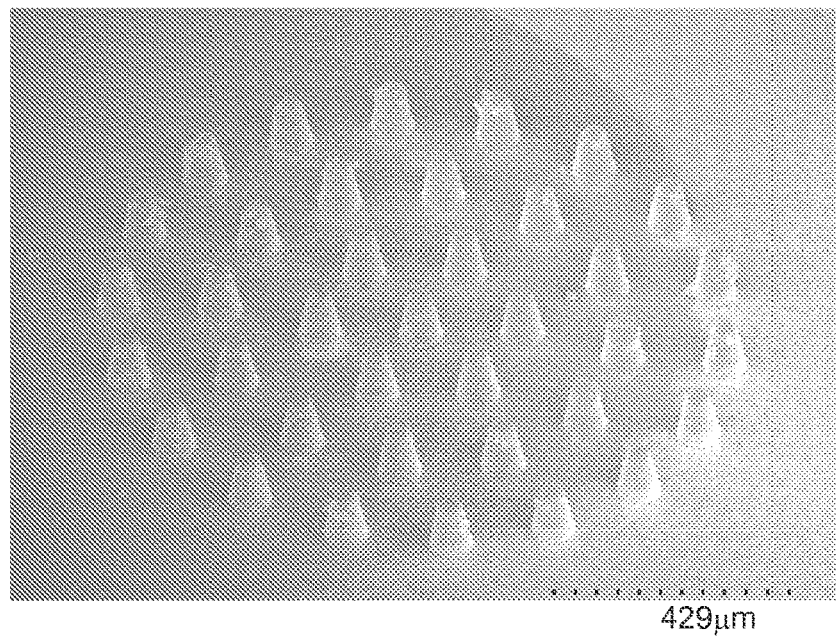
FIG. 21 is an SEM of a cluster of polycarbonate microstructures.

FIGS. 19 and 20 are scanning electron micrographs of a cluster or array of replica nozzle hole forming features or microstructures 120 fabricated according to the processes disclosed herein. The microstructures in FIGS. 19 and 20 are similar to the nozzle hole forming features or microstructures 1220 shown in FIG. 12. In FIG. 19, the microstructures are viewed along the minor axes of the bases of the microstructures and in FIG. 20, the microstructures are viewed along the major axes of the bases of the microstructures.

The plurality of microstructures or microstructured pattern in FIG. 19 (and FIG. 20) are arranged in an array of concentric circles that includes an outermost circle 1910. The microstructures are arranged such that no diameter of the outermost circle includes at least one discrete microstructure from each circle in the array of concentric circles. For example, a diameter 1920 of outermost circle 1910 includes microstructures 1901-1905 but not microstructures 1930 and 1931. Each circle in the array of concentric circles in FIG. 19 includes equally spaced discrete microstructures. Similarly, in some cases, a nozzle includes a plurality of holes that are arranged in an array of concentric circles that includes an outermost circle. Discrete nozzle holes or nozzle through-holes are arranged such that no diameter of the outermost circle includes at least one discrete nozzle hole from each circle in the array of concentric circles. In some cases, each circle in the array of concentric circles comprises equally spaced discrete nozzle holes.

Figure 1C:
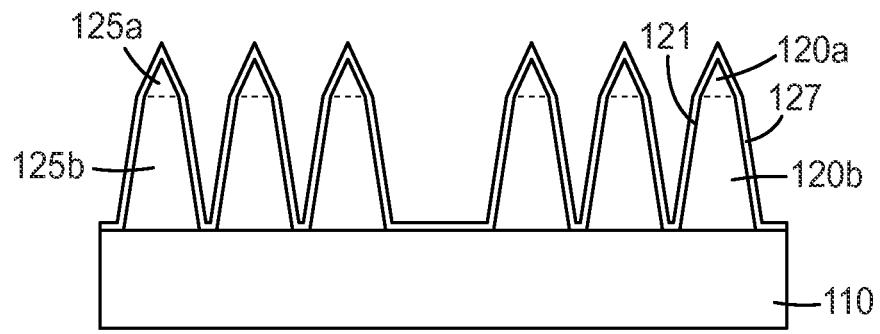

Next, as schematically illustrated in FIG. 1C, the exposed or top surface 126 of first microstructured pattern 121 is metalized or made electrically conductive by coating the top surface with a thin electrically conductive seed layer 127. Conductive seed layer 127 can include any electrically conductive material that is desirable in an application. Exemplary conductive materials include silver, chromium, gold and titanium. In some cases, seed layer 127 has a thickness that is less than about 50 nm, or less than about 40 nm, or less than about 30 nm, or less than about 20 nm.

Figure 1D:
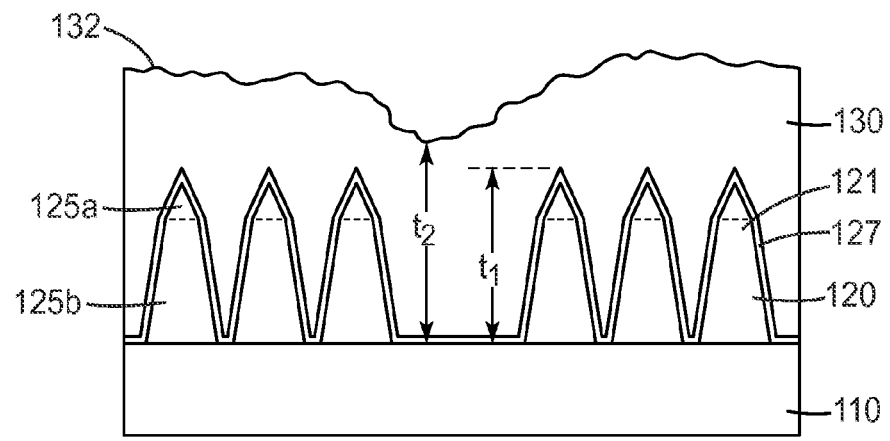
Figure 1E:
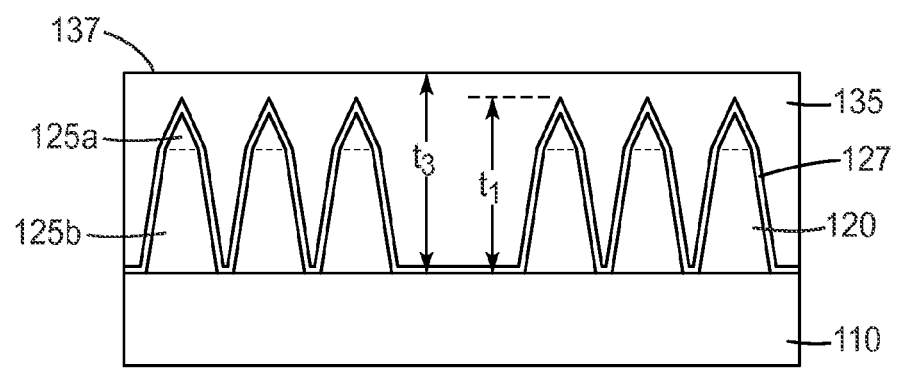

Next, as schematically illustrated in FIG. 1D, seed layer 127 is used to electroplate first microstructured pattern 121 with a second material resulting in a layer 130 of the second material. In some cases, the electroplating of first microstructured pattern 121 is continued until the minimum thickness $t_2$ of layer 130 is greater than $t_1$.

Suitable second materials for electroplating include silver, passivated silver, gold, rhodium, aluminum, enhanced reflectivity aluminum, copper, indium, nickel, chromium, tin, and alloys thereof.

In some cases, layer 130 of the second material has an uneven or rough top surface 132. In such cases, layer 130 of the second material is polished or ground resulting in a layer 135 of the second material having a thickness $t_3 > t_1$ as illustrated schematically in FIG. 1E. The grinding or polishing can be accomplished using any grinding method that may be desirable in an application. Exemplary grinding methods include surface grinding and mechanical milling.

In some cases, layer of second material 130 can be directly deposited on first microstructured pattern 121 without first coating pattern 121 with seed layer 127. In such cases, layer 130 can be coated on pattern 121 by any using suitable method including, for example, sputtering and chemical vapor deposition.

Figure 1F:
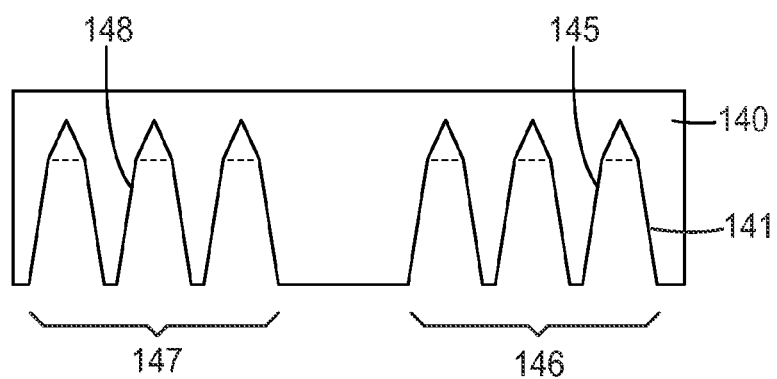

Next, substrate 110 and the first material are removed resulting in a first mold 140 of the second material shown schematically in FIG. 1F. For ease of viewing and without loss of generality, seed layer 127 is not shown in FIG. 1F. In some cases, substrate 110 and the patterned first material can be separated from layer 135 by hand. In some cases, the separation can be carried out prior to grinding layer 130.

First mold 140 includes a second microstructured pattern 141 that is exactly, mostly or at least substantially the negative replica or image (e.g., reverse or mirror image) of first microstructured pattern 121. In particular, first mold 140 of the second material includes a first cluster 146 of microstructures 145 and a second cluster 147 of microstructures 148, where microstructures 145 are exactly, mostly or at least substantially negative replicas or images of microstructures 120 and microstructures 148 are exactly, mostly or at least substantially negative replicas or images of microstructures 125.

Figure 1G:
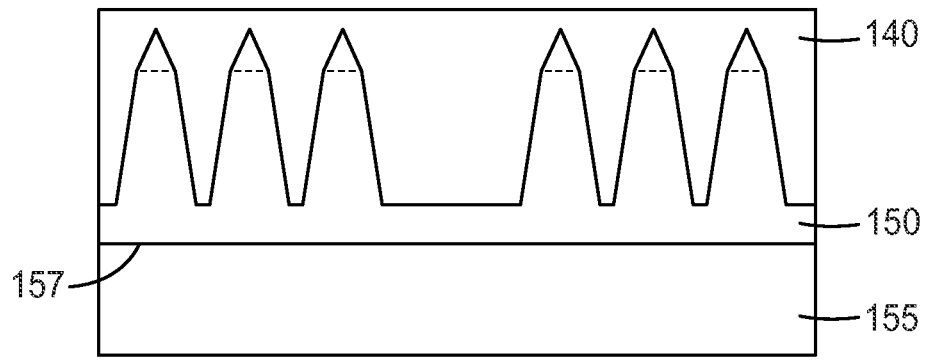

Next, the second microstructured pattern is replicated in a third material 150, which is the same or different than the first material and different than the second material, by disposing the third material in between first mold 140 of the second material and a substrate 155 having a smooth top surface 157 as schematically illustrated in FIG. 1G. The replication process can be accomplished using any suitable replication method. For example, in some cases, the replication can be accomplished by using an injection molding process. In such cases, the first mold 140 and substrate 155 can form at least part of two halves of a molding die, and a molten third material 150 can be introduced between substrate 155 and first mold 140 and solidified after the molten third material fills the second microstructured pattern. The third material 150 can be any material that is capable of replicating a pattern. Exemplary third materials include polycarbonate and other thermoplastics such as polystyrene, acrylic, styrene acrylonitrile, poly-methyl methacrylate (PMMA), cyclo olefin polymer, polyethylene terephthalate, polyethylene 2,6-naphthalate, and fluoropolymers.

After the replication process, first mold 140 of the second material and substrate 155 are removed resulting in a second mold 160 of the third material having a substrate portion 162 and a third microstructured pattern 161 that is exactly, mostly or at least substantially the negative replica or image (e.g., reverse or mirror image) of second microstructured pattern 141 and exactly, mostly or at least substantially a positive replica or image of first microstructured pattern 121. Third microstructured pattern 161 includes a first cluster 168 of microstructures 165 and a second cluster 169 of microstructures 159, where microstructures 165 are exactly, mostly or at least substantially negative replicas or images of microstructures 145 and microstructures 159 are exactly, mostly or at least substantially negative replicas or images of microstructures 148. In some cases, microstructures 165 are exactly, mostly or at least substantially positive replicas or images of microstructures 120 and microstructures 159 are exactly, mostly or at least substantially positive replicas or images of microstructures 125. FIG. 2I is a scanning electron micrograph of a cluster of polycarbonate microstructures 165 fabricated according to the processes disclosed herein.

Figure 1H:
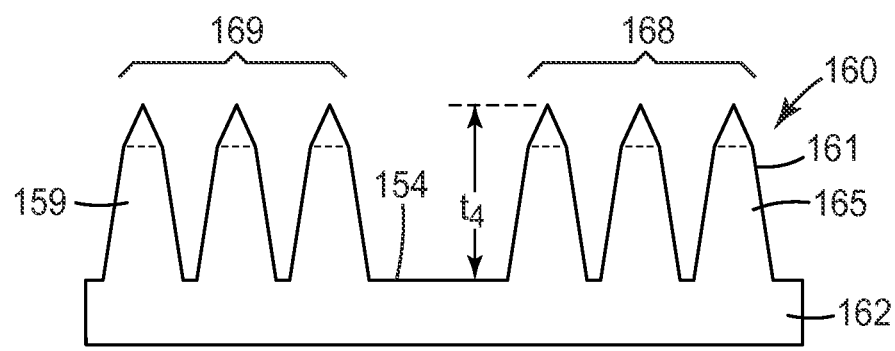
Figure 1I:
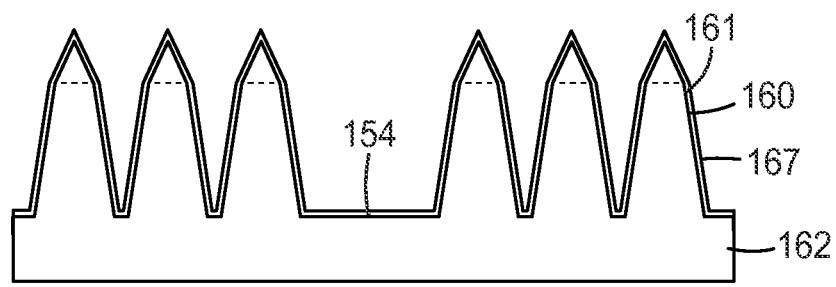

Next, as schematically illustrated in FIG. 1I, top surface 154 of third microstructured pattern 161 is metalized or made electrically conductive by coating the top surface with a thin electrically conductive seed layer 167 similar to seed layer 127.

Figure 1J:
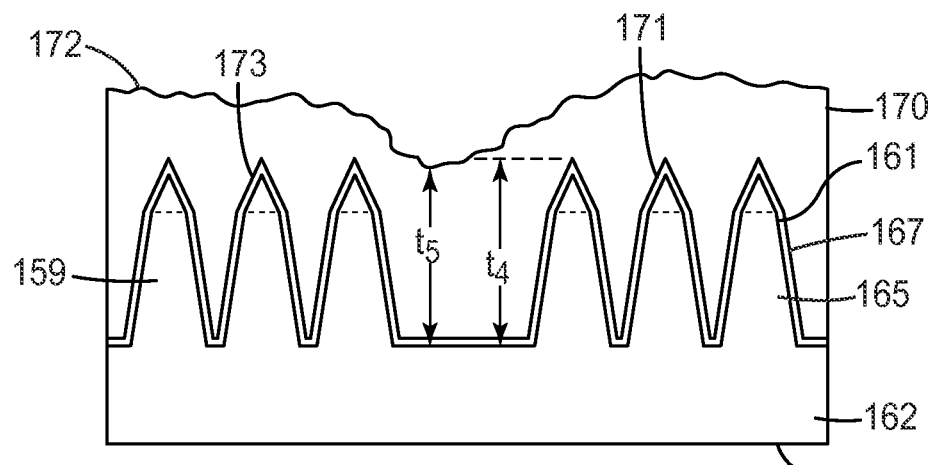

Next, as schematically illustrated in FIG. 1J, seed layer 167 is used to electroplate third microstructured pattern 161 with a fourth material different than the third material resulting in a nozzle pre-form or layer 170 of the fourth material having a top surface 172. In some cases, the electroplating of second microstructured pattern 161 is continued until the minimum thickness $t_5$ of layer 130 is greater than $t_4$, the height of the microstructures in second mold 160. In some cases, height $t_4$ is substantially equal to height $t_1$. Suitable fourth materials for electroplating include silver, passivated silver, gold, rhodium, aluminum, enhanced reflectivity aluminum, copper, indium, nickel, chromium, tin, and alloys thereof. In other embodiments, the fourth material may be a ceramic that is deposited on third microstructured pattern 161. Such a ceramic material may be formed, e.g., by a sol-gel process as described in commonly owned and assigned U.S. Pat. No. 5,453,104, or by photocuring of a ceramic-filled or pre-ceramic polymeric composition as described in commonly owned and assigned U.S. Pat. Nos. 6,572,693, 6,387,981, 6,899,948, 7,393,882, 7,297,374, and 7,582,685, each of which is herein incorporated by reference in its entirety. Such ceramic materials may comprise, e.g., silica, zirconia, alumina, titania, or oxides of yttrium, strontium, barium, hafnium, niobium, tantalum, tungsten, bismuth, molybdenum, tin, zinc, lanthanide elements (i.e. elements having atomic numbers ranging from 57 to 71, inclusive), cerium and combinations thereof.

Figure 1K:
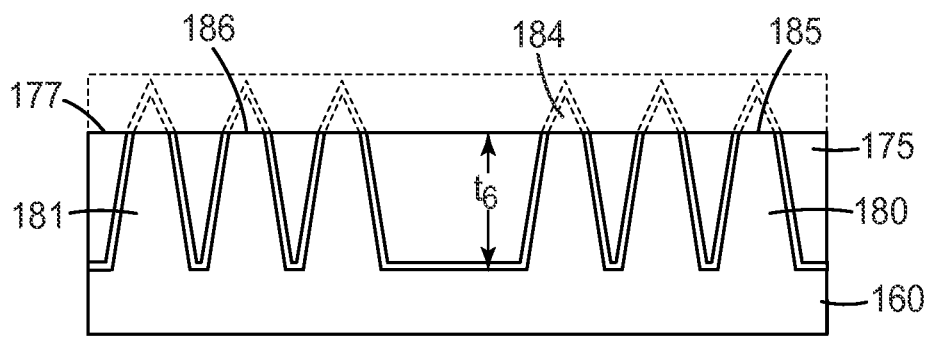

Next, as schematically illustrated in FIG. 1K, the top surface 172 of the nozzle pre-form 170 is ground or otherwise removed until sacrificial planar control cavities 171 of microstructures 165 and sacrificial planar control cavities 173 of microstructures 159 are completely or at least substantially removed. Thus, it can be desirable for the third material to be softer than the fourth material. For example, in some cases, the third material is a polymeric material (e.g., polycarbonate) and the fourth material is a metallic material (e.g., a nickel or iron alloy). The sacrificial planar control cavities 171 and 173 are considered substantially removed, when the tops 184 and 186 of all the nozzle hole forming microstructures 180 and 181 in third microstructured pattern 161 are sufficiently exposed to ensure that the required fluid flow rate is consistently obtained, within acceptable tolerances, through each of the corresponding nozzles 192 and 193. This removal process results in a layer 175 of the fourth material, planarizing of the third microstructured pattern 161 so as to remove the sacrificial planar control cavities (shown in phantom), and exposure of the tops 185 of the nozzle hole forming microstructures 180 and 181 (i.e., the desired hole outlet openings of the nozzle through-holes) in the third microstructured pattern 161. Layer 175 of the fourth material has a top surface 177 that is substantially even with tops 184 of microstructures 180 and tops 186 of microstructures 181. The microstructures 180 and 181 have a relatively uniform height $t_6$.

Figure 1L:
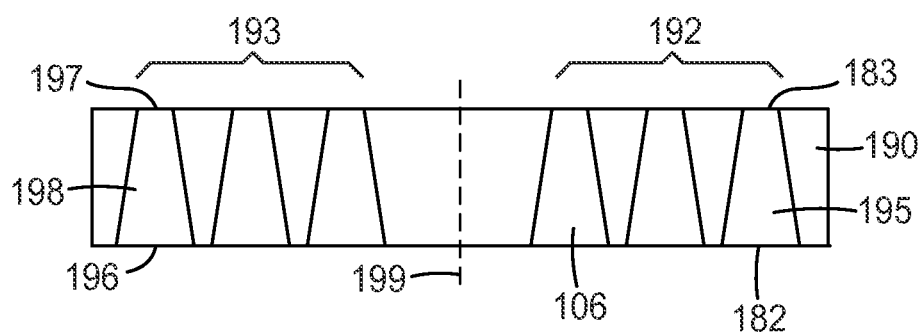

The top surface 172 of the nozzle pre-form 170 is preferably removed using a planarization process in an effort to obtain more uniform size hole outlets 183 and 197 of the nozzle through-holes 195 and 198. As shown in FIGS. 1K and 1L, uniform openings for hole outlets 183 and 197 are obtained by planarizing the top surface 172 so that the top and bottom surfaces of the layer 190 are parallel. It can be important to control the uniformity and size of the nozzle through-hole outlets, for example, to control the flow rate of fluid through the nozzle. The sacrificial planar control cavities 171 and 173 are designed (i.e., sized and configured) to be removed such that the corresponding nozzle through-holes (i.e., the hole outlets) can be opened in a desired manner (e.g., to obtain a required fluid flow rate and/or a desired fluid flow pattern through the nozzle). While the present invention allows smaller nozzle through-holes to be formed, it also allows for a greater density of the through-holes per unit area of nozzle surface, in an effort to provide enough open area (i.e., the combined area of the nozzle through-hole outlets) to obtain the necessary fluid flow rate through the nozzle.

Referring to FIG. 1K, the planar control cavity forming features 184 also help to insure that any air trapped in the materials (e.g., a molten or otherwise liquid polymeric material) used to make the nozzle forming microstructured pattern 161, especially air trapped in the material filling the nozzle hole forming features 159 and 165, will settle in the planar control cavity forming features 184, rather than in the nozzle hole forming features 159 and 165. The structural integrity of the nozzle hole forming features 159 and 165 can be detrimentally affected if pockets or bubbles of air become trapped therein. The structural integrity of the nozzle hole forming features 159 and 165 is important to insure the desired formation of the corresponding nozzle through-holes. This advantage of the inventive planar control cavity forming features is particularly applicable when the nozzle forming microstructured pattern is formed by molding (i.e., injection molding) a moldable polymeric material.

Planarization Description

Planarization of the top surface, and bottom surface, of the nozzle can be performed using conventional techniques. For example, in one technique, a modified version of an Ultrapol Edge Polisher, built by Ultra-Tec Manufacturing, Inc, can be used. There are many other equivalent systems available on the market.

This system allows the work piece to be brought in contact with the horizontally rotating platen. The system provides adjustment mechanisms to control the pitch and roll angles of the component being ground relative to the rotating platen.

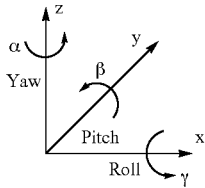

For the purpose of this description, the pitch, roll & yaw axis chart is orientated to the above machine photo. The 12 o'clock position of the substrate is on the x-axis, the 3 o'clock position of the substrate is on the y-axis.

A sample nozzle substrate is mounted nickel side down on an attachment fixture so it is mounted on the machine and held in contact with the lapping film on the rotating platen.

Planarization begins with rough alignment relative to the outer perimeter of the substrate by slowly lowering the work piece until it makes contact with the grinding media. The contact point is then observed and pitch and roll are adjusted accordingly. For example; if the contact point occurs at 12 o'clock, the injector substrate is "nose down" and pitch is adjusted to decrease the angle of contact (by lowering the tail of the work piece. Another example; if after initial contact, the contact point is at the 3 o'clock position, then roll adjustment is required. Roll & pitch are adjusted until the majority of the substrate top plane is in contact with the grinding media.

Backside grinding continues until one or more of the sacrificial planar control cavities or planarization cones are exposed in the newly ground surface. The hole diameters at opposite edges of the nozzle array are measured and pitch and roll adjustments are made accordingly. Further grinding with minor roll & pitch adjustments can be made until all the planarization cone diameters of the nozzle through-holes are equal.

Once the planarization has opened a hole in the planarization cones; the diameter of the planarization cone holes can be used to determine the distance down to the top of the nozzle through-holes; Distance down to the top of a nozzle through-hole or tip equals the height of the planarization cone minus the radius divided by Tan (cone half angle). For example; if the cone half angle if 21°, the cone height is 50 µm and the measured hole diameter equals 30 µm (radius=15), then the distance down to the nozzle tip=50–15/Tan 21=11 µm.

Using a clear or translucent injection molded plastic pre-form and proper fixturing; another metric is to measure the nozzle's clear open area. Mounting the nozzle pre-form on an attachment fixture with an open aperture directly behind the nozzle tips, this allows the nozzle to be back-lit under a high magnification microscope for area measurement (see the FIG. 23 photograph).

Next, as schematically illustrated in FIG. 1L, second mold 160 is removed resulting in a layer 190 of the fourth material that includes a plurality of holes 106 that correspond to the plurality of microstructures 159 and 165 in the third microstructured pattern 161. In particular, layer 190 of the fourth material includes a first cluster or array 192 of nozzle through holes 195 and a second cluster or array 193 of nozzle through holes 198. In some cases, holes 195 are substantial negative replicas of microstructures 120b and holes 198 are substantial negative replicas of microstructures 125b. Holes 195 include hole entries or inlets 182 and hole exits or outlets 183 and holes 198 include hole entries or inlets 196 and hole exits or outlets 197.

Figure 22:
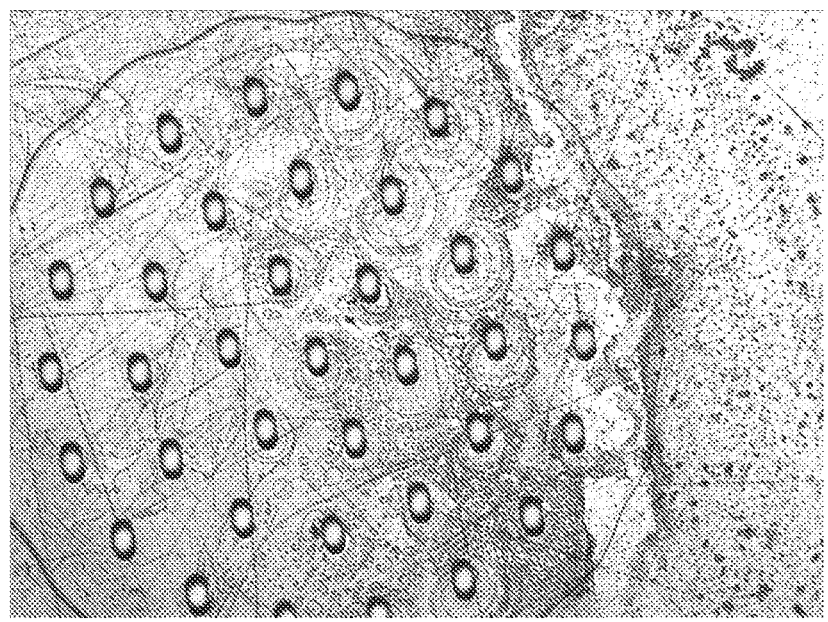
FIGS. 22 and 23 are optical micrographs of respective hole entries and hole entries of a cluster of holes.
Figure 23:
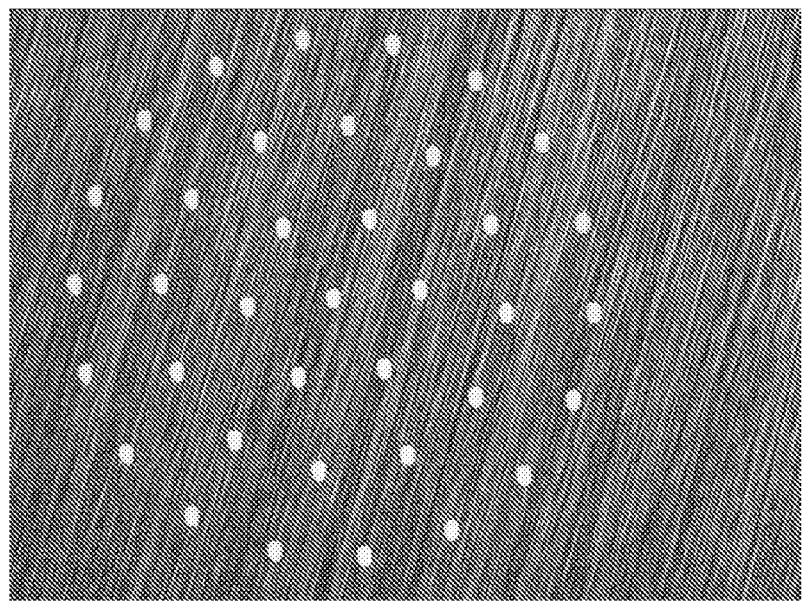
Figure 25:
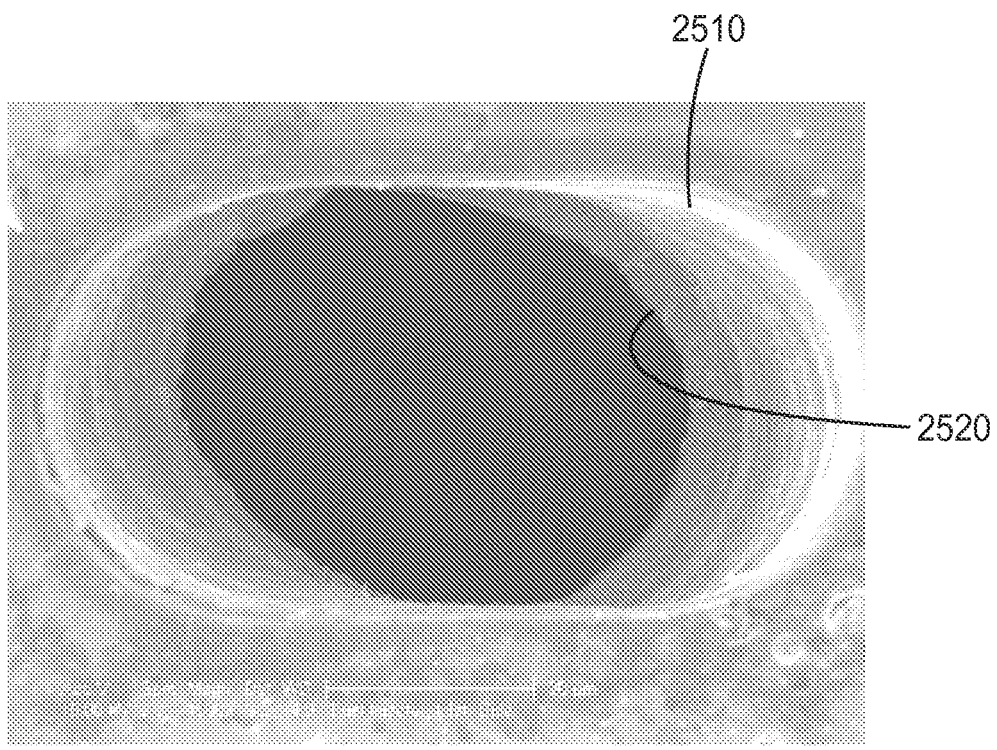
FIG. 25 is an SEM of one of the holes shown in FIGS. 22 and 23.
Figure 26A:
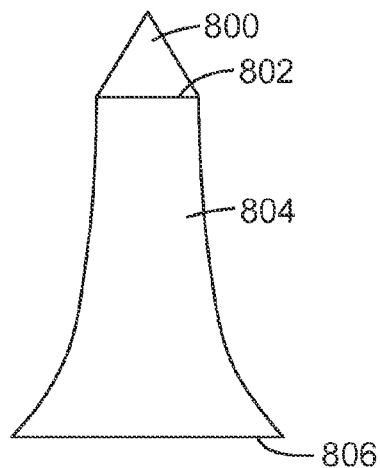
FIG. 26A is a schematic side-view of a nozzle hole forming feature or microstructure, with a curved side and a planar control cavity forming feature configured to form a circular-shape hole outlet.
Figure 26B:
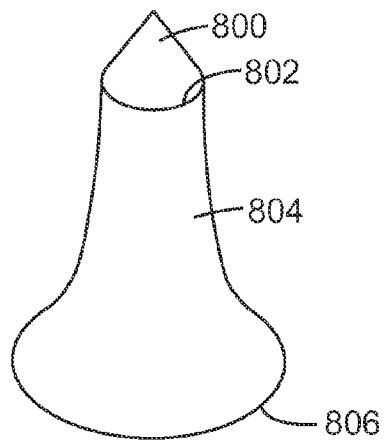
FIG. 26B is a schematic perspective-view of the microstructure of FIG. 26A.
Figure 26C:
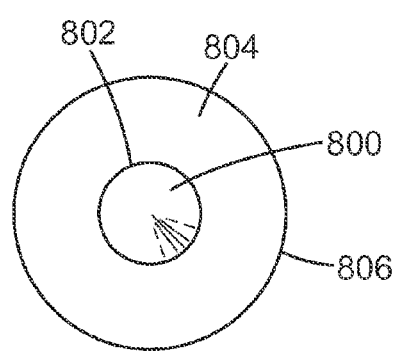
FIG. 26C is a schematic top-view of the microstructure of FIG. 26A.
Figure 26D:
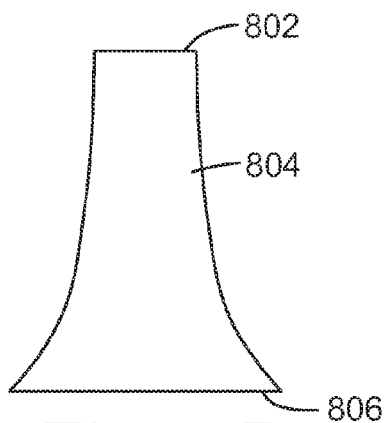
FIG. 26D is a schematic side-view of the microstructure of FIG. 26A with its planar control cavity forming feature having been removed.
Figure 26E:
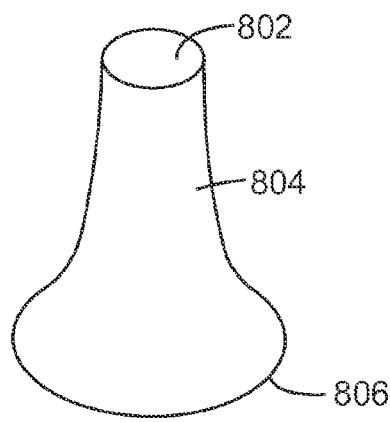
FIG. 26E is a schematic perspective-view of the microstructure of FIG. 26D.
Figure 26F:
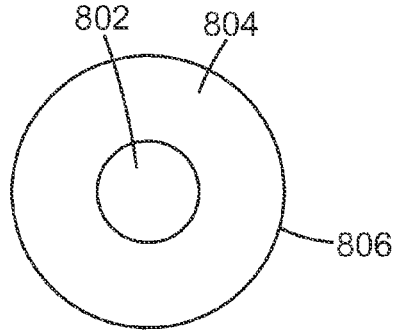
FIG. 26F is a schematic top-view of the microstructure of FIG. 26D.

FIGS. 22 and 23 are optical micrographs of respective hole entries 182 and hole exits 183 of a cluster 192 of holes 195 made according to the processes disclosed herein. FIG. 25 is a scanning electron micrograph of one of the holes 195, viewed from the hole entry side. The hole has a hole entry 2510 and a hole exit 2520 that is smaller than the hole entry. The micrograph clearly illustrates a taper and a twist in the hole.

Figure 1M:
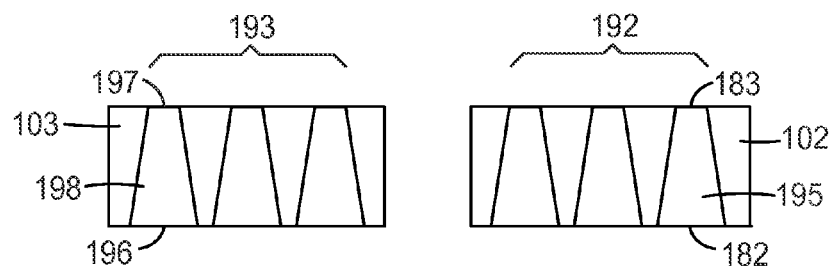

In some cases, as illustrated schematically in FIG. 1M, two clusters 192 and 193 are separated along a direction 199 resulting in a first nozzle 102 and a separate, and in some cases substantially identical, second nozzle 103. The nozzles 102 and 103 can be used, for example, in a spray device and/or a fuel injector.

Figure 24:
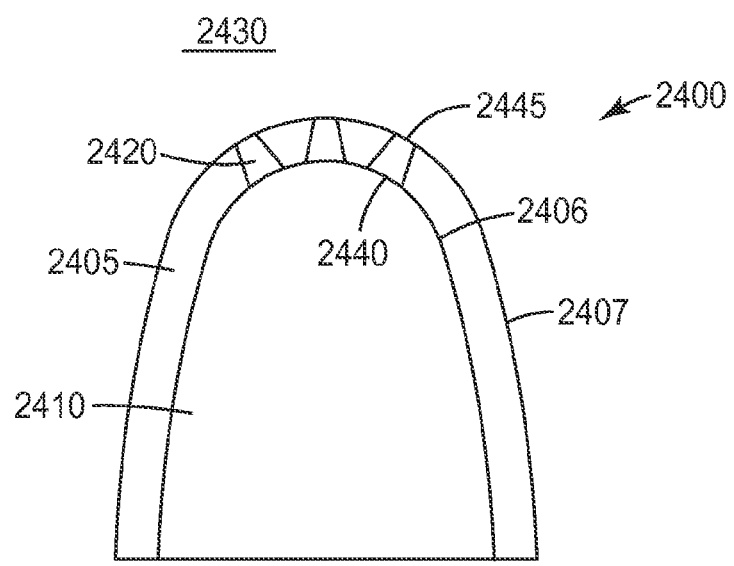
FIG. 24 is a schematic side-view of a nozzle.

FIG. 24 is a schematic side-view of a nozzle 2400 that includes a hollow interior 2410 and a wall 2405 separating the hollow interior from an outside 2430 of the nozzle. The nozzle further includes at least one hole, such as a hole 2420, that connects hollow interior 2410 to outside 2430 of the nozzle. The holes deliver gas or liquid from the hollow interior to the outside. Hole 2420 can be any hole disclosed herein. Hole 2420 includes a hole entry 2440 at an inner surface 2406 of wall 2405 and a hole exit 2445 at an outside surface 2407 of wall 2405. Hole entry 2440 is also at hollow interior 2410 of the nozzle and hole exit 2445 is at outside 2430 of the nozzle.

In some cases, hole entry 2440 has a first shape and hole exit 2445 has a second shape that is different than the first shape. For example, in some cases, the first shape is an elliptical shape and the second shape is a circular shape. As another example, in some cases, the first shape can be a racetrack or oval shape and the second shape can be a circular shape. As another example, in some cases, the second shape can be a circle or an ellipse and the perimeter of the first shape can include outer arcs of a plurality of closely packed circles, where the outer arcs are connected to each other by curve-like fillets.

In some cases the first shape can be substantially the same as the second shape, but they can have different magnifications or sizes. For example, the first shape can be a circle with a radius $a_1$ and the second shape can also be a circle, but with a radius $a_2$ different than $a_1$.

In some cases, hole 2420 has a lateral cross-section that rotates from hole entry 2440 to hole exit 2445 where lateral cross-section refers to a cross-section that is substantially perpendicular to the general flow direction of, for example, a liquid or gas within the hole. In some cases, the cross-section has an increasing rotation rate from the hole entry to the hole exit. In some cases, the cross-section has a decreasing rotation rate from the hole entry to the hole exit. In some cases, the cross-section has a constant rotation rate from the hole entry to the hole exit.

Some of the advantages of microstructures, holes, layers, constructions, and methods of this invention are further illustrated by the following example and embodiments. The particular materials, amounts and dimensions recited in the example, as well as other conditions and details, should not be construed to unduly limit this invention. Unless otherwise noted, all chemical procedures were carried out under a dry nitrogen atmosphere with dry and deoxygenated solvents and reagents. Unless otherwise noted, all solvents and reagents were or can be obtained from Aldrich Chemical Co., Milwaukee, Wis.

Rhodamine B hexafluoroantimonate was prepared by metathesis of Rhodamine B chloride with sodium hexafluoroantimonate. As used herein, SR368 refers to tris-(2-hydroxyethyl)isocyanurate triacrylate, (obtained from Sartomer Co. Inc., Exton, Pa.; SR9008 refers to a trifunctional acrylate ester (obtained from Sartomer); SR1012 refers to diaryliodonium hexafluoroantimonate (obtained from Sartomer); SU-8 R2150 refers to an epoxy negative photoresist (obtained from MicroChem Corp., Newton, Mass.); THF refers to tetrahydrofuran; LEXAN HPS1R refers to a thermoplastic polycarbonate (obtained from Sabic Innovative Plastics, Pittsfield, Mass.; and Inco S-Rounds refers to nickel (obtained from Vale Inco America's, Inc., Saddle Brook, N.J.).

Example 1

A circular silicon wafer (substrate 110 in FIG. 1A), 10.2 cm in diameter, was obtained from Wafer World, Inc., West Palm Beach, Fla. The Si wafer was cleaned by soaking it for approximately ten minutes in a 3:1 mixture by volume of concentrated sulfuric acid and 30% by weight aqueous hydrogen peroxide. The wafer was then rinsed with deionized water and then with isopropanol, after which it was dried under a stream of air. The wafer was then dipped into a two weight percent solution of 3-(trimethoxysilyl)propyl methacrylate in 190-proof ethanol that had been made acidic (pH between 4 and 5) with acetic acid. The wafer was then rinsed with absolute ethanol and was then heated in an oven at 130° C. for ten minutes.

Poly(methyl methacrylate), having a number average molecular weight of approximately 120,000, SR9008, and SR368 were combined in a weight ratio of 30:35:35 resulting in a monomer mixture that was dissolved in sufficient 1,2-dichloroethane to afford a solution that was 54 weight percent of the monomer mixture. To this solution there were then added aliquots of concentrated solutions of photosensitizer Rhodamine B hexafluoroantimonate in THF and SR1012 in THF sufficient to give a coating solution that was 0.5 weight percent Rhodamine B hexafluoroantimonate and 1.0 weight percent SR1012, based on the total weight of solids. This coating solution was filtered through a 1-micron syringe filter and was spin-coated onto the silicon wafer. The coated wafer was placed in a forced air oven at 60° C. for 18 hours to afford a coated silicon wafer with a substantially solvent-free (hereinafter, "dry") coating (layer 115 of the first material in FIG. 1A) having a thickness of approximately 300 μm.

Two-photon polymerization of the dry coating was carried out using a diode-pumped Ti:sapphire laser (obtained from Spectra-Physics, Mountain View, Calif.) that operated at 800 nm with a nominal pulse width of 80 fs, a pulse repetition rate of 80 MHz, and an average power of approximately 1 W. The coated wafer was placed on a computer-controlled three-axis stage (obtained from Aerotech, Inc., Pittsburgh, Pa.). The laser beam was attenuated by neutral density filters and was focused into the dry coating using a galvoscanner with a telescope for x-, y-, and z-axis control (available from Nuffield Technology, Inc., Windham, N.H.). A Nikon CFI Plan Achromat 50X oil objective N.A. 0.90 with a working distance of 0.400 mm and a 4.0 mm focal length was applied directly onto the surface of the dry coating. The average power was measured at the output of the objective lens using a wavelength-calibrated photodiode (obtained from Ophir Optronics, Ltd., Wilmington, Mass.) and was determined to be approximately 8 mW.

After the exposure scan was completed, the exposed dry coating was developed in MicroChem SU-8 developer, rinsed and dried resulting in a first microstructured pattern 121 (FIG. 1b).

The surface of the first microstructured pattern was made conductive by sputtering a thin layer (about 100 angstroms) of Silver (Ag) on the surface of the pattern. The metalized front surface was then electroplated with Inco S-Rounds (nickel) until it was approximately 2 mm thick. The electroplated nickel slug was then separated from the first pattern and ground and machined resulting in a first mold 140 having a second microstructured pattern 141 (FIG. 1F).

The first mold was then placed into an injection die mold which was placed into a single screw plastic injection molding system to inject thermoplastic polycarbonate (LEXAN HPS1R) into the mold cavity resulting in a second mold 160 having a third microstructured pattern 161 (FIG. 1H).

The front surface of the second mold was then metalized by sputtering the surface with about 100 angstroms of silver. The metalized second mold was then electroplated with Inco S-Rounds (nickel) to totally cover the third microstructured pattern resulting in a nickel layer 170 (FIG. 1J).

After rinsing the combined construction of the nickel layer and the second mold with deionized water, the front surface 172 (FIG. 1J) of the nickel layer was ground in a planar fashion to remove the nickel material from the tops 171 of the third microstructured pattern.

After the grinding was complete (all the microstructure tops were exposed), the electroplated nickel layer was separated from the polycarbonate mold 160 resulting in a nickel disc, approximately 8 mm in diameter and 160 μm thick having 37 through-holes arranged in a circular hexagonal packing arrangement. The separation between neighboring holes was about 200 μm. Each hole had a hole entry in the shape of a racetrack modified with fillets along the linear portions of the racetrack. The racetrack had a major diameter of about 80 μm and a minor diameter of about 50 μm. Each hole had a hole exit in the shape of a smaller racetrack with a major diameter of about 50 μm and a minor diameter of about 35 μm. Viewed from the hole exit side, the major diameters of the cross-section of the holes rotated clockwise from the hole exit to the hole entry by about 30 degrees for every 50 μm of depth below the hole exit.

As used herein, terms such as "vertical", "horizontal", "above", "below", "left" "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 1B is flipped as compared to the orientation in the figure, surface 126 is still considered to be the top surface.

MultiPhoton Description

Definitions

As used in this patent application:

"cure" means to effect polymerization and/or to effect crosslinking;

"electronic excited state" means an electronic state of a molecule that is higher in energy than the molecule's electronic ground state, that is accessible via absorption of electromagnetic radiation, and that has a lifetime greater than $10^{-13}$ seconds;

"exposure system" means an optical system plus a light source;

"master" means an originally-fabricated article that can be used to manufacture a tool for replication;

"multiphoton absorption" means simultaneous absorption of two or more photons to reach a reactive, electronic excited state that is energetically inaccessible by the absorption of a single photon of the same energy;

"numerical aperture" means the ratio of the diameter of a lens to its focal length (or 1/f number);

"optical system" means a system for controlling light, the system including at least one element chosen from refractive optical elements such as lenses, reflective optical elements such as mirrors, and diffractive optical elements such as gratings. Optical elements shall also include diffusers, waveguides, and other elements known in the optical arts;

"photochemically effective amounts" (of the components of the photoinitiator system) means amounts sufficient to enable the reactive species to undergo at least partial reaction under the selected exposure conditions (as evidenced, for example, by a change in density, viscosity, color, pH, refractive index, or other physical or chemical property);

"photosensitizer" means a molecule that lowers the energy required to activate a photoinitiator by absorbing light of lower energy than is required by the photoinitiator for activation and interacting with the photoinitiator to produce a photoinitiating species therefrom;

"simultaneous" means two events that occur within the period of $10^{-14}$ seconds or less;

"sufficient light" means light of sufficient intensity and appropriate wavelength to effect multiphoton absorption; and Multiphoton Reaction Molecular two-photon absorption was predicted by Goppert-Mayer in 1931. Upon the invention of pulsed ruby lasers in 1960, experimental observation of two-photon absorption became a reality. Subsequently, two-photon excitation has found application in biology and optical data storage, as well as in other fields.

There are two key differences between two-photon induced photoprocesses and single-photon induced processes. Whereas single-photon absorption scales linearly with the intensity of the incident radiation, two-photon absorption scales quadratically. Higher-order absorptions scale with a related higher power of incident intensity. As a result, it is possible to perform multiphoton processes with three-dimensional spatial resolution. Also, because multiphoton processes involve the simultaneous absorption of two or more photons, the absorbing chromophore is excited with a number of photons whose total energy equals the energy of an electronic excited state of the multiphoton photosensitizer that is utilized, even though each photon individually has insufficient energy to excite the chromophore. Because the exciting light is not attenuated by single-photon absorption within a curable matrix or material, it is possible to selectively excite molecules at a greater depth within a material than would be possible via single-photon excitation by use of a beam that is focused to that depth in the material. These two phenomena also apply, for example, to excitation within tissue or other biological materials.

Major benefits have been achieved by applying multiphoton absorption to the areas of photocuring and microfabrication. For example, in multiphoton lithography or stereolithography, the nonlinear scaling of multiphoton absorption with intensity has provided the ability to write features having a size that is less than the diffraction limit of the light utilized, as well as the ability to write features in three dimensions (which is also of interest for holography).

Multiphoton-initiated reactions that cause a change in solubility of a reactive material are useful in multiphoton microfabrication (also known as Two-Photon Fabrication). Such reactions may involve polymerization, crosslinking, depolymerization, or change in solubility due to reactions involving a transformation of functional groups, for example, from polar to non-polar, or non-polar to polar. Reactions are initiated by absorption of at least two-photons by a multiphoton photoinitiation system capable of undergoing simultaneous absorption of two or more photons to form free radicals and/or acid capable of initiating cationic or free radical reactions.

Exposure of multiphoton reactive compositions to sufficient light to form an image can be accomplished by focusing a beam from an appropriate laser system (see page 22-23, this document) within the multiphoton reactive composition. Reaction occurs in the vicinity of the focal point of the focused laser beam to cause a change in solubility of the exposed composition. The smallest region in which reaction occurs is a three-dimensional imaging element, or voxel. A single voxel is the smallest feature that can be fabricated by multiphoton lithography, and can have a size that is less than the diffraction limit utilized. The voxel can be as small as 100 nm or less, in x, y, and z, and as large as 10 microns or larger in z and 4 microns or larger in x and y, depending on the numeric aperture of the lens used to focus the laser beam. The directions x, y, and z, are the axes perpendicular to the beam path (x, y), or parallel to the beam path (z). Preferably, the voxel has at least one dimension that is less than 2 microns, preferably less than 1 micron, more preferably less than 0.5 microns, Reactive Species Reactive species suitable for use in the photoreactive compositions include both curable and non-curable species. Curable species are generally preferred and include, for example, addition-polymerizable monomers and oligomers and addition-crosslinkable polymers (such as free-radically polymerizable or crosslinkable ethylenically-unsaturated species including, for example, acrylates, methacrylates, and certain vinyl compounds such as styrenes), as well as cationically-polymerizable monomers and oligomers and cationically-crosslinkable polymers (which species are most commonly acid-initiated and which include, for example, epoxies, vinyl ethers, cyanate esters, etc.), and the like, and mixtures thereof.

Suitable ethylenically-unsaturated species are described, for example, by Palazzotto et al. in U.S. Pat. No. 5,545,676 at column 1, line 65, through column 2, line 26, and include mono-, di-, and poly-acrylates and methacrylates (for example, methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, trishydroxyethyl-isocyanurate trimethacrylate, the bis-acrylates and bis-methacrylates of polyethylene glycols of molecular weight about 200-500, copolymerizable mixtures of acrylated monomers such as those of U.S. Pat. No. 4,652,274, and acrylated oligomers such as those of U.S. Pat. No. 4,642,126); unsaturated amides (for example, methylene bis-acrylamide, methylene bis-methacrylamide, 1,6-hexamethylene bis-acrylamide, diethylene triamine tris-acrylamide and beta-methacrylaminoethyl methacrylate); vinyl compounds (for example, styrene, diallyl phthalate, divinyl succinate, divinyl adipate, and divinyl phthalate); and the like; and mixtures thereof. Suitable reactive polymers include polymers with pendant (meth)acrylate groups, for example, having from 1 to about 50 (meth)acrylate groups per polymer chain. Examples of such polymers include aromatic acid (meth)acrylate half ester resins such as Sarbox™ resins available from Sartomer (for example, Sarbox™ 400, 401, 402, 404, and 405). Other useful reactive polymers curable by free radical chemistry include those polymers that have a hydrocarbyl backbone and pendant peptide groups with free-radically polymerizable functionality attached thereto, such as those described in U.S. Pat. No. 5,235,015 (Ali et al.). Mixtures of two or more monomers, oligomers, and/or reactive polymers can be used if desired. Preferred ethylenically-unsaturated species include acrylates, aromatic acid (meth)acrylate half ester resins, and polymers that have a hydrocarbyl backbone and pendant peptide groups with free-radically polymerizable functionality attached thereto.

Suitable cationically-reactive species are described, for example, by Oxman et al. in U.S. Pat. Nos. 5,998,495 and 6,025,406 and include epoxy resins. Such materials, broadly called epoxides, include monomeric epoxy compounds and epoxides of the polymeric type and can be aliphatic, alicyclic, aromatic, or heterocyclic. These materials generally have, on the average, at least 1 polymerizable epoxy group per molecule (preferably, at least about 1.5 and, more preferably, at least about 2). The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendant epoxy groups (for example, a glycidyl methacrylate polymer or copolymer). The epoxides can be pure compounds or can be mixtures of compounds containing one, two, or more epoxy groups per molecule. These epoxy-containing materials can vary greatly in the nature of their backbone and substituent groups. For example, the backbone can be of any type and substituent groups thereon can be any group that does not substantially interfere with cationic cure at room temperature. Illustrative of permissible substituent groups include halogens, ester groups, ethers, sulfonate groups, siloxane groups, nitro groups, phosphate groups, and the like. The molecular weight of the epoxy-containing materials can vary from about 58 to about 100,000 or more.

Other epoxy-containing materials that are useful include glycidyl ether monomers of the formula

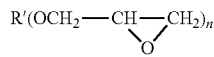

where R' is alkyl or aryl and n is an integer of 1 to 8. Examples are glycidyl ethers of polyhydric phenols obtained by reacting a polyhydric phenol with an excess of a chlorohydrin such as epichlorohydrin (for example, the diglycidyl ether of 2,2-bis-(2,3-epoxypropoxyphenol)-propane). Additional examples of epoxides of this type are described in U.S. Pat. No. 3,018,262, and in *Handbook of Epoxy Resins*, Lee and Neville, McGraw-Hill Book Co., New York (1967).

A number of commercially available epoxy monomers or resins can be used. Epoxides that are readily available include, but are not limited to, octadecylene oxide; epichlorohydrin; styrene oxide; vinylcyclohexene oxide; glycidol; glycidyl methacrylate; diglycidyl ethers of bisphenol A (for example, those available as "EPON 815C", "EPON 813", "EPON 828", "EPON 1004F", and "EPON 1001F" from Hexion Specialty Chemicals, Inc., Columbus, Ohio); and diglycidyl ether of bisphenol F (for example, those available as "ARALDITE GY281" from Ciba Specialty Chemicals Holding Company, Basel, Switzerland, and "EPON 862" from Hexion Specialty Chemicals, Inc.). Other aromatic epoxy resins include the SU-8 resins available from MicroChem Corp., Newton, Mass.

Other exemplary epoxy monomers include vinyl cyclohexene dioxide (available from SPI Supplies, West Chester, Pa.); 4-vinyl-1-cylcohexene diepoxide (available from Aldrich Chemical Co., Milwaukee, Wis.); 3,4-epoxycyclohexylmethyl-3,4-epoxycyclohexene carboxylate (for example, one available as "CYRACURE UVR-6110" from Dow Chemical Co., Midland, Mich.); 3,4-epoxy-6-methyl-cylcohexylmethyl-3,4-epoxy-6-methyl-cylcohexane carboxylate; 2-(3,4-epoxycyclohexyl-5,5-spiro-3,4-epoxy)cyclohexane-metadioxane; bis(3,4-epoxycyclohexylmethyl) adipate (for example, one available as "CYRACURE UVR-6128" from Dow Chemical Co.); bis(3,4-epoxy-6-methyl-clyclohexylmethyl)adipate; 3,4-epoxy-6-methylcyclohexane carboxylate; and dipentene dioxide.

Still other exemplary epoxy resins include epoxidized polybutadiene (for example, one available as "POLY BD 605E" from Sartomer Co., Inc., Exton, Pa.); epoxy silanes (for example, 3,4-epoxycylcohexylethyltrimethoxysilane and 3-glycidoxypropyltrimethoxysilane, commercially available from Aldrich Chemical Co., Milwaukee, Wis.); flame retardant epoxy monomers (for example, one available as "DER-542", a brominated bisphenol type epoxy monomer available from Dow Chemical Co., Midland, Mich.); 1,4-butanediol diglycidyl ether (for example, one available as "ARALDITE RD-2" from Ciba Specialty Chemicals); hydrogenated bisphenol A-epichlorohydrin based epoxy monomers (for example, one available as "EPONEX 1510" from Hexion Specialty Chemicals, Inc.); polyglycidyl ether of phenol-formaldehyde novolak (for example, one available as "DEN-431" and "DEN-438" from Dow Chemical Co.); and epoxidized vegetable oils such as epoxidized linseed and soybean oils available as "VIKOLOX" and "VIKOFLEX" from Atofina Chemicals (Philadelphia, Pa.).

Additional suitable epoxy resins include alkyl glycidyl ethers commercially available from Hexion Specialty Chemicals, Inc. (Columbus, Ohio) as "HELOXY". Exemplary monomers include "HELOXY MODFIER 7" (a $C_8$-$C_{10}$ alky glycidyl ether), "HELOXY MODIFIER 8" (a $C_{12}$-$C_{14}$ alkyl glycidyl ether), "HELOXY MODIFIER 61" (butyl glycidyl ether), "HELOXY MODIFIER 62" (cresyl glycidyl ether), "HELOXY MODIFIER 65" (p-tert-butylphenyl glycidyl ether), "HELOXY MODIFIER 67" (diglycidyl ether of 1,4-butanediol), "HELOXY 68" (diglycidyl ether of neopentyl glycol), "HELOXY MODIFIER 107" (diglycidyl ether of cyclohexanedimethanol), "HELOXY MODIFIER 44" (trimethylol ethane triglycidyl ether), "HELOXY MODIFIER 48" (trimethylol propane triglycidyl ether), "HELOXY MODIFIER 84" (polyglycidyl ether of an aliphatic polyol), and "HELOXY MODIFIER 32" (polyglycol diepoxide).

Other useful epoxy resins comprise copolymers of acrylic acid esters of glycidol (such as glycidyl acrylate and glycidyl methacrylate) with one or more copolymerizable vinyl compounds. Examples of such copolymers are 1:1 styrene-glycidyl methacrylate and 1:1 methyl methacrylate-glycidyl acrylate. Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate).

Useful epoxy-functional polymers include epoxy-functional silicones such as those described in U.S. Pat. No. 4,279,717 (Eckberg et al.), which are commercially available from the General Electric Company. These are polydimethylsiloxanes in which 1-20 mole % of the silicon atoms have been substituted with epoxyalkyl groups (preferably, epoxy cyclohexylethyl, as described in U.S. Pat. No. 5,753,346 (Leir et al.).

Blends of various epoxy-containing materials can also be utilized. Such blends can comprise two or more weight average molecular weight distributions of epoxy-containing compounds (such as low molecular weight (below 200), intermediate molecular weight (about 200 to 1000), and higher molecular weight (above about 1000)). Alternatively or additionally, the epoxy resin can contain a blend of epoxy-containing materials having different chemical natures (such as aliphatic and aromatic) or functionalities (such as polar and non-polar). Other cationically-reactive polymers (such as vinyl ethers and the like) can additionally be incorporated, if desired.

Preferred epoxies include aromatic glycidyl epoxies (for example, the EPON resins available from Hexion Specialty Chemicals, Inc. and the SU-8 resins available from Micro-Chem Corp., Newton, Mass.), and the like, and mixtures thereof. More preferred are the SU-8 resins and mixtures thereof.

Suitable cationically-reactive species also include vinyl ether monomers, oligomers, and reactive polymers (for example, methyl vinyl ether, ethyl vinyl ether, tert-butyl vinyl ether, isobutyl vinyl ether, triethyleneglycol divinyl ether (RAPI-CURE DVE-3, available from International Specialty Products, Wayne, N.J.), trimethylolpropane trivinyl ether, and the VECTOMER divinyl ether resins from Morflex, Inc., Greensboro, N.C. (for example, VECTOMER 1312, VECTOMER 4010, VECTOMER 4051, and VECTOMER 4060 and their equivalents available from other manufacturers)), and mixtures thereof. Blends (in any proportion) of one or more vinyl ether resins and/or one or more epoxy resins can also be utilized. Polyhydroxy-functional materials (such as those described, for example, in U.S. Pat. No. 5,856,373 (Kaisaki et al.)) can also be utilized in combination with epoxy- and/or vinyl ether-functional materials.

Non-curable species include, for example, reactive polymers whose solubility can be increased upon acid- or radical-induced reaction. Such reactive polymers include, for example, aqueous insoluble polymers bearing ester groups that can be converted by photogenerated acid to aqueous soluble acid groups (for example, poly(4-tert-butoxycarbonyloxystyrene). Non-curable species also include the chemically-amplified photoresists described by R. D. Allen et al. in "High Performance Acrylic Polymers for Chemically Amplified Photoresist Applications," J. Vac. Sci. Technol. B, 9, 3357 (1991). The chemically-amplified photoresist concept is now widely used for microchip manufacturing, especially with sub-0.5 micron (or even sub-0.2 micron) features. In such photoresist systems, catalytic species (typically hydrogen ions) can be generated by irradiation, which induces a cascade of chemical reactions. This cascade occurs when hydrogen ions initiate reactions that generate more hydrogen ions or other acidic species, thereby amplifying reaction rate. Examples of typical acid-catalyzed chemically-amplified photoresist systems include deprotection (for example, t-butoxycarbonyloxystyrene resists as described in U.S. Pat. No. 4,491,628, tetrahydropyran (THP) methacrylate-based materials, THP-phenolic materials such as those described in U.S. Pat. No. 3,779,778, t-butyl methacrylate-based materials such as those described by R. D Allen et al. in Proc. SPIE 2438, 474 (1995), and the like); depolymerization (for example, polyphthalaldehyde-based materials); and rearrangement (for example, materials based on the pinacol rearrangements).

If desired, mixtures of different types of reactive species can be utilized in the photoreactive compositions. For example, mixtures of free-radically-reactive species and cationically-reactive species are also useful.

Photoinitiator System

The photoinitiator system is a multiphoton photoinitiator system, as the use of such a system enables reaction to be confined or limited to the focal region of a focused beam of light. Such a system preferably is a two- or three-component system that comprises at least one multiphoton photosensitizer, at least one photoinitiator (or electron acceptor), and, optionally, at least one electron donor. Such multi-component systems can provide enhanced sensitivity, enabling photoreaction to be effected in a shorter period of time and thereby reducing the likelihood of problems due to movement of the sample and/or one or more components of the exposure system.

Preferably, the multiphoton photoinitiator system comprises photochemically effective amounts of (a) at least one multiphoton photosensitizer that is capable of simultaneously absorbing at least two photons and that, optionally but preferably, has a two-photon absorption cross-section greater than that of fluorescein; (b) optionally, at least one electron donor compound different from the multiphoton photosensitizer and capable of donating an electron to an electronic excited state of the photosensitizer; and (c) at least one photoinitiator that is capable of being photosensitized by accepting an electron from an electronic excited state of the photosensitizer, resulting in the formation of at least one free radical and/or acid.

Alternatively, the multiphoton photoinitiator system can be a one-component system that comprises at least one photoinitiator. Photoinitiators useful as one-component multi-photon photoinitiator systems include acyl phosphine oxides (for example, those sold by Ciba under the trade name Irgacure™ 819, as well as 2,4,6 trimethyl benzoyl ethoxyphenyl phosphine oxide sold by BASF Corporation under the trade name Lucirin™ TPO-L) and stilbene derivatives with covalently attached sulfonium salt moieties (for example, those described by W. Zhou et al. in Science 296, 1106 (2002)). Other conventional ultraviolet (UV) photoinitiators such as benzil ketal can also be utilized, although their multi-photon photoinitiation sensitivities will generally be relatively low.

Multiphoton photosensitizers, electron donors, and photoinitiators (or electron acceptors) useful in two- and three-component multiphoton photoinitiator systems are described below.

(1) Multiphoton Photosensitizers

Multiphoton photosensitizers suitable for use in the multiphoton photoinitiator system of the photoreactive compositions are those that are capable of simultaneously absorbing at least two photons when exposed to sufficient light. Preferably, the photosensitizers have a two-photon absorption cross-section greater than that of fluorescein (that is, greater than that of 3',6'-dihydroxyspiro[isobenzofuran-[(3H), 9'-[9H]xanthen]3-one). Generally, the preferred cross-section can be greater than about $50 \times 10^{-50}$ cm$^4$ sec/photon, as measured by the method described by C. Xu and W. W. Webb in J. Opt. Soc. Am. B, 13, 481 (1996) (which is referenced by Marder and Perry et al. in International Publication No. WO 98/21521 at page 85, lines 18-22).

More preferably, the two-photon absorption cross-section of the photosensitizer is greater than about 1.5 times that of fluorescein (or greater than about $75 \times 10^{-50}$ cm$^4$ sec/photon, as measured by the above method); even more preferably, greater than about twice that of fluorescein (or greater than about $100 \times 10^{-50}$ cm$^4$ sec/photon); most preferably, greater than about three times that of fluorescein (or, alternatively, greater than about $150 \times 10^{-50}$ cm$^4$ sec/photon); and optimally, greater than about four times that of fluorescein (or, alternatively, greater than about $200 \times 10^{-50}$ cm$^4$ sec/photon).

Preferably, the photosensitizer is soluble in the reactive species (if the reactive species is liquid) or is compatible with the reactive species and with any binders (as described below) that are included in the composition. Most preferably, the photosensitizer is also capable of sensitizing 2-methyl-4,6-bis(trichloromethyl)-s-triazine under continuous irradiation in a wavelength range that overlaps the single photon absorption spectrum of the photosensitizer (single photon absorption conditions), using the test procedure described in U.S. Pat. No. 3,729,313.

Preferably, a photosensitizer can also be selected based in part upon shelf stability considerations. Accordingly, selection of a particular photosensitizer can depend to some extent upon the particular reactive species utilized (as well as upon the choices of electron donor compound and/or photoinitiator).

Particularly preferred multiphoton photosensitizers include those exhibiting large multiphoton absorption cross-sections, such as Rhodamine B (that is, N-[9-(2-carboxyphenyl)-6-(diethylamino)-3H-xanthen-3-ylidene]-N-ethyl-ethanaminium chloride or hexafluoroantimonate) and the four classes of photosensitizers described, for example, by Marder and Perry et al. in International Patent Publication Nos. WO 98/21521 and WO 99/53242. The four classes can be described as follows: (a) molecules in which two donors are connected to a conjugated π (pi)-electron bridge; (b) molecules in which two donors are connected to a conjugated π (pi)-electron bridge which is substituted with one or more electron accepting groups; (c) molecules in which two acceptors are connected to a conjugated π (pi)-electron bridge; and (d) molecules in which two acceptors are connected to a conjugated π (pi)-electron bridge which is substituted with one or more electron donating groups (where "bridge" means a molecular fragment that connects two or more chemical groups, "donor" means an atom or group of atoms with a low ionization potential that can be bonded to a conjugated π (pi)-electron bridge, and "acceptor" means an atom or group of atoms with a high electron affinity that can be bonded to a conjugated π (pi)-electron bridge).

The four above-described classes of photosensitizers can be prepared by reacting aldehydes with ylides under standard Wittig conditions or by using the McMurray reaction, as detailed in International Patent Publication No. WO 98/21521.

Other compounds are described by Reinhardt et al. (for example, in U.S. Pat. Nos. 6,100,405, 5,859,251, and 5,770,737) as having large multiphoton absorption cross-sections, although these cross-sections were determined by a method other than that described above.

Preferred photosensitizers include the following compounds (and mixtures thereof):

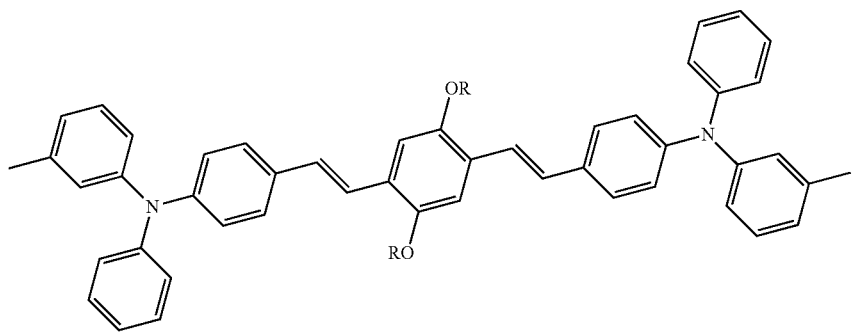

R = C$_{12}$H$_{25}$

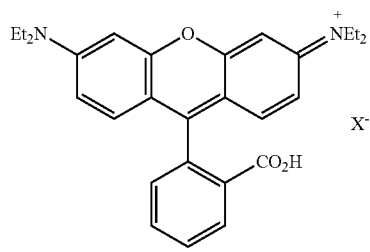

where X$^-$ = Cl$^-$, PF$_6^-$, SbF$_6^-$, AsF$_6^-$, BF$_4^-$, CF$_3$SO$_3^-$

-continued

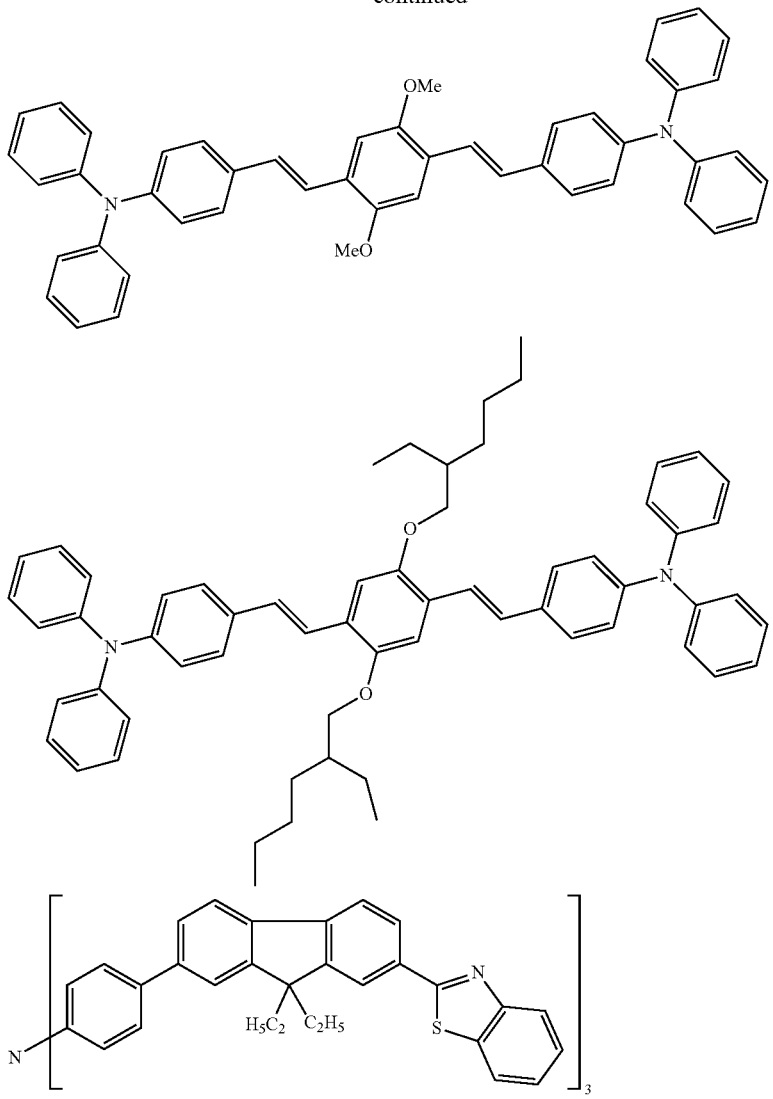

(2) Electron Donor Compounds

Electron donor compounds useful in the multiphoton photoinitiator system of the photoreactive compositions are those compounds (other than the photosensitizer itself) that are capable of donating an electron to an electronic excited state of the photosensitizer. Such compounds may be used, optionally, to increase the multiphoton photosensitivity of the photoinitiator system, thereby reducing the exposure required to effect photoreaction of the photoreactive composition. The electron donor compounds preferably have an oxidation potential that is greater than zero and less than or equal to that of p-dimethoxybenzene. Preferably, the oxidation potential is between about 0.3 and 1 volt vs. a standard saturated calomel electrode ("S.C.E.").

The electron donor compound is also preferably soluble in the reactive species and is selected based in part upon shelf stability considerations (as described above). Suitable donors are generally capable of increasing the speed of cure or the image density of a photoreactive composition upon exposure to light of the desired wavelength.

When working with cationically-reactive species, those skilled in the art will recognize that the electron donor compound, if of significant basicity, can adversely affect the cationic reaction. (See, for example, the discussion in U.S. Pat. No. 6,025,406 (Oxman et al.) at column 7, line 62, through column 8, line 49.)

In general, electron donor compounds suitable for use with particular photosensitizers and photoinitiators can be selected by comparing the oxidation and reduction potentials of the three components (as described, for example, in U.S. Pat. No. 4,859,572 (Farid et al.)). Such potentials can be measured experimentally (for example, by the methods described by R. J. Cox, *Photographic Sensitivity, Chapter 15*, Academic Press (1973)) or can be obtained from references such as N. L. Weinburg, Ed., *Technique of Electroorganic Synthesis Part II Techniques of Chemistry*, Vol. V (1975), and C. K. Mann and K. K. Barnes, *Electrochemical Reactions in Nonaqueous Systems* (1970). The potentials reflect relative energy relationships and can be used to guide electron donor compound selection.

Suitable electron donor compounds include, for example, those described by D. F. Eaton in *Advances in Photochemistry*, edited by B. Voman et al., Volume 13, pp. 427-488, John Wiley and Sons, New York (1986); by Oxman et al. in U.S. Pat. No. 6,025,406 at column 7, lines 42-61; and by Palazzotto et al. in U.S. Pat. No. 5,545,676 at column 4, line 14 through column 5, line 18. Such electron donor compounds include amines (including triethanolamine, hydrazine, 1,4-diazabicyclo[2.2.2]octane, triphenylamine (and its triphenylphosphine and triphenylarsine analogs), aminoaldehydes, and aminosilanes), amides (including phosphoramides), ethers (including thioethers), ureas (including thioureas), sulfinic acids and their salts, salts of ferrocyanide, ascorbic acid and its salts, dithiocarbamic acid and its salts, salts of xanthates, salts of ethylene diamine tetraacetic acid, salts of $(alkyl)_n(aryl)_m$borates (n+m=4) (tetraalkylammonium salts preferred), various organometallic compounds such as $SnR_4$ compounds (where each R is independently chosen from among alkyl, aralkyl (particularly, benzyl), aryl, and alkaryl groups) (for example, such compounds as $n-C_3H_7Sn(CH_3)_3$, $(allyl)Sn(CH_3)_3$, and $(benzyl)Sn(n-C_3H_7)_3$), ferrocene, and the like, and mixtures thereof. The electron donor compound can be unsubstituted or can be substituted with one or more non-interfering substituents. Particularly preferred electron donor compounds contain an electron donor atom (such as a nitrogen, oxygen, phosphorus, or sulfur atom) and an abstractable hydrogen atom bonded to a carbon or silicon atom alpha to the electron donor atom.

Preferred amine electron donor compounds include alkyl-, aryl-, alkaryl- and aralkyl-amines (for example, methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethyl-aminophenethanol and p-N-dimethylaminobenzonitrile); aminoaldehydes (for example, p-N,N-dimethylaminobenzaldehyde, p-N,N-diethylaminobenzaldehyde, 9-julolidine carboxaldehyde, and 4-morpholinobenzaldehyde); and aminosilanes (for example, trimethylsilylmorpholine, trimethylsilylpiperidine, bis(dimethylamino)diphenylsilane, tris(dimethylamino) methylsilane, N,N-diethylaminotrimethylsilane, tris (dimethylamino)phenylsilane, tris(methylsilyl)amine, tris (dimethylsilyl)amine, bis(dimethylsilyl)amine, N,N-bis (dimethylsilyl)aniline, N-phenyl-N-dimethylsilylaniline, and N,N-dimethyl-N-dimethylsilylamine); and mixtures thereof. Tertiary aromatic alkylamines, particularly those having at least one electron-withdrawing group on the aromatic ring, have been found to provide especially good shelf stability. Good shelf stability has also been obtained using amines that are solids at room temperature. Good photosensitivity has been obtained using amines that contain one or more julolidinyl moieties.

Preferred amide electron donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide, tripiperidinophosphine oxide, and mixtures thereof.

Preferred alkylarylborate salts include
$Ar_3B^-(n-C_4H_9)N^+(C_2H_5)_4$
$Ar_3B^-(n-C_4H_9)N^+(CH_3)_4$
$Ar_3B^-(n-C_4H_9)N^+(n-C_4H_9)_4$
$Ar_3B^-(n-C_4H_9)Li^+$
$Ar_3B^-(n-C_4H_9)N^+(C_6H_{13})_4$
$Ar_3B^--(C_4H_9)N^+(CH_3)_3(CH_2)_2CO_2(CH_2)_2CH_3$
$Ar_3B^--(C_4H_9)N^+(CH_3)_3(CH_2)_2OCO(CH_2)_2CH_3$
$Ar_3B^--(sec-C_4H_9)N^+(CH_3)_3(CH_2)_2CO_2(CH_2)_2CH_3$
$Ar_3B^--(sec-C_4H_9)N^+(C_6H_{13})_4$
$Ar_3B^--(C_4H_9)N^+(C_8H_{17})_4$
$Ar_3B^--(C_4H_9)N^+(CH_3)_4$
$(p-CH_3O-C_6H_4)_3B^-(n-C_4H_9)N^+(n-C_4H_9)_4$
$Ar_3B^--(C_4H_9)N^+(CH_3)_3(CH_2)_2OH$
$ArB^-(n-C_4H_9)_3N^+(CH_3)_4$
$ArB^-(C_2H_5)_3N^+(CH_3)_4$
$Ar_2B^-(n-C_4H_9)_2N^+(CH_3)_4$
$Ar_3B^-(C_4H_9)N^+(C_4H_9)_4$
$Ar_4B^-N^+(C_4H_9)_4$
$ArB^-(CH_3)_3N_+(CH_3)_4$
$(n-C_4B^-(C_4H_9)_4B^-N^+(CH_3)_4$
$Ar_3B^-(C_4H_9)P^+(C_4H_9)_4$
(where Ar is phenyl, naphthyl, substituted (preferably, fluoro-substituted) phenyl, substituted naphthyl, and like groups having greater numbers of fused aromatic rings), as well as tetramethylammonium n-butyltriphenylborate and tetrabutylammonium n-hexyl-tris(3-fluorophenyl)borate, and mixtures thereof.

Suitable ether electron donor compounds include 4,4'-dimethoxybiphenyl, 1,2,4-trimethoxybenzene, 1,2,4,5-tetramethoxybenzene, and the like, and mixtures thereof. Suitable urea electron donor compounds include N,N'-dimethylurea, N,N-dimethylurea, N,N'-diphenylurea, tetramethylthiourea, tetraethylthiourea, tetra-n-butylthiourea, N,N-di-n-butylthiourea, N,N'-di-n-butylthiourea, N,N-diphenylthiourea, N,N'-diphenyl-N,N'-diethylthiourea, and the like, and mixtures thereof.

Preferred electron donor compounds for free radical-induced reactions include amines that contain one or more julolidinyl moieties, alkylarylborate salts, and salts of aromatic sulfinic acids. However, for such reactions, the electron donor compound can also be omitted, if desired (for example, to improve the shelf stability of the photoreactive composition or to modify resolution, contrast, and reciprocity). Preferred electron donor compounds for acid-induced reactions include 4-dimethylaminobenzoic acid, ethyl 4-dimethylaminobenzoate, 3-dimethylaminobenzoic acid, 4-dimethylaminobenzoin, 4-dimethylaminobenzaldehyde, 4-dimethylaminobenzonitrile, 4-dimethylaminophenethyl alcohol, and 1,2,4-trimethoxybenzene.

(3) Photoinitiators (or Electron Acceptors)

Suitable photoinitiators (that is, electron acceptor compounds) for the reactive species of the photoreactive compositions are those that are capable of being photosensitized by accepting an electron from an electronic excited state of the multiphoton photosensitizer, resulting in the formation of at least one free radical and/or acid. Such photoinitiators include iodonium salts (for example, diaryliodonium salts), sulfonium salts (for example, triarylsulfonium salts optionally substituted with alkyl or alkoxy groups, and optionally having 2,2' oxy groups bridging adjacent aryl moieties), and the like, and mixtures thereof.

The photoinitiator is preferably soluble in the reactive species and is preferably shelf-stable (that is, does not spontaneously promote reaction of the reactive species when dissolved therein in the presence of the photosensitizer and the electron donor compound). Accordingly, selection of a particular photoinitiator can depend to some extent upon the particular reactive species, photosensitizer, and electron donor compound chosen, as described above. If the reactive species is capable of undergoing an acid-initiated chemical reaction, then the photoinitiator is an onium salt (for example, an iodonium or sulfonium salt).

Suitable iodonium salts include those described by Palazzotto et al. in U.S. Pat. No. 5,545,676 at column 2, lines 28 through 46. Suitable iodonium salts are also described in U.S. Pat. Nos. 3,729,313, 3,741,769, 3,808,006, 4,250,053 and 4,394,403. The iodonium salt can be a simple salt (for example, containing an anion such as Cl$^-$, Br$^-$, I$^-$ or $C_4H_5SO_3^-$) or a metal complex salt (for example, containing $SbF_6^-$, $PF_6^-$, $BF_4^-$, tetrakis(perfluorophenyl)borate, $SbF_5OH^-$ or $AsF_6^-$). Mixtures of iodonium salts can be used if desired.

Examples of useful aromatic iodonium complex salt photoinitiators include diphenyliodonium tetrafluoroborate; di(4-methylphenyl)iodonium tetrafluoroborate; phenyl-4-methylphenyliodonium tetrafluoroborate; di(4-heptylphenyl)iodonium tetrafluoroborate; di(3-nitrophenyl)iodonium hexafluorophosphate; di(4-chlorophenyl)iodonium hexafluorophosphate; di(naphthyl)iodonium tetrafluoroborate; di(4-trifluoromethylphenyl)iodonium tetrafluoroborate; diphenyliodonium hexafluorophosphate; di(4-methylphenyl)iodonium hexafluorophosphate; diphenyliodonium hexafluoroarsenate; di(4-phenoxyphenyl)iodonium tetrafluoroborate; phenyl-2-thienyliodonium hexafluorophosphate; 3,5-dimethylpyrazolyl-4-phenyliodonium hexafluorophosphate; diphenyliodonium hexafluoroantimonate; 2,2'-diphenyliodonium tetrafluoroborate; di(2,4-dichlorophenyl)iodonium hexafluorophosphate; di(4-bromophenyl)iodonium hexafluorophosphate; di(4-methoxyphenyl)iodonium hexafluorophosphate; di(3-carboxyphenyl)iodonium hexafluorophosphate; di(3-methoxycarbonylphenyl)iodonium hexafluorophosphate; di(3-methoxysulfonylphenyl)iodonium hexafluorophosphate; di(4-acetamidophenyl)iodonium hexafluorophosphate; di(2-benzothienyl)iodonium hexafluorophosphate; and diphenyliodonium hexafluoroantimonate; and the like; and mixtures thereof. Aromatic iodonium complex salts can be prepared by metathesis of corresponding aromatic iodonium simple salts (such as, for example, diphenyliodonium bisulfate) in accordance with the teachings of Beringer et al., *J. Am. Chem. Soc.* 81, 342 (1959).

Preferred iodonium salts include diphenyliodonium salts (such as diphenyliodonium chloride, diphenyliodonium hexafluorophosphate, and diphenyliodonium tetrafluoroborate), diaryliodonium hexafluoroantimonate (for example, SarCat™ SR 1012 available from Sartomer Company), and mixtures thereof.

Useful sulfonium salts include those described in U.S. Pat. No. 4,250,053 (Smith) at column 1, line 66, through column 4, line 2, which can be represented by the formulas:

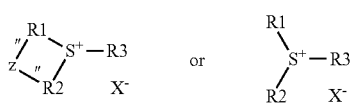

wherein $R_1$, $R_2$, and $R_3$ are each independently selected from aromatic groups having from about 4 to about 20 carbon atoms (for example, substituted or unsubstituted phenyl, naphthyl, thienyl, and furanyl, where substitution can be with such groups as alkoxy, alkylthio, arylthio, halogen, and so forth) and alkyl groups having from 1 to about 20 carbon atoms. As used here, the term "alkyl" includes substituted alkyl (for example, substituted with such groups as halogen, hydroxy, alkoxy, or aryl). At least one of $R_1$, $R_2$, and $R_3$ is aromatic, and, preferably, each is independently aromatic. Z is selected from the group consisting of a covalent bond, oxygen, sulfur, —S(=O)—, —C(=O)—, —(O=)S(=O)—, and —N(R)—, where R is aryl (of about 6 to about 20 carbons, such as phenyl), acyl (of about 2 to about 20 carbons, such as acetyl, benzoyl, and so forth), a carbon-to-carbon bond, or —(R$_4$—)C(—R$_5$)—, where $R_4$ and $R_5$ are independently selected from the group consisting of hydrogen, alkyl groups having from 1 to about 4 carbon atoms, and alkenyl groups having from about 2 to about 4 carbon atoms. X$^-$ is an anion, as described below.

Suitable anions, X$^-$, for the sulfonium salts (and for any of the other types of photoinitiators) include a variety of anion types such as, for example, imide, methide, boron-centered, phosphorous-centered, antimony-centered, arsenic-centered, and aluminum-centered anions.

Illustrative, but not limiting, examples of suitable imide and methide anions include $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $((CF_3)_2NC_2F_4SO_2)_2N^-$, $(CF_3)_2NC_2F_4SO_2C^-(SO_2CF_3)_2$, $(3,5$-bis$(CF_3)C_6H_3)SO_2N^-SO_2CF_3$, $C_6H_5SO_2C^-(SO_2CF_3)_2$, $C_6H_5SO_2N^-SO_2CF_3$, and the like. Preferred anions of this type include those represented by the formula $(R_fSO_2)_3C^-$, wherein $R_f$ is a perfluoroalkyl radical having from 1 to about 4 carbon atoms.

Illustrative, but not limiting, examples of suitable boron-centered anions include $F_4B^-$, $(3,5$-bis$(CF_3)C_6H_3)_4B^-$, $(C_6F_5)_4B^-$, $(p$-$CF_3C_6H_4)_4B^-$, $(m$-$CF_3C_6H_4)_4B^-$, $(p$-$FC_6H_4)_4B^-$, $(C_6F_5)_3(CH_3)B^-$, $(C_6F_5)_3(n$-$C_4H_9)B^-$, $(p$-$CH_3C_6H_4)_3(C_6F_5)B^-$, $(C_6F_5)_3FB^-$, $(C_6H_5)_3(C_6F_5)B^-$, $(CH_3)_2(p$-$CF_3C_6H_4)_2B$, $(C_6F_5)_3(n$-$C_{18}H_{37}O)B^-$, and the like. Preferred boron-centered anions generally contain 3 or more halogen-substituted aromatic hydrocarbon radicals attached to boron, with fluorine being the most preferred halogen. Illustrative, but not limiting, examples of the preferred anions include $(3,5$-bis$(CF_3)C_6H_3)_4B^-$, $(C_6F_5)_4B^-$, $(C_6F_5)_3(n$-$C_4H_9)B^-$, $(C_6F_5)_3FB^-$, and $(C_6F_5)_3(CH_3)B^-$.

Suitable anions containing other metal or metalloid centers include, for example, $(3,5$-bis$(CF_3)C_6H_3)_4Al^-$, $(C_6F_5)_4Al^-$, $(C_6F_5)_2F_4P^-$, $(C_6F_5)F_5P^-$, $(C_6F_5)F_5P^-$, $(C_6F_5)F_5Sb^-$, $F_6Sb^-$, $(HO)F_5Sb^-$, and $F_6As^-$. The foregoing lists are not intended to be exhaustive, as other useful boron-centered nonnucleophilic salts, as well as other useful anions containing other metals or metalloids, will be readily apparent (from the foregoing general formulas) to those skilled in the art.

Preferably, the anion, X$^-$, is selected from tetrafluoroborate, hexafluorophosphate, hexafluoroarsenate, hexafluoroantimonate, and hydroxypentafluoroantimonate (for example, for use with cationically-reactive species such as epoxy resins).

Examples of suitable sulfonium salt photoinitiators include:
triphenylsulfonium tetrafluoroborate
methyldiphenylsulfonium tetrafluoroborate
dimethylphenylsulfonium hexafluorophosphate
triphenylsulfonium hexafluorophosphate
triphenylsulfonium hexafluoroantimonate
diphenylnaphthylsulfonium hexafluoroarsenate
tritolylsulfonium hexafluorophosphate
anisyldiphenylsulfonium hexafluoroantimonate
4-butoxyphenyldiphenylsulfonium tetrafluoroborate
4-chlorophenyldiphenylsulfonium hexafluorophosphate
tri(4-phenoxyphenyl)sulfonium hexafluorophosphate
di(4-ethoxyphenyl)methylsulfonium hexafluoroarsenate
4-acetonylphenyldiphenylsulfonium tetrafluoroborate
4-thiomethoxyphenyldiphenylsulfonium hexafluorophosphate
di(methoxysulfonylphenyl)methylsulfonium hexafluoroantimonate
di(nitrophenyl)phenylsulfonium hexafluoroantimonate di(carbomethoxyphenyl)methylsulfonium hexafluorophosphate
4-acetamidophenyldiphenylsulfonium tetrafluoroborate
dimethylnaphthylsulfonium hexafluorophosphate
trifluoromethyldiphenylsulfonium tetrafluoroborate
p-(phenylthiophenyl)diphenylsulfonium hexafluoroantimonate
10-methylphenoxathiinium hexafluorophosphate
5-methylthianthrenium hexafluorophosphate
10-phenyl-9,9-dimethylthioxanthenium hexafluorophosphate
10-phenyl-9-oxothioxanthenium tetrafluoroborate
5-methyl-10-oxothianthrenium tetrafluoroborate
5-methyl-10,10-dioxothianthrenium hexafluorophosphate Preferred sulfonium salts include triaryl-substituted salts such as triarylsulfonium hexafluoroantimonate (for example, SarCat™ SR1010 available from Sartomer Company), triarylsulfonium hexafluorophosphate (for example, SarCat™ SR 1011 available from Sartomer Company), and triarylsulfonium hexafluorophosphate (for example, SarCat™ KI85 available from Sartomer Company).

Preferred photoinitiators include iodonium salts (more preferably, aryliodonium salts), sulfonium salts, and mixtures thereof. More preferred are aryliodonium salts and mixtures thereof.

Preparation of Photoreactive Composition

The reactive species, multiphoton photosensitizers, electron donor compounds, and photoinitiators can be prepared by the methods described above or by other methods known in the art, and many are commercially available. These four components can be combined under "safe light" conditions using any order and manner of combination (optionally, with stirring or agitation), although it is sometimes preferable (from a shelf life and thermal stability standpoint) to add the photoinitiator last (and after any heating step that is optionally used to facilitate dissolution of other components). Solvent can be used, if desired, provided that the solvent is chosen so as to not react appreciably with the components of the composition. Suitable solvents include, for example, acetone, dichloromethane, and acetonitrile. The reactive species itself can also sometimes serve as a solvent for the other components.

The three components of the photoinitiator system are present in photochemically effective amounts (as defined above). Generally, the composition can contain at least about 5% (preferably, at least about 10%; more preferably, at least about 20%) up to about 99.79% (preferably, up to about 95%; more preferably, up to about 80%) by weight of one or more reactive species; at least about 0.01% (preferably, at least about 0.1%; more preferably, at least about 0.2%) up to about 10% (preferably, up to about 5%; more preferably, up to about 2%) by weight of one or more photosensitizers; optionally, up to about 10% (preferably, up to about 5%) by weight of one or more electron donor compounds (preferably, at least about 0.1%; more preferably, from about 0.1% to about 5%); and from about 0.1% to about 10% by weight of one or more electron acceptor compounds (preferably, from about 0.1% to about 5%) based upon the total weight of solids (that is, the total weight of components other than solvent).

A wide variety of adjuvants can be included in the photoreactive compositions, depending upon the desired end use. Suitable adjuvants include solvents, diluents, resins, binders, plasticizers, pigments, dyes, inorganic or organic reinforcing or extending fillers (at preferred amounts of about 10% to 90% by weight based on the total weight of the composition), thixotropic agents, indicators, inhibitors, stabilizers, ultraviolet absorbers, and the like. The amounts and types of such adjuvants and their manner of addition to the compositions will be familiar to those skilled in the art.

It is within the scope of this invention to include nonreactive polymeric binders in the compositions in order, for example, to control viscosity and to provide film-forming properties. Such polymeric binders can generally be chosen to be compatible with the reactive species. For example, polymeric binders that are soluble in the same solvent that is used for the reactive species, and that are free of functional groups that can adversely affect the course of reaction of the reactive species, can be utilized. Binders can be of a molecular weight suitable to achieve desired film-forming properties and solution rheology (for example, molecular weights between about 5,000 and 1,000,000 Daltons; preferably between about 10,000 and 500,000 Daltons; more preferably, between about 15,000 and 250,000 Daltons). Suitable polymeric binders include, for example, polystyrene, poly (methyl methacrylate), poly(styrene)-co-(acrylonitrile), cellulose acetate butyrate, and the like.

Prior to exposure, the resulting photoreactive compositions can be coated on a substrate, if desired, by any of a variety of coating methods known to those skilled in the art (including, for example, knife coating and spin coating). The substrate can be chosen from a wide variety of films, sheets, and other surfaces (including silicon wafers and glass plates), depending upon the particular application and the method of exposure to be utilized. Preferred substrates are generally sufficiently flat to enable the preparation of a layer of photoreactive composition having a uniform thickness. For applications where coating is less desirable, the photoreactive compositions can alternatively be exposed in bulk form.

Exposure System and its Use

In carrying out the process of the invention, a photoreactive composition can be exposed to light under conditions such that multiphoton absorption occurs, thereby causing a region of differential solubility characteristics (for example, lesser or greater solubility in a particular solvent) as compared to the photoreactive composition prior to exposure. Such exposure can be accomplished by any known means capable of achieving sufficient intensity of the light.

One exemplary type of fabrication system that can be used includes a light source, an optical system comprising a final optical element (optionally including galvo-mirrors and a telescope to control beam divergence), and a moveable stage. The stage 16 is moveable in one, two, or, more typically, three dimensions. A substrate mounted on the stage has a layer of photoreactive composition thereon. A light beam originating from the light source passes through the optical system and leaves through the final optical element, which focuses it to a point P within the layer, thereby controlling the three-dimensional spatial distribution of light intensity within the composition and causing at least a portion of the photoreactive composition in the vicinity of point P to become more, or less, soluble in at least one solvent than it was immediately prior to exposure to the light beam. The portion of photoreactive composition exposed in the vicinity of point P causing a change in solubility is a three-dimensional imaging element, or voxel.

By moving the stage, or by directing the light beam (for example, moving a laser beam using galvo-mirrors and a telescope) in combination with moving one or more elements of the optical system, the focal point P can be scanned or translated in a three-dimensional pattern that corresponds to a desired shape. The resulting reacted or partially reacted portion of the photoreactive composition then creates a three-dimensional structure of the desired shape. For example, in a single pass the surface profile (corresponding to a thickness of about one volume pixel or voxel) of one or more hole forming features of a micronozzle mold pattern can be exposed or imaged, which upon development can be in the form of one or more nozzle hole forming features used to make a mold pattern of one or an array of micronozzles.

The exposure or imaging of the surface profile of the micronozzle mold pattern can be carried out by scanning at least the perimeter of a planar slice of a desired three-dimensional structure and then scanning a plurality of preferably parallel, planar slices to complete the structure. Slice thickness can be controlled to achieve a sufficiently high resolution for the shape of each nozzle hole forming feature. For example, smaller slice thicknesses can be desirable in regions of greater structure taper to aid in achieving high structure fidelity, but larger slice thicknesses can be utilized in regions of less structure taper to aid in maintaining useful fabrication times. In this way, highly detailed features having dimensions less than the slice thickness (preferably, less than about one-half of the slice thickness; more preferably, less than about one-quarter of the slice thickness) can be achieved without sacrificing fabrication speed (throughput or number of micronozzle mold patterns or arrays fabricated per unit time).

The light source can be any light source that produces sufficient light intensity to effect multiphoton absorption. Suitable sources include, for example, femtosecond near-infrared titanium sapphire oscillators (for example, those available from Coherent, Santa Clara, Calif., as "MIRA OPTIMA 900-F") pumped by an argon ion laser (for example, those available from Coherent as "INNOVA"). This laser, operating at 76 MHz, has a pulse width of less than 200 femtoseconds, is tunable between 700 and 980 nm, and has average power up to 1.4 Watts. Another useful laser is available from Spectra-Physics, Mountain View, Calif., under the trade designation "MAI TAI", tunable to wavelengths in a range of from 750 to 850 nanometers, and having a repetition frequency of 80 megahertz, and a pulse width of about 100 femtoseconds ($1\times10^{-13}$ sec), with an average power level up to 1 Watt.

However, any light source (for example, a laser) that provides sufficient intensity to effect multiphoton absorption at a wavelength appropriate for the multiphoton absorber used in the photoreactive composition can be utilized. Such wavelengths can generally be in the range of about 300 to about 1500 nm; preferably, from about 400 to about 1100 nm; more preferably, from about 600 to about 900 nm; more preferably, from about 750 to about 850 nm, inclusive. Typically, the light fluence (for example, peak intensity of a pulsed laser) is greater than about $10^6$ W/cm$^2$. The upper limit on the light fluence is generally dictated by the ablation threshold of the photoreactive composition. For example, Q-switched Nd:YAG lasers (for example, those available from Spectra-Physics as "QUANTA-RAY PRO"), visible wavelength dye lasers (for example, those available from Spectra-Physics as "SIRAH" pumped by a Q-switched Nd:YAG laser from Spectra-Physics having the trade designation "Quanta-Ray PRO"), and Q-switched diode pumped lasers (for example, those available from Spectra-Physics as "FCBAR") can also be utilized.

Preferred light sources are near infrared pulsed lasers having a pulse length less than about $10^{-8}$ second (more preferably, less than about $10^{-9}$ second; most preferably, less than about $10^{-11}$ second). Other pulse lengths can be used as long as the peak intensity and ablation threshold criteria above are met. Pulsed radiation can, for example, have a pulse frequency of from about one kilohertz up to about 50 megahertz, or even more. Continuous wave lasers can also be used.

The optical system can include, for example, refractive optical elements (for example, lenses or microlens arrays), reflective optical elements (for example, retroreflectors or focusing mirrors), diffractive optical elements (for example, gratings, phase masks, and holograms), polarizing optical elements (for example, linear polarizers and waveplates), dispersive optical elements (for example, prisms and gratings), diffusers, Pockels cells, waveguides, and the like. Such optical elements are useful for focusing, beam delivery, beam/mode shaping, pulse shaping, and pulse timing. Generally, combinations of optical elements can be utilized, and other appropriate combinations will be recognized by those skilled in the art. The final optical element can include, for example, one or more refractive, reflective, and/or diffractive optical elements. In one embodiment, an objective such as, for example, those used in microscopy can be conveniently obtained from commercial sources such as, for example, Carl Zeiss, North America, Thornwood, N.Y., and used as the final optical element. For example, the fabrication system can include a scanning confocal microscope (for example, those available from Bio-Rad Laboratories, Hercules, Calif., as "MRC600") equipped with a 0.75 numerical aperture (NA) objective (such as, for example, those available from Carl Zeiss, North America as "20X FLUAR").

It can often be desirable to use optics with relatively large numerical aperture to provide highly-focused light. However, any combination of optical elements that provides a desired intensity profile (and spatial placement thereof) can be utilized.

Exposure times generally depend upon the type of exposure system used to cause reaction of the reactive species in the photoreactive composition (and its accompanying variables such as numerical aperture, geometry of light intensity spatial distribution, the peak light intensity during the laser pulse (higher intensity and shorter pulse duration roughly correspond to peak light intensity)), as well as upon the nature of the photoreactive composition. Generally, higher peak light intensity in the regions of focus allows shorter exposure times, everything else being equal. Linear imaging or "writing" speeds generally can be about 5 to 100,000 microns/second using a laser pulse duration of about $10^{-8}$ to $10^{-15}$ second (for example, about $10^{-11}$ to $10^{-14}$ second) and about $10^2$ to $10^9$ pulses per second (for example, about $10^3$ to $10^8$ pulses per second).

In order to facilitate solvent development of the exposed photoreactive composition and obtain a fabricated micronozzle mold pattern structure, a threshold dose of light (that is, threshold dose) can be utilized. This threshold dose is typically process specific, and can depend on variables such as, for example, the wavelength, pulse frequency, intensity of the light, the specific photoreactive composition, the specific micronozzle mold pattern structure being fabricated, or the process used for solvent development. Thus, each set of process parameters can typically be characterized by a threshold dose. Higher doses of light than the threshold can be used, and can be beneficial, but higher doses (once above the threshold dose) can typically be used with a slower writing speed and/or higher light intensity.

Increasing the dose of light tends to increase the volume and aspect ratio of voxels generated by the process. Thus, in order to obtain voxels of low aspect ratio, it is generally preferable to use a light dose that is less than about 10 times the threshold dose, preferably less than about 4 times the threshold dose, and more preferably less than about 3 times the threshold dose. In order to obtain voxels of low aspect ratio, the radial intensity profile of the light beam is preferably Gaussian.

Through multiphoton absorption, the light beam induces a reaction in the photoreactive composition that produces a volume region of material having solubility characteristics different from those of the unexposed photoreactive composition. The resulting pattern of differential solubility can then be realized by a conventional development process, for example, by removing either exposed or unexposed regions.

The exposed photoreactive composition can be developed, for example, by placing the exposed photoreactive composition into solvent to dissolve regions of higher solvent solubility, by rinsing with solvent, by evaporation, by oxygen plasma etching, by other known methods, and by combinations thereof. Solvents that can be used for developing the exposed photoreactive composition include aqueous solvents such as, for example, water (for example, having a pH in a range of from 1 to 12) and miscible blends of water with organic solvents (for example, methanol, ethanol, propanol, acetone, acetonitrile, dimethylformamide, N-methylpyrrolidone, and the like, and mixtures thereof); and organic solvents. Exemplary useful organic solvents include alcohols (for example, methanol, ethanol, and propanol), ketones (for example, acetone, cyclopentanone, and methyl ethyl ketone), aromatics (for example, toluene), halocarbons (for example, methylene chloride and chloroform), nitriles (for example, acetonitrile), esters (for example, ethyl acetate and propylene glycol methyl ether acetate), ethers (for example, diethyl ether and tetrahydrofuran), amides (for example, N-methylpyrrolidone), and the like, and mixtures thereof.

An optional bake after exposure to light under multiphoton absorption conditions, but prior to solvent development, can be useful for some photoreactive compositions such as, for example, epoxy-type reactive species. Typical bake conditions include temperatures in a range of from about 40° C. to about 200° C., for times in a range of from about 0.5 minutes to about 20 minutes.

Optionally, after exposure of only the surface profile of a micronozzle mold pattern or array, preferably followed by solvent development, a nonimagewise exposure using actinic radiation can be carried out to effect reaction of the remaining unreacted photoreactive composition. Such a nonimagewise exposure can preferably be carried out by using a one-photon process.

Complex three-dimensional micronozzles and micronozzle arrays can be prepared in this manner.

Embodiments

Microstructure Embodiments

Referring to FIGS. 26A-26F, one embodiment of a nozzle hole forming feature or microstructure includes a circular base 806, along with a curved side 804 and planar control cavity forming feature 800 configured to form a circular-shaped hole outlet, as indicated by the shape of its microstructure top 802.

Figure 27:
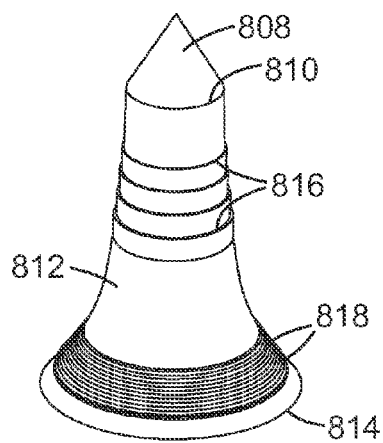
FIG. 27 is a schematic perspective-view of a nozzle hole forming microstructure, with a curved side and a planar control cavity forming feature configured to form a circular-shape hole outlet, where the curved side includes annular fluid flow- or output shape-control features.
Figure 28:
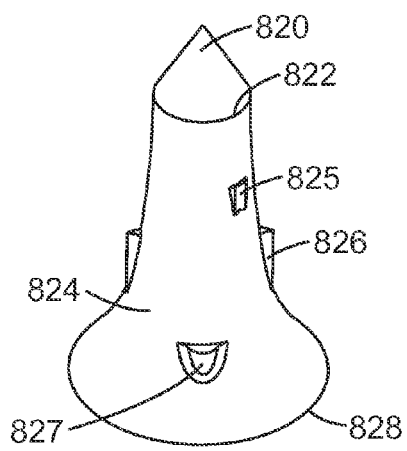
FIG. 28 is a schematic perspective-view of a nozzle hole forming microstructure, with a curved side and a planar control cavity forming feature configured to form a circular-shape hole outlet, where the curved side includes discrete source fluid flow- or output shape-control features.

Referring to FIG. 27, another embodiment of a nozzle hole forming feature or microstructure includes a circular base 814, along with a curved side 812 and planar control cavity forming feature 808 configured to form a circular-shape hole outlet, as indicated by the shape of its microstructure top 810. The curved side 812 includes a set of first annular fluid flow disruption features in the form of multiple circumferential grooves 816 that are spaced apart, parallel to each other and start about midway between the base 814 and the top 810. A second set of such features 818 are disposed adjacent to one another and formed next to the base 814. The nozzle hole forming feature or microstructure of FIG. 28 includes a circular base 828, along with a curved side 824 and planar control cavity forming feature 820 configured to form a circular-shape hole outlet, as indicated by the shape of its microstructure top 822. The curved side 824 includes a variety of discrete or point source fluid flow disruption features 825, 826 and 827. A fluid flow disruption feature is a feature that causes, when imparted to the inside surface of the nozzle through-hole, disruption of the fluid flowing through the nozzle through-hole. Such features can include, e.g., features that cause or induce any one or combination of (a) cavitations, (b) turbulence, (c) pressure waves in the fluid flowing through the nozzle through-hole and that results in changes to the fluid flowing beyond the nozzle hole outlet.

Figure 29:
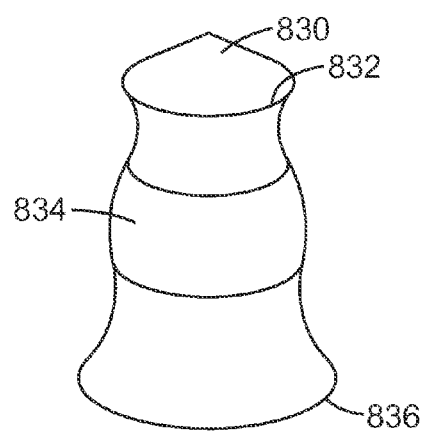
FIG. 29 is a schematic perspective-view of a nozzle hole forming microstructure, with a curved side and a planar control cavity forming feature configured to form a circular-shape hole outlet, where the curved side includes multiple converging/diverging fluid flow- or output shape-control features.
Figure 30:
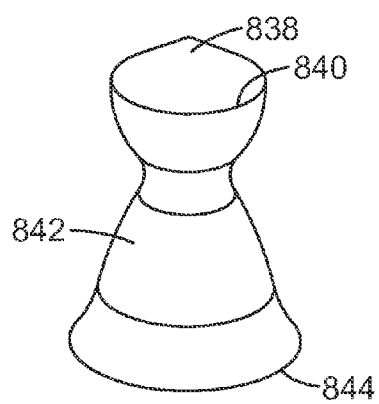
FIG. 30 is a schematic perspective-view of a nozzle hole forming microstructure, with a curved side and a planar control cavity forming feature configured to form a circular-shape hole outlet, where the curved side includes a single converging/diverging fluid flow- or output shape-control feature.

The nozzle hole forming microstructure of FIG. 29 includes a circular base 836, along with a curved side 834 and planar control cavity forming feature 830 configured to form a circular-shape hole outlet, as indicated by the shape of its microstructure top 832. The curved side 834 is configured so as to include dual or multiple converging/diverging fluid flow features that cause the fluid flowing through the corresponding nozzle through-hole to converge and diverge multiple times before exiting through the hole outlet. The nozzle hole forming microstructure of FIG. 30 likewise includes a circular base 844, along with a curved side 842 and planar control cavity forming feature 838 configured to form a circular-shape hole outlet, as indicated by the shape of its microstructure top 840. The curved side 842 is similarly structured as in the FIG. 29 embodiment, but with a single converging/diverging fluid flow feature that causes the fluid flowing through the nozzle through-hole to converge and diverge one time before exiting through the hole outlet.

Figure 31A:
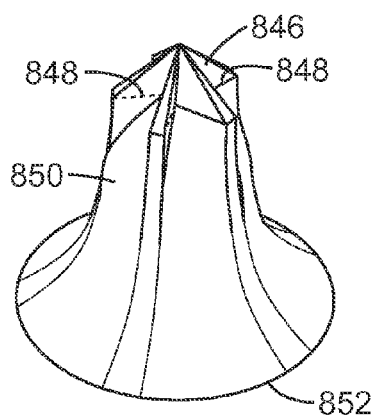
FIG. 31A is a schematic perspective-view of a nozzle hole forming microstructure, with a curved side and a planar control cavity forming feature configured to form a star-shape hole outlet.
Figure 31B:
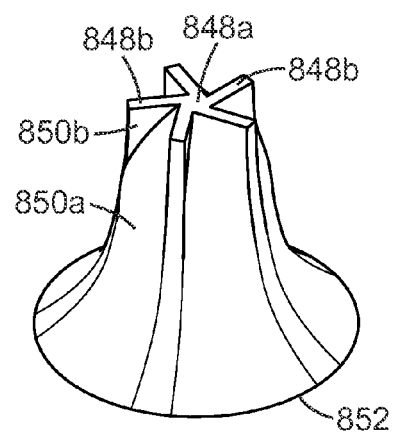
FIG. 31B is a schematic perspective-view of the microstructure of FIG. 31A with its planar control cavity forming feature removed.

Referring to FIGS. 31A and 31B, an alternative nozzle hole forming microstructure includes a circular base 852, along with a curvilinear side 850 and planar control cavity forming feature 846 configured to form a star-shape hole outlet, as indicated by the star-shape of its microstructure top 848. FIG. 31B shows the microstructure of FIG. 31A with its planar control cavity forming feature 846 removed to show the star-shape expected for the corresponding hole outlet. The star-shape top 848, and therefore the corresponding hole outlet, is defined by a plurality of rectangular shaped slots or branches 848*b* extending out from a core 848*a* like the spokes of a wheel. Five rectangular-shaped slots 848*b* are illustrated, but other branch shapes and a different number of branches may be desirable. The side 850 includes a curved section 850*a* and a linear section 850*b* for each of the branches 848*b*.

Figure 32A:
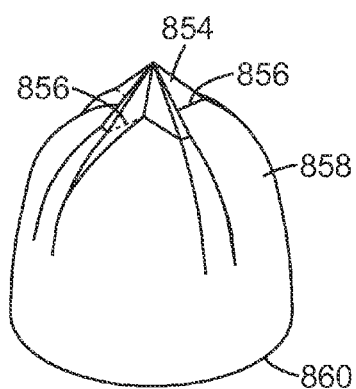
FIG. 32A is a schematic perspective-view of a nozzle hole forming microstructure, with a curvilinear side and a planar control cavity forming feature configured to form a cross-shape hole outlet.
Figure 32B:
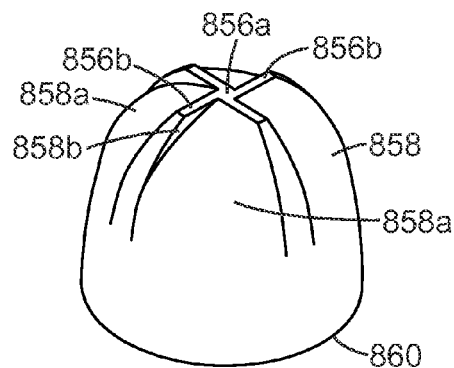
FIG. 32B is a schematic perspective-view of the microstructure of FIG. 32A with its planar control cavity forming feature removed.

The nozzle hole forming microstructure of FIGS. 32A and 32B includes a circular base 860, with a curvilinear side 858 and planar control cavity forming feature 854 configured to form a cross- or X-shape hole outlet, as indicated by the shape of its microstructure top 880. FIG. 32B shows the microstructure of FIG. 32A with its planar control cavity forming feature 854 removed to show the shape expected for the corresponding hole outlet. The top 856, and therefore the corresponding hole outlet, is defined by four rectangular shaped slots or branches 856*b* extending out from a core 856*a* like the spokes of a wheel. The side 858 includes a curved section 858*a* and a linear section 858*b* for each of the branches 856*b*.

Figure 33:
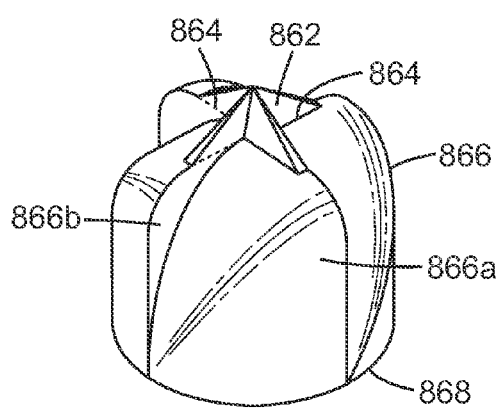
FIG. 33 is a schematic perspective-view of a nozzle hole forming microstructure, with a curvilinear side and a planar control cavity forming feature configured to form a cross-shape hole outlet.
Figure 34:
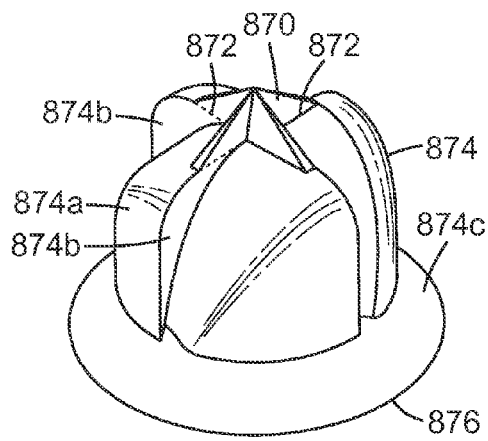
FIG. 34 is a schematic perspective-view of a nozzle hole forming microstructure, with a curvilinear side and a planar control cavity forming feature configured to form a cross-shape hole outlet.
Figure 35:
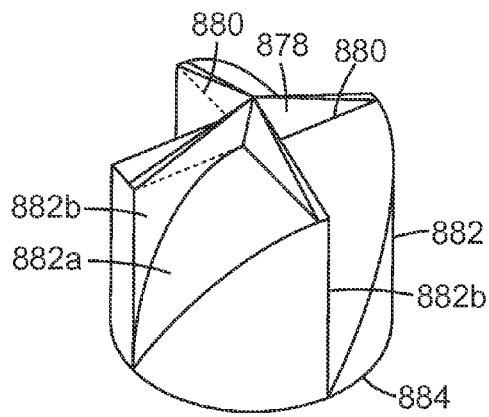
FIG. 35 is a schematic perspective-view of a nozzle hole forming microstructure, with a curvilinear side and a planar control cavity forming feature configured to form a cross-shape hole outlet.
Figure 36:
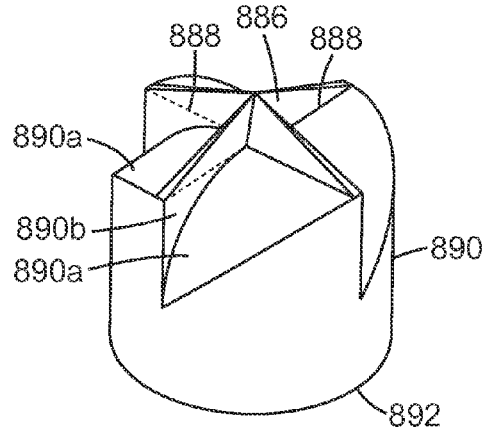
FIG. 36 is a schematic perspective-view of a nozzle hole forming microstructure, with a curvilinear side and a planar control cavity forming feature configured to form a cross-shape hole outlet.

Similarly, the nozzle hole forming microstructure of FIG. 33 includes a circular base 868, along with a curvilinear side 866 and planar control cavity forming feature 862 configured to form a cross- or X-shape hole outlet, as indicated by the shape of its microstructure top 864. The top 864, and therefore the corresponding hole outlet, is defined by four rectangular shaped slots or branches extending out from a core like the spokes of a wheel. The side 866 includes a curved section 866a and a linear section 866b for each of the branches. The nozzle hole forming microstructure of FIG. 34 includes a circular base 876, along with a curvilinear side 874 and planar control cavity forming feature 870 configured to form a cross- or X-shape hole outlet, as indicated by the shape of its microstructure top 872. The top 872, and therefore the corresponding hole outlet, is defined by four rectangular shaped slots or branches extending out from a core like the spokes of a wheel. The side 874 includes a curved section 874a and a linear section 874b for each of the branches. The base 876 is connected to the side 874 by a circumferential curved fillet 874c. The nozzle hole forming microstructure of FIG. 35 includes a circular base 884, along with a curvilinear side 882 and planar control cavity forming feature 878 configured to form a cross- or X-shape hole outlet, as indicated by the shape of its microstructure top 880. The top 880, and therefore the corresponding hole outlet, is defined by four rectangular shaped slots or branches extending out from a core like the spokes of a wheel. The side 882 includes a curved section 882a and a linear section 882b for each of the branches. The nozzle hole forming microstructure of FIG. 36 includes a base 892, along with a curvilinear side 890 and planar control cavity forming feature 886 configured to form a cross- or X-shape hole outlet, as indicated by the shape of its microstructure top 888. The top 888, and therefore the corresponding hole outlet, is defined by four rectangular shaped slots or branches extending out from a core like the spokes of a wheel. The side 890 includes a curved section 890a and a linear section 890b for each of the branches.

Figure 37:
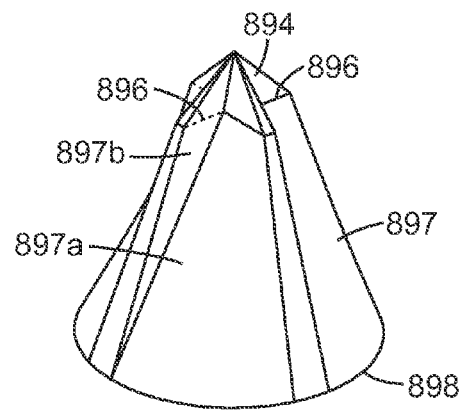
FIG. 37 is a schematic perspective-view of a nozzle hole forming microstructure, with a rectilinear side and a planar control cavity forming feature configured to form a cross-shape hole outlet.
Figure 38A:
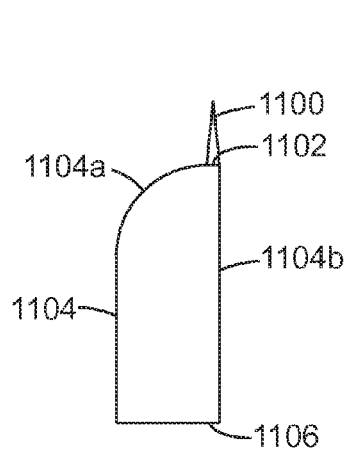
FIG. 38A is a schematic side-view of one embodiment of a nozzle hole forming microstructure, with a curvilinear side and a planar control cavity forming feature configured to form a rectangular slot-shape hole outlet.
Figure 38B:
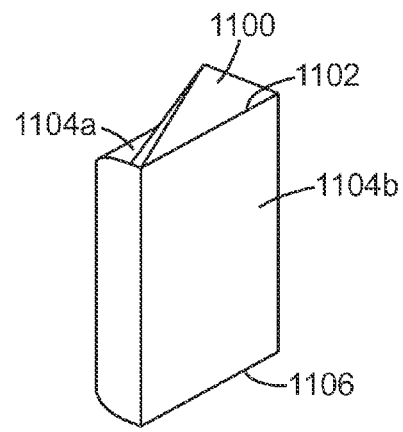
FIG. 38B is a schematic perspective-view of the microstructure of FIG. 38A.
Figure 38C:
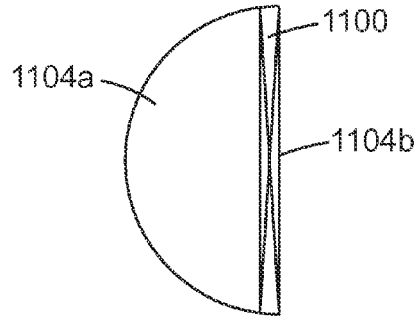
FIG. 38C is a schematic top-view of the microstructure of FIG. 38A.
Figure 38D:
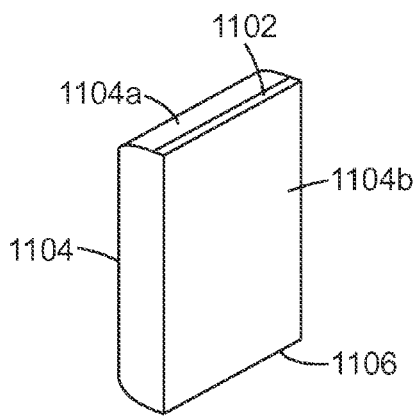
FIG. 38D is a schematic perspective-view of the microstructure of FIG. 38A with its planar control cavity forming feature removed.

In contrast, the nozzle hole forming microstructure of FIG. 37 includes a circular base 898, but with a rectilinear side 897 and planar control cavity forming feature 894 configured to form a cross- or X-shape hole outlet, as indicated by the shape of its microstructure top 896. The top 896, and therefore the corresponding hole outlet, is defined by four rectangular shaped slots or branches extending out from a core like the spokes of a wheel. The side 897 includes a first linear section 897a and a second linear section 897b for each of the branches.

Referring to FIGS. 38A-38D, a different embodiment of a nozzle hole forming microstructure includes a semicircular base 1106, along with a curvilinear side 1104 and planar control cavity forming feature 1100 configured to form a single rectangular slot-shape hole outlet, as indicated by the shape of its microstructure top 1102. The top 1102, and therefore the corresponding hole outlet, is defined by a single rectangular shaped slot. The side 1104 includes a single curved section 1104a and linear section 1104b.

It may be desirable to combine any two or more of the above described features into a given nozzle hole forming microstructure.

It is believed that the curvilinear side structures (i.e., each set of a curved and linear section) of the microstructures of FIGS. 31-36 and 38, as well as the rectilinear side structure of the FIG. 37 microstructure, will produce nozzle through-holes having corresponding inside surfaces that cause different portions of the fluid flowing therethrough to travel toward and reach its hole outlet at two or more different force vectors as a result of the fluid flowing along two or more different paths along the inside surface defining the nozzle through-hole. It is also believed that such different force vectors will result in shearing of the fluid as it exits the hole outlet, which in turn will cause smaller droplets of the fluid to eventually form out beyond the hole outlet. It is further theorized that increasing the shearing forces exerted on the fluid as it exits the hole outlet can produce even smaller droplets. For the nozzle through-holes having slots or branches extending out from a core like the spokes of a wheel (e.g., like the microstructures of FIGS. 31-37), it is also believed that such shearing forces will cause the fluid flowing out of each slot or branch to separate into a number of individual streams equal to the number of branches, as the fluid exits the hole outlet. It is further believed that each of these streams will eventually form into droplets that are smaller than the droplets formed from a circular or rectangular hole of the same total opening area of the branched hole outlet. These smaller droplets may be about or approximately as many times smaller as the number of branches forming the hole outlet, compared to the droplets formed from a single circular or rectangular hole outlet of the same total outlet opening area.

Figure 39A:
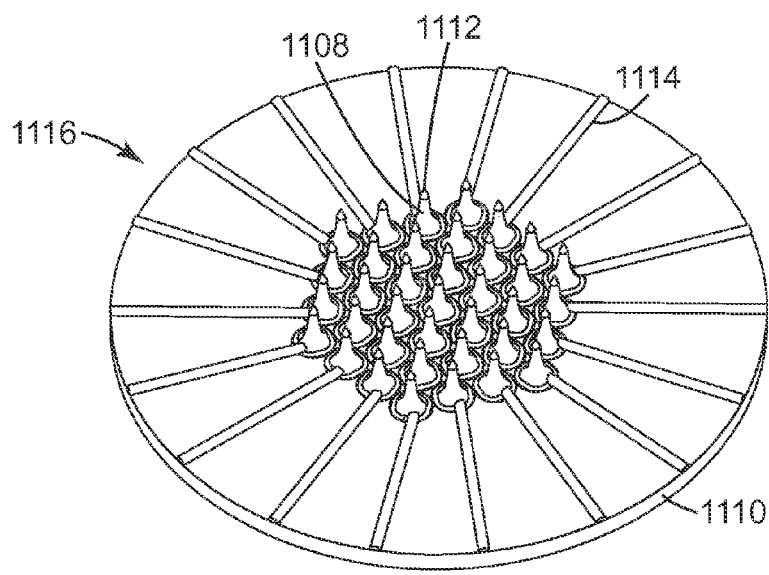
FIG. 39A is a schematic perspective-view of a mold forming microstructured pattern comprising a single centrally located group of replica nozzle hole forming microstructures, replica planar control cavity forming features, and replica additional fluid intake channel forming features.
Figure 39B:
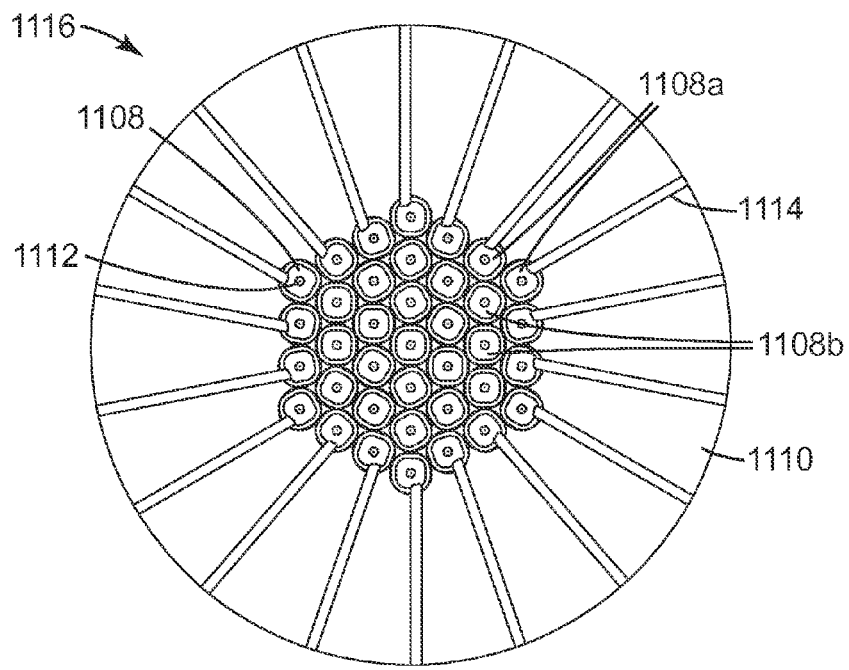
FIG. 39B is a schematic top-view of the mold forming microstructured pattern of FIG. 39A.
Figure 39C:
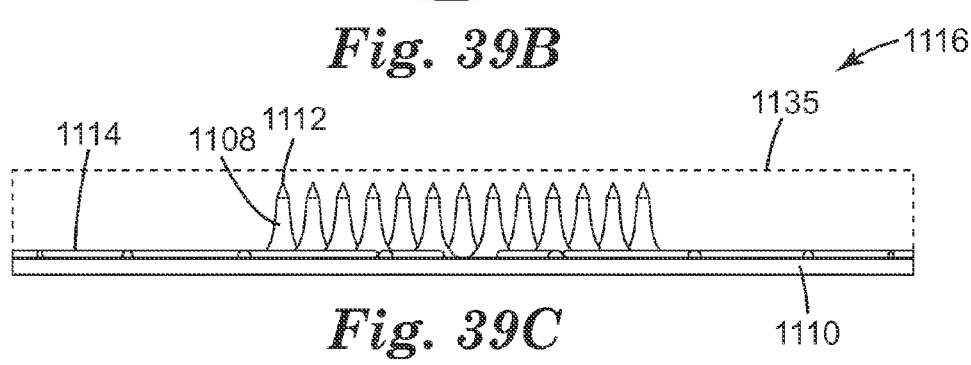
FIG. 39C is a schematic side-view of the mold forming microstructured pattern of FIG. 39A.
Figure 40A:
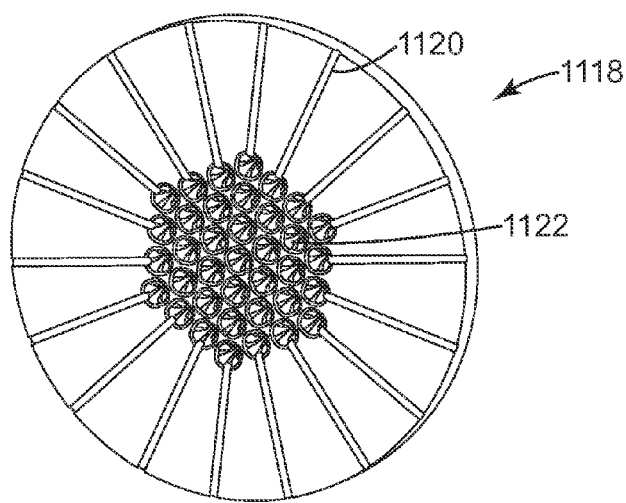
FIG. 40A is a schematic perspective-view of the bottom of a microstructured nozzle formed using the mold forming microstructured pattern of FIG. 39A, with the microstructured nozzle comprising a plurality of nozzle through-holes and additional fluid intake channels.
Figure 40B:
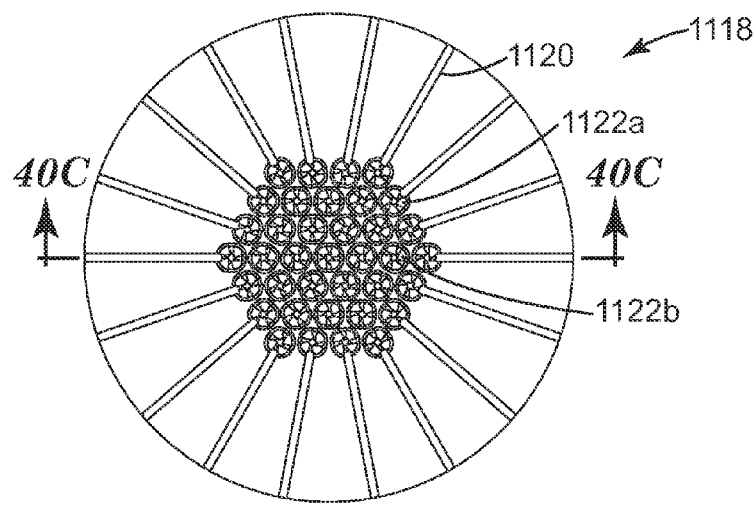
FIG. 40B is a schematic bottom-view of the microstructured nozzle of FIG. 40A.
Figure 40C:
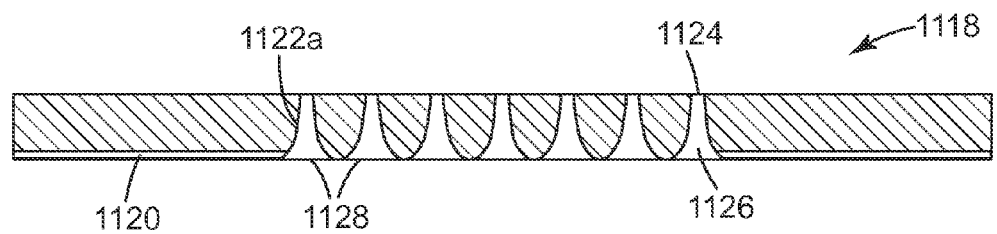
FIG. 40C is a schematic cross-sectional-view of the microstructured nozzle of FIG. 40B taken along line 40C-40C.

Referring to FIGS. 39A-39C, one embodiment of a mold forming microstructured pattern 1116 includes a single centrally located group or array of replica nozzle hole forming microstructures or features 1108, replica planar control cavity forming features 1112, and replica additional fluid intake channel forming features 1114. The microstructured pattern 1116 is formed on a substrate 1110 using a material 1135 capable of undergoing multiphoton reaction by simultaneously absorbing multiple photons, in accordance with the above teachings. Referring to FIGS. 40A-40C, a microstructured nozzle 1118 formed using the mold forming microstructured pattern 1116 of FIG. 39, includes a cluster of nozzle through-holes 1122 located at the center of the pattern 1116 and a set of spaced apart additional fluid intake channels 1120. Each through-hole 1122 includes an interior surface 1126 connecting a hole inlet 1128 to a hole outlet 1124. As can be seen, the hole inlets 1128 of the nozzle through-holes 1122 are closely packed together in the center of the nozzle plate 1118, while the hole outlets 1124 are spaced apart. This is possible, because the hole inlets 1128 are considerably larger in area than the hole outlets 1124. Each of the channels 1120 is connected to only one through-hole 1122a located on the outer periphery of the through-hole cluster. The remaining through-holes 1122b are not so connected to any channel 1120. The channels 1120 can be used to supply an additional fluid through the nozzle 1118 from a fluid source separate from that supplying the other through-holes 1122b.

Figure 41:
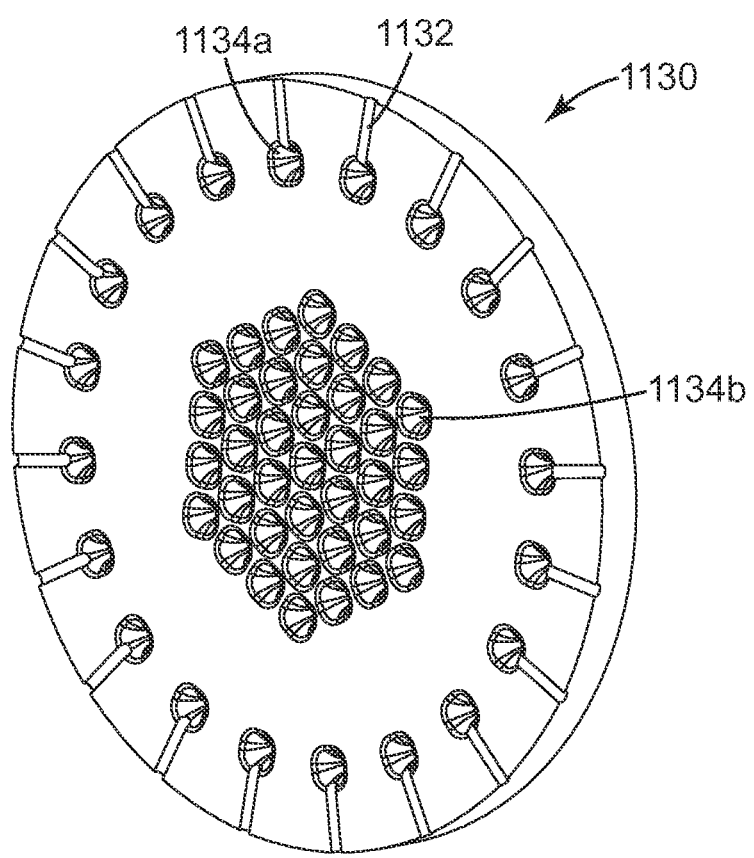
FIG. 41 is a schematic perspective-view of the bottom of a microstructured nozzle formed using a mold forming microstructured pattern according to the present invention, with the microstructured nozzle comprising a plurality of nozzle through holes and alternative additional fluid intake channels.

Because the through-hole outlets of the present nozzles can be very small in size (e.g., in diameter), the through-hole inlets of the inventive nozzles can be closely disposed or packed together, e.g., as shown in FIGS. 40 and 41. Such close packing of the through-hole inlets can at least reduce, and maybe even eliminate all, most or at least a substantial amount of, any detrimental back pressure exerted against the inlet side surface of the nozzle by the fluid passing through the nozzle, because such a close packing of the hole inlets can eliminate or at least significantly reduce the surface area between the through-hole inlet openings. With the hole inlets being larger than the hole outlets, the reduction in back pressure is also facilitated by using through-holes that have interior walls that taper down or otherwise include a curved arc from the hole inlet to the hole outlet.

The microstructured nozzle 1130 of FIG. 41 includes an alternative pattern of nozzle through holes 1134 and alternative additional fluid intake channels 1132. As can be seen, there are two groups or arrays of nozzle through-holes 1132. One group of through-holes 1134*a* is in a circular pattern located adjacent to the outer circumferential periphery of the nozzle plate 1130. The other group of through-holes 1134*b* is centrally located on the nozzle 1130. Each of the additional fluid intake channels 1132 is only connected to one of the through-holes 1134*a* forming the outer ring of nozzle through-holes.

Figure 42A:
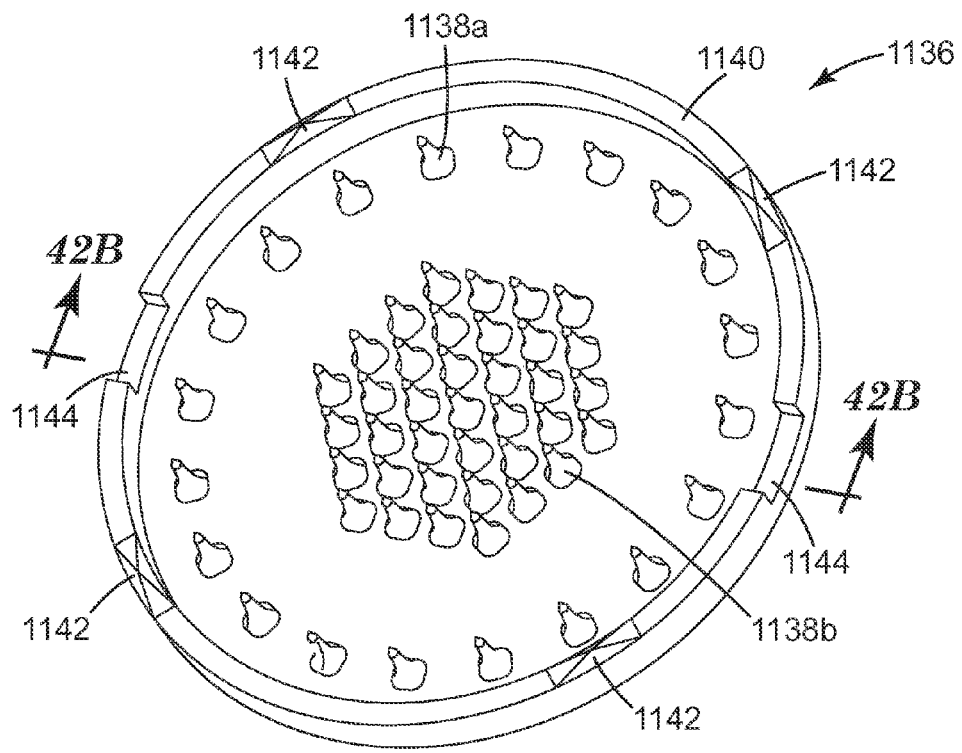
FIG. 42A is a schematic perspective-view of a mold forming microstructured pattern comprising two groups of replica nozzle hole forming microstructures with corresponding replica planar control cavity forming features, and a nozzle separation feature with an additional set of replica planar control cavity forming features.
Figure 42B:
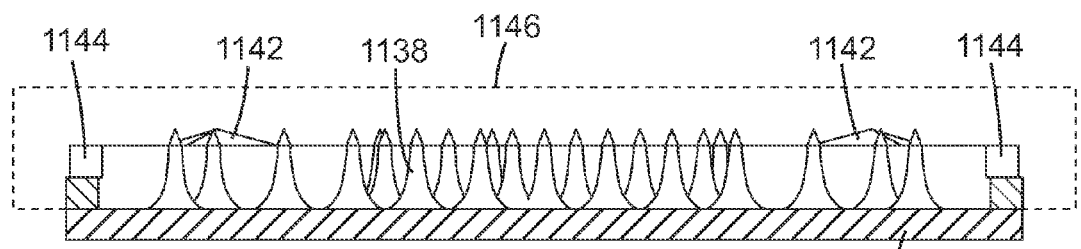
FIG. 42B is a schematic side-view of the mold forming microstructured pattern of FIG. 42A.
Figure 43A:
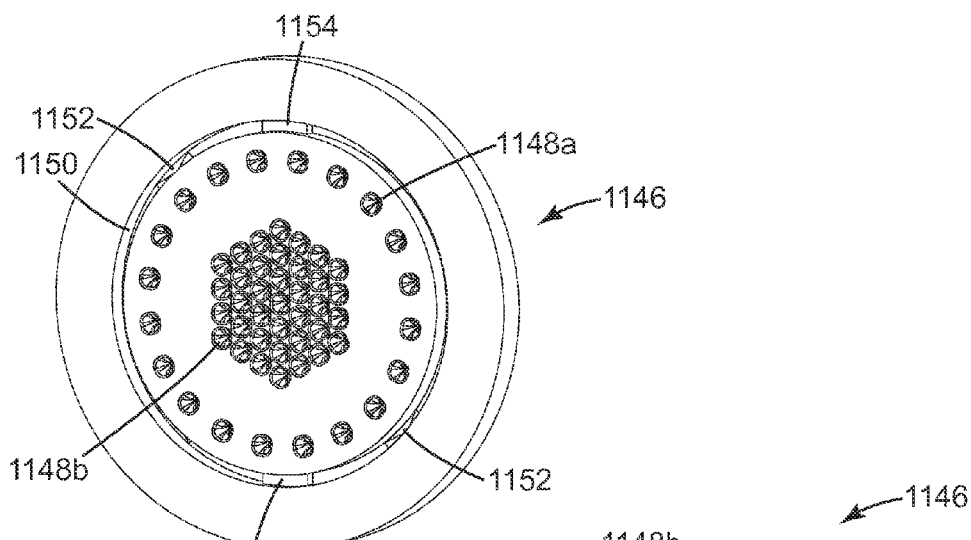
FIG. 43A is a schematic perspective-view of the top of a microstructured mold pattern made using the mold forming microstructured pattern of FIG. 42A.
Figure 43B:
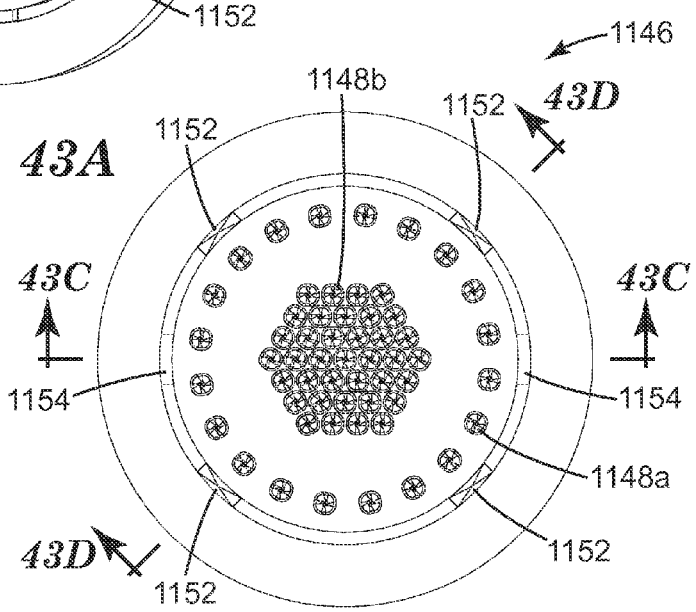
FIG. 43B is a schematic top-view of the microstructured mold pattern of FIG. 43A.
Figure 43C:
FIG. 43C is a schematic cross-sectional-view of the microstructured mold pattern of FIG. 43B taken along line 43C-43C.
Figure 43D:
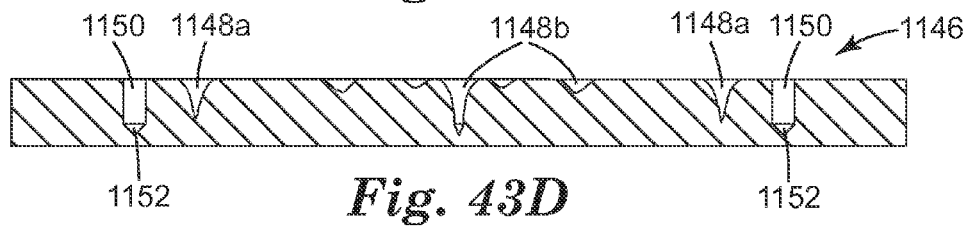
FIG. 43D is a schematic cross-sectional-view of the microstructured mold pattern of FIG. 43B taken along line 43D-43D.

Referring to FIGS. 42A and 42B, another embodiment of a mold forming microstructured pattern 1136 includes two groups or arrays of replica nozzle hole forming microstructures or features 1138, with corresponding replica planar control cavity forming features being optional, and a replica ring-shaped nozzle separation feature 1140 with an additional or alternative set of at least 3 and preferably 4 replica planar control cavity forming features 1142 disposed on the replica separation ring 1140. One group of replica nozzle hole forming microstructures 1138*a* is in a circular pattern located adjacent to the separation ring 1140, and the other group of replica nozzle hole forming microstructures 1138*b* is centrally located on the mold forming microstructured pattern 1136. The microstructured pattern 1136 is formed on a substrate 1110 in accordance with the above teachings. When the replica planar control cavity forming features 1142 are formed on the replica separation ring 1140, the replica nozzle hole forming microstructures 1138 may not require their own replica planar control cavity forming feature. Alternatively, instead of using the features 1142 or using a replica planar control cavity forming feature for each microstructure 1138, the number of replica nozzle hole forming microstructures 1138 having a replica planar control cavity forming feature may be limited to at least 3 and preferably 4. For ease of manufacturing, the replica separation ring 1140 can include two or more replica nozzle connecting features 1144, which are used when it is desirable to manufacture a batch of nozzles at one time, rather one at a time. This feature 1144 will be discussed in more detail below. The mold forming microstructured pattern 1136 can be used to form a microstructured mold pattern or first mold 1146 (shown in phantom).

Referring to FIGS. 43A-43D, the microstructured mold pattern or first mold 1146, made using the mold forming microstructured pattern 1136 of FIG. 42, is a negative image of the pattern 1136, with the first mold 1146 having a corresponding outer ring of replica nozzle holes 1148*a*, a central cluster of replica nozzle holes 1148*b*, and an annular separation channel 1150 that includes a matching number of replica planar control cavities 1152 and nozzle connecting grooves 1154.

Figure 44A:
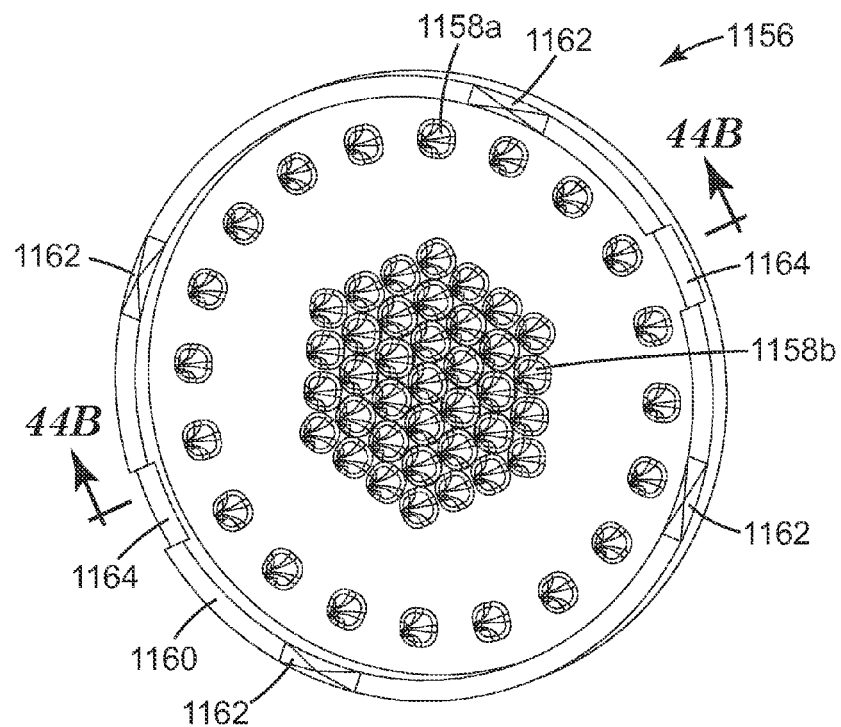
FIG. 44A is a schematic perspective-view of a nozzle forming microstructured pattern made using the microstructured mold pattern of FIG. 43A.
Figure 44B:
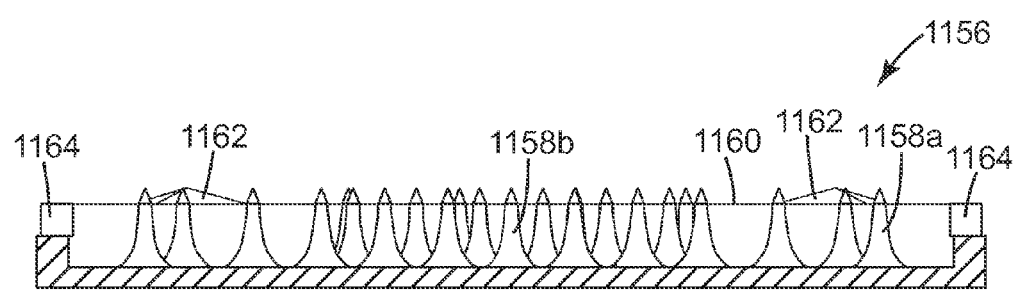
FIG. 44B is a schematic cross-sectional-view of the nozzle forming microstructured pattern of FIG. 44A taken along line 44B-44B.

Referring to FIGS. 44A and 44B, a nozzle forming microstructured pattern 1156 is made by using the microstructured mold pattern 1146 of FIG. 43. The pattern 1156 includes two groups or arrays of nozzle hole forming microstructures or features 1158, with corresponding planar control cavity forming features being optional, and a ring-shaped nozzle separation feature 1160 with an additional or alternative set of at least 3 and preferably 4 planar control cavity forming features 1162 disposed on the separation ring 1160. One group of nozzle hole forming microstructures 1158*a* is in a circular pattern located adjacent to the separation ring 1160, and the other group of nozzle hole forming microstructures 1158*b* is centrally located on the microstructured mold pattern 1146. The microstructured mold pattern 1146 is a unitary structure formed, e.g., by injection molding using the microstructured mold pattern 1146 in accordance with the above teachings. When the planar control cavity forming features 1162 are formed on the separation ring 1160, the nozzle hole forming microstructures 1158 may not require their own replica planar control cavity forming feature. Alternatively, instead of using the features 1162 or using a planar control cavity forming feature for each microstructure 1158, the number of nozzle hole forming microstructures 1158 having a planar control cavity forming feature may be limited to at least 3 and preferably 4.

Figure 45:
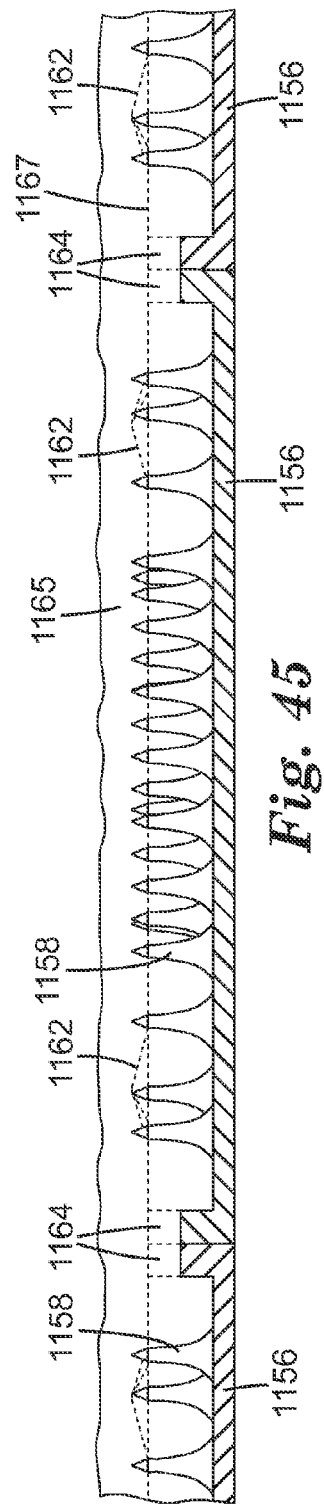
FIG. 45 is a schematic cross-sectional-view of a linear array of the nozzle forming microstructured pattern of FIG. 44A taken along line 44B-44B, with a linear array of nozzle pre-forms formed therein.
Figure 46:
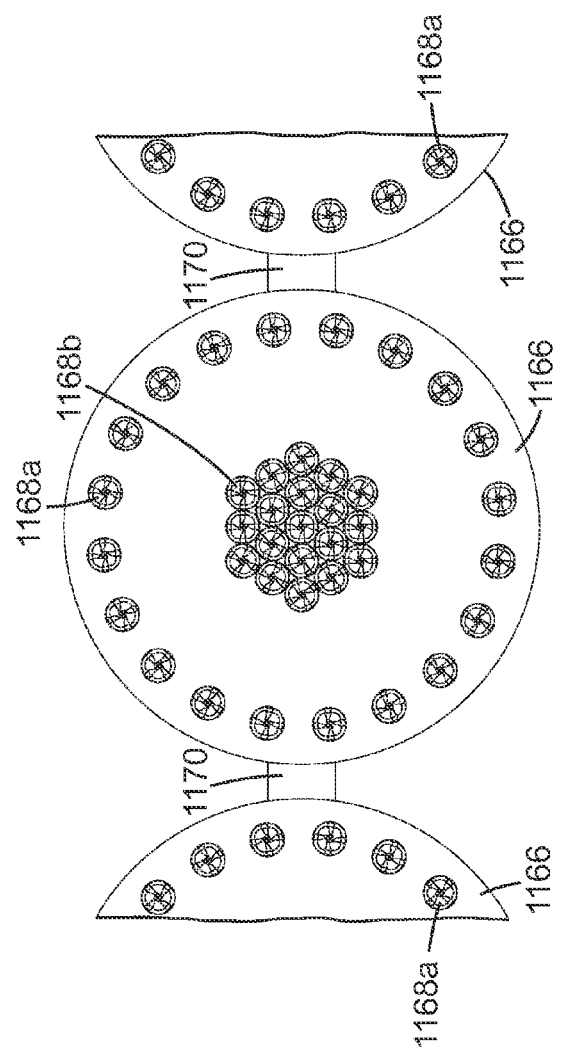
FIG. 46 is a schematic bottom-view of a linear array of connected nozzles, which are formed from the array of nozzle pre-forms of FIG. 45 and readily separable from each other.

For ease of manufacturing, the separation ring 1160 can include two or more nozzle connecting features 1164, which are used when it is desirable to manufacture a batch of nozzles at one time, rather one nozzle at a time. For example, the linear array of any desired length of connected nozzles 1166 of FIG. 46 can be made by first aligning a linear array of the nozzle forming microstructured patterns 1156 at their respective connecting features 1164, as shown in FIG. 45. Likewise, a planar array of any desired area of connected nozzles 1166 (not shown) can also be made by forming the necessary number of additional connecting features 1164 on each separation ring 1160 to form at least one connecting feature or runner 1170 between adjacent nozzles 1166. The number and location of the connecting features 1164 will depend on the desired packing pattern used for positioning the individual nozzle forming microstructured patterns 1156 (e.g., hexagonal close-packed, cubic, etc.) A corresponding array of nozzle pre-forms 1165 is then formed, e.g., by depositing a suitable material into each of the adjoining patterns 1156. Next, the array of pre-forms 1165 has its exposed surface planarized down to the level 1167 needed to uncover the desired size hole outlet for each of the nozzle through-holes 1168*a* and 1168*b*, which are formed by corresponding hole forming features 1158*a* and 1158*b* of the pattern 1156. Because of the connecting features 1164, the resulting array of nozzles 1166 are connected by runners or connecting features 1170 that can be readily severed (e.g., by braking, cutting, etc.) to separate the individual nozzles 1166. Thus, the entire array of resulting nozzles 1166 can be removed from the array of patterns 1156 in one piece, and individual nozzles 1166 removed as desired.

Figure 47:
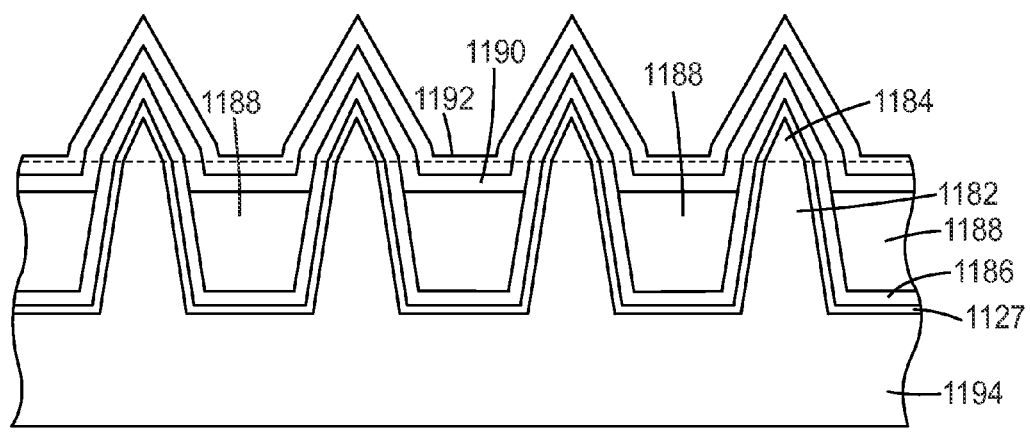
FIG. 47 is a schematic cross-sectional side-view of a nozzle forming microstructured pattern and a corresponding multi-component nozzle pre-form deposited thereon.

FIG. 47 is a schematic cross-sectional side-view of a nozzle forming microstructured pattern and a corresponding multi-component nozzle pre-form deposited thereon;

Referring to FIG. 47, in making a nozzle pre-form (e.g., see FIG. 1J), one or more initial layers 1127 and 1186 of one or more materials can be deposited or otherwise applied onto a nozzle forming microstructured pattern 1194, having nozzle hole forming features 1182 and planar control cavity forming features 1184, so as to form the inlet side surface of the resulting nozzle pre-form (i.e., nozzle), including the inside surface of the nozzle pre-form holes (i.e., nozzle through-holes). One or more other layers 1188, 1190 and 1192 of one or more other materials can then be deposited to complete the forming of the nozzle pre-form. The corresponding nozzle can then be made as described above by removing the features 1184 and corresponding applied materials along the dashed line. Likewise, additionally or alternatively, in making a microstructured mold pattern or first mold (e.g., see FIG. 1D), the initial layers 1127 and 1186 can be deposited or otherwise applied so as to form the inlet side surface of the first mold. The other layers 1188, 1190 and 1192 can be deposited or otherwise applied in the same or a different manner so as to form the bulk or remainder of the first mold.

By way of example only, the layer 1127 can be a seed layer to impart electrical conductivity to the surface of the microstructured pattern 1194. The next layer 1186 can be a structural and/or performance imparting layer. Layer 1188 can be a bulk layer that makes up a large portion or all of the remainder of the nozzle and/or first mold. One or both layers 1190 and 1192 can then be optional or applied to impart desired structural and/or performance characteristics to the remained of the nozzle and/or first mold.

In this way, for example, the first mold and/or the nozzle can have an inlet side surface formed by a higher performance and/or more expensive material (e.g., high temperature corrosion and/or wear resistant metal that is electrodeposited), with the bulk or remainder of the first mold and/or nozzle being formed using a lower performance and/or less expensive material. Thus, less expensive materials can be used to make the bulk of the first mold and/or nozzle without having to substantially sacrifice performance. The present process for making fuel injector nozzles can also be more efficient (e.g., by involving fewer steps) and be less expensive than existing conventional nozzle manufacturing processes that use near net shape molding, with through-hole machining.

Figure 48:
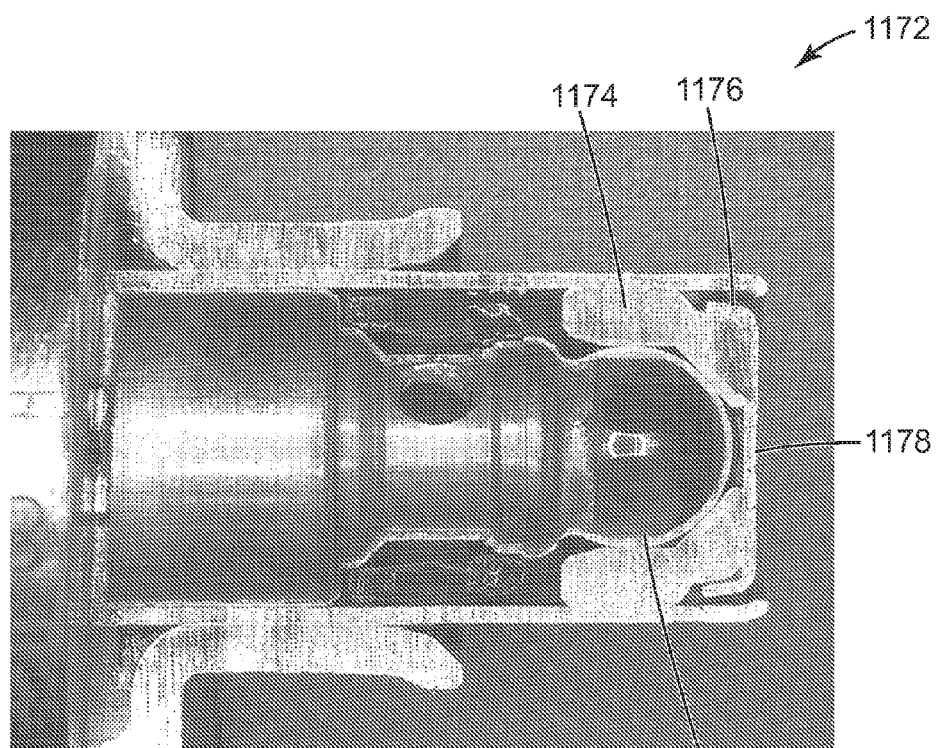
FIG. 48 is a photograph of a cross-sectioned conventional fuel injector.

Referring to FIG. 48, the nozzles of the present invention can be used in a conventional fuel injector 1172, which includes a control valve 1180 that seals against a seal 1174 and a nozzle plate 1178 typically welded along its periphery 1176 to the seal 1174, with the nozzle 1178 having a group of through-holes 1178.

Additional Embodiments

Method Embodiments

1. A method of making a nozzle, the method comprising:

(a) providing a microstructured mold pattern defining at least a portion of a mold cavity and comprising a plurality of replica nozzle holes and replica planar control cavities, Each replica nozzle hole may or may not be connected to (e.g., being in fluid communication with) at least one replica planar control cavity.

(b) molding a first material into a nozzle forming microstructured pattern using the microstructured mold pattern, with the nozzle forming microstructured pattern comprising a plurality of nozzle hole forming features and planar control cavity forming features. Each nozzle hole forming feature may or may not be connected to (e.g., being in fluid communication with) at least one planar control cavity forming feature. The nozzle hole forming features are substantially negative replicas (i.e., negative replicas of all, most, or at least a substantial portion) of the replica nozzle holes, and the planar control cavity forming features are substantially negative replicas (i.e., negative replicas of all, most, or at least a substantial portion) of the replica planar control cavities.

(c) sintering, metal injection molding (MIM), electrodepositing, or otherwise depositing or forming a second material into a nozzle pre-form using the nozzle forming microstructured pattern, with the nozzle pre-form comprising a plurality of nozzle pre-form holes and sacrificial planar control cavities. Each nozzle pre-form hole comprises an inlet opening and may or may not be connected to (e.g., being in fluid communication with) at least one sacrificial planar control cavity. The nozzle pre-form holes are substantially negative replicas (i.e., negative replicas of all, most, or at least a substantial portion) of the nozzle hole forming features and the sacrificial planar control cavities are substantially negative replicas (i.e., negative replicas of all, most, or at least a substantial portion) of the planar control cavity forming features. That is, the nozzle pre-form holes are substantially positive replicas (i.e., positive replicas of all, most, or at least a substantial portion) of the replica nozzle holes and the sacrificial planar control cavities are substantially positive replicas (i.e., negative replicas of all, most, or at least a substantial portion) of the replica planar control cavities.

(d) forming at least one nozzle from the nozzle pre-form, the nozzle forming comprises removing enough of the second material to remove the sacrificial planar control cavities (e.g., by electric discharge machining, mechanical grinding, etc.) so as to form a top surface of the nozzle pre-form into a planar top surface (i.e., planarize the top surface) of the nozzle, and to form each of the nozzle pre-form holes into a finished nozzle through hole comprising a hole inlet and a hole outlet connected to (e.g., being in fluid communication with) the hole inlet by a hollow cavity defined by an interior surface. The nozzle can also have a planar bottom surface, and the planar top surface and planar bottom surface can be parallel to each other or at an acute angle to one another.

2. The method according to embodiment 1, wherein the second material comprises a plurality of different second materials, and the nozzle pre-form is formed by separately depositing each of the second materials as a layer onto all of, most of, or at least a substantial portion of the nozzle forming microstructured pattern so that the resulting nozzle pre-form, and therefore the nozzle, comprises a build-up of or otherwise comprises multiple (i.e., 2, 3, 4, 5 or more) layers, with each layer being a different second material.

3. The method according to embodiment 2, wherein the plurality of different second materials is at least three different second materials, and the first of the second materials deposited as a layer onto the nozzle forming microstructured pattern forms an electrically conductive layer.

4. The method according to embodiment 2 or 3, wherein none of the multiple layers is in the form of a thin electrically conductive seed layer.

5. The method according to any one of embodiments 2 to 4, wherein at least one of the multiple layers is a combustion catalyst (e.g., palladium, platinum, gold, ruthenium, rhodium, and iridium) that is the first layer deposited onto the nozzle forming microstructured pattern and is in a form that is sufficiently dissolvable into the fuel (e.g., gasoline, alcohol, diesel fuel, etc.) being combusted (i.e., burned) so as to be delivered with the fuel into the combustion chamber of the internal combustion engine, a corrosion inhibitor, a combustion byproduct deposit inhibitor, a ceramic, a metal alloy, or any other material in the form of a layer that facilitates the fuel flow rate (e.g., where the surface of the layer in contact with the fuel passing through the nozzle exhibits low friction at the interface between the fuel and the inner surface of the nozzle), air to fuel mixing, and/or a desired heat transfer between the fuel injector that comprises the nozzle and the outside of the nozzle exposed to the combustion chamber of an internal combustion engine.

The second materials deposited as layers onto the nozzle forming microstructured pattern can also be chosen so that the first deposited layer is made of a second material that is compatible with the fuel passing through the nozzle, the last layer is made of a second material that is suitable for being exposed to the environment inside of a combustion chamber of an internal combustion engine, and at least one other layer deposited between the first and last layers is made of a second material that may not be suitable as the first layer, last layer or either the first or last layer but has other desirable properties (e.g., is relatively inexpensive, has desirable thermal, vibrational and/or acoustic characteristics, etc.). When combustion catalyst is used as one of the layers, it is the first layer deposited and may also function as a seed layer. It may be desirable to deposit the combustion catalyst material so that the resulting layer is relatively porous (i.e., have a relatively low density) so as to significantly increase the interface surface area between the deposited combustion catalyst material and the fuel passing through the nozzle.

6. The method according to any one of embodiments 1 to 5, wherein the first material is different than the second material.

7. The method according to any one of embodiments 1 to 6, wherein each replica nozzle hole of the microstructured mold pattern has an interior surface that comprises at least one or more fluid flow affecting (e.g., disrupting) features. The fluid flow affecting features of each replica nozzle hole are configured (i.e., size, shape and design) so as to be transferable as a negative replica to the exterior surface of a corresponding nozzle hole forming feature, of the nozzle forming microstructured pattern, and then as a positive replica to the interior surface of a corresponding nozzle pre-form hole of the nozzle pre-form (i.e., the interior surface of the corresponding through hole of the finished nozzle).

The fluid flow affecting features are structural features on the interior surface of the replica nozzle holes that, when transferred to the interior surface of the nozzle through holes, are intended to induce or otherwise cause for example: cavitations, turbulence, or otherwise obstruct or disrupt the flow of a fluid (e.g., a liquid fuel) through the nozzle so as to positively affect the stream, spray, ligament, plume of droplets or individual droplets formed by the fluid exiting the nozzle. These fluid flow affecting features can be, for example, in the form of bumps, continuous annular ridges, spaced apart discontinuous ridges (e.g., formed concentrically around the interior surface of the nozzle through hole or along the longitudinal axis of the nozzle through hole), riblets (e.g., perpendicular or parallel to the flow of fluid through the nozzle through hole), as well as other shaped structural obstructions that are compatible with the inventive method. It is believed that such fluid flow affecting features can help to cause atomization of the fluid (e.g., liquid fuel) exiting the nozzle. The degree of a liquid fuel's atomization and its plume configuration inside of a combustion chamber is believed to affect both the fuel consumption and the exhaust emissions of an internal combustion engine.

8. The method according to any one of embodiments 1 to 7, wherein the microstructured mold pattern comprises at least one or more fluid (i.e., a gas or liquid) channel or undercut features connecting at least one replica nozzle hole to (a) at least one other replica nozzle hole, (b) a portion of the mold beyond the outer periphery of the microstructured mold pattern, or (c) both (a) and (b). The fluid channel features of the microstructured mold pattern are configured (i.e., size, shape and design) so as to be transferable as a corresponding negative replica or ridge feature to the top surface of the nozzle forming microstructured pattern, and then as a positive replica or channel feature to the interior surface of the nozzle pre-form (i.e., the finished nozzle). These channel features can be designed for use, for example, as additional ports (a) for introducing additional fluid (e.g., gas or liquid fuels, air, oil, fuel additives, catalysts, etc.) into the fuel stream of a desired number of nozzle through holes from an alternative source separate from the main injector fuel source, (b) for connecting two or more nozzle through holes in fluid communication, for example, to adjust fluid flow rates and/or pressures in the connected nozzle through holes relative to unconnected nozzle through holes, (c) for use with converging and/or diverging nozzles, (d) to produce impinging fuel streams to effect better atomization of the fuel, (e) so as to lower fuel rail pressures, (f) to draw air in from the combustion chamber (i.e., engine cylinder) for circulation into and directing at the fuel stream flowing in the nozzle through hole to better atomize the fuel, or (g) any combination of (a) to (f), and for any other reason desired.

9. The method according to any one of embodiments 1 to 8, wherein each of at least three replica nozzle holes of the microstructured mold pattern is connected to (e.g., is in fluid communication with) at least one replica planar control cavity. It may be desirable for all of the replica nozzle holes to be so connected to a replica planar control cavity.

10. The method according to embodiment 9, wherein the microstructured mold pattern defines an array or pattern of replica nozzle holes, the array having a periphery, and the at least three replica nozzle holes and connected replica planar control cavities are spaced apart on the periphery of the array.

11. The method according to embodiment 9 or 10, wherein each replica nozzle hole and its connected replica planar control cavity is configured (i.e., size, shape and design) such that, upon removal of the corresponding sacrificial planar control cavity to form the planar top surface of the nozzle, the nozzle through holes are configured to form at least one fluid flow- or output (e.g., a fuel stream or plume) shape-control feature.

Such features can be used for controlling the shape of a fluid exiting the nozzle through-holes. For example, such features can be used to control (e.g., break-up) the fuel stream flowing out of the nozzle through holes in an effort to form a fuel plume having fuel droplets of a desired size, shape and distribution. Such fluid output shape-control features can include (a) a nozzle through hole outlet opening having a star-shape, cross-shape or X-shape, for example like that shown in FIGS. 31-37, (b) a nozzle through hole interior surface that is rifled to impart a rotation to the fluid flowing through the nozzle through-hole in a direction around the longitudinal axis of the corresponding through-hole, before exiting through the corresponding outlet opening of the nozzle through hole, for example like that shown in FIG. 14 and indicated by FIG. 9A, (c) at least one or a plurality of nozzle through holes each having at least one, two or more curved interior surfaces (e.g., quarter-round shaped interior surfaces) and at least one, two or more slot-shaped outlet openings, where the curved interior surface(s) of each such nozzle through-hole is configured to cause the fluid to exit through the outlet opening(s) at an angle (e.g., an acute angle) from the longitudinal axis of the nozzle through-hole, for example like that shown in FIGS. 31-36 and 38, or (d) any combination of (a) to (c).

In addition to the related teachings found elsewhere herein, it has also been found that by controlling the direction of the fluid as it leaves the nozzle through-holes (e.g., by adjusting the relative orientation of the curved or quarter-round interior surface of the nozzle through-holes), the resulting fluid output (e.g., a stream and/or plume of fluid droplets) can be directed as desired. It can be desirable to control the direction of a fuel fluid output, for example, to direct the fuel stream and/or plume into one or more desired locations inside a combustion chamber of an internal combustion engine, furnace, etc., or to avoid impingement of the fuel, e.g., on the engine piston, valve and/or combustion chamber wall of an internal combustion engine. Such an impingement by the fuel can cause any combination of: (a) cooling of the fuel, valve, piston, and/or combustion chamber during the combustion process, (b) removal of oil or other lubricant from the valve and/or piston (which can cause detrimental wear), (c) detrimental "windage loss", and/or (d) the fuel being misdirected away from the vicinity of the sparkplug in the combustion chamber. Such a feature can also have the ability to generate a non-symmetrical fuel stream and/or plume, which may have some benefits in controlling the size, distribution, location or other aspects of the fuel stream and/or plume within the combustion chamber.

12. The method according to any one of embodiments 1 to 11, wherein at least three of the replica planar control cavities are not connected to (e.g., are not in fluid communication with) a replica nozzle holes of the microstructured mold pattern. It may be desirable for none of the replica planar control cavities to be so connected to any of the replica nozzle holes.

13. The method according to any one of embodiments 1 to 12, wherein the nozzle has a peripheral edge, and the nozzle forming microstructured pattern comprises a nozzle separation feature that forms or at least defines the peripheral edge of the nozzle. The nozzle separation feature can be in the form of a separation ring for each nozzle.

14. The method according to embodiment 13, wherein at least three, and preferably 4, replica planar control cavities are formed on the nozzle separation feature. The replica planar control cavities can be, but do not have to be, the only such features forming part of the microstructured mold pattern.

15. The method according to according to any one of embodiments 1 to 14, wherein the providing a microstructured mold pattern comprises:

(a) forming a third material into a mold forming microstructured pattern comprising a plurality of replica nozzle hole forming features and replica planar control cavity forming features. Each replica nozzle hole forming feature may or may not be connected to (e.g., being in fluid communication with) at least one replica planar control cavity forming feature.

(b) sintering, metal injection molding (MIM), electrodepositing, or otherwise depositing or forming a fourth material into the microstructured mold pattern using the mold forming microstructured pattern, with the replica nozzle hole forming features being substantially negative replicas (i.e., a negative replica of all, most, or at least a substantial portion) of the replica nozzle holes, and the replica planar control cavity forming features being substantially negative replicas (i.e., a negative replica of all, most, or at least a substantial portion) of the replica planar control cavities.

Each of the above described fluid flow affecting feature, fluid channel or undercut feature, and fuel plume shape-control feature can each be initially formed as a corresponding feature in any mold forming microstructured pattern being used to make the nozzle, or if no mold forming microstructured pattern is being used (i.e., the microstructured mold pattern is formed without such a step), then such features can be initially formed in the microstructured mold pattern.

16. The method according to embodiment 15, wherein the fourth material comprises a plurality of different fourth materials, and the microstructured mold pattern is formed by separately depositing each of the fourth materials as a layer onto all of, most of, or at least a substantial portion of the mold forming microstructured pattern so that the resulting microstructured mold pattern comprises a build-up of or otherwise comprises multiple layers, with each layer being a different fourth material.

17. The method according to embodiment 15 or 16, wherein the first material is different than the fourth material, the second material is different than the third and first materials, and the third material is different than the fourth material.

18. The method according to embodiment 17, wherein the first material is the same as or different than the third material, and the second material is the same as or different than the fourth material.

19. The method according to any one of embodiments 15 to 18, wherein the third material is capable of undergoing a multiphoton curing reaction by simultaneously absorbing multiple photons, and the mold forming microstructured pattern is formed in the third material using a multiphoton process that causes a multiphoton curing reaction in the third material by simultaneously absorbing multiple photons at desired/specified locations within the third material that cause the mold forming microstructured pattern to be constructed.

20. A method of making a nozzle, the method comprising:

(a) providing a first material such as, for example, one that is capable of undergoing multiphoton reaction by simultaneously absorbing multiple photons;

(a) forming a first material into a first microstructured pattern using (1) a multiphoton process that causes a multiphoton reaction in the first material by simultaneously absorbing multiple photons at desired/specified locations within the first material and/or (2) a sintering process, with the first microstructured pattern comprising a plurality of replica nozzle hole forming features for forming nozzle through holes and replica planar control cavity forming features. Each replica nozzle hole forming feature may or may not be connected to (e.g., being in fluid communication with) at least one replica planar control cavity forming feature.

(b) sintering, metal injection molding (MIM), electrodepositing, or otherwise depositing or forming a second material into a second microstructured pattern using the first microstructured pattern, with the second microstructured pattern defining at least a portion of a mold cavity and comprising a substantially negative replica (i.e., a negative replica of all, most, or at least a substantial portion) of the first microstructured pattern; That is, the second microstructured pattern comprises a plurality of replica nozzle holes and replica planar control cavities. Each replica nozzle hole may or may not be connected to (e.g., being in fluid communication with) at least one replica planar control cavity.

(c) molding a third material into a third microstructured pattern using the second microstructured pattern of the mold, with the third microstructured pattern comprising a plurality of nozzle hole forming features and planar control cavity forming features. Each nozzle hole forming feature may or may not be connected to (e.g., being in fluid communication with) at least one planar control cavity forming feature. The third microstructured pattern comprises a substantially negative replica (i.e., a negative replica of all, most, or at least a substantial portion) of the second microstructured pattern. In other words, the third microstructured pattern comprises a substantially positive replica (i.e., a positive replica of all, most, or at least a substantial portion) of the first microstructured pattern, including the plurality of replica nozzle hole forming features and replica planar control cavity forming features;

(d) sintering, metal injection molding (MIM), electrodepositing, or otherwise depositing or forming a fourth material into a fourth microstructured pattern using the third microstructured pattern, with the fourth microstructured pattern comprising a plurality of nozzle pre-form holes and sacrificial planar control cavities, and each nozzle pre-form hole comprising an inlet opening and may or may not be connected to (e.g., being in fluid communication with) at least one sacrificial planar control cavity. The fourth microstructured pattern comprises a substantially negative replica (i.e., a negative replica of all, most, or at least a substantial portion) of the third microstructured pattern, including the plurality of nozzle hole forming features and planar control cavity forming features. That is, the fourth microstructured pattern comprises a substantially positive replica (i.e., a positive replica of all, most, or at least a substantial portion) of the second microstructured pattern; and (e) forming a nozzle from the fourth microstructured pattern, the forming the nozzle comprising removing (e.g., by electric discharge machining, mechanical grinding, etc.) enough of the fourth material to remove the sacrificial planar control cavities so as to form a top surface of the fourth microstructured pattern into a planar top surface (i.e., planarize the top surface) of the nozzle, and form each of the nozzle pre-form holes into a finished nozzle through hole comprising an inlet opening and at least one outlet opening connected to (e.g., being in fluid communication with) the inlet opening by a hollow cavity defined by an interior surface. The nozzle can also have a planar bottom surface, and the planar top surface and planar bottom surface can be parallel to each other or at an acute angle to one another.

21. The method according to embodiment 20, wherein the second material is different than the first material, the third material is different than the second material, and the fourth material is different than the first and third materials 22. The method according to embodiment 21, wherein the third material is the same as or different than the first material, and the fourth material is the same as or different than the second material.

23. A method of making a nozzle, the method comprising:
 (a) providing a microstructured mold pattern defining at least a portion of a mold cavity and comprising a plurality of replica nozzle holes;
 (b) molding a first material into a nozzle forming microstructured pattern using the microstructured mold pattern, with the nozzle forming microstructured pattern comprising a plurality of nozzle hole forming features;
 (c) sintering, metal injection molding (MIM), electro-depositing, or otherwise depositing or forming a second material into a nozzle pre-form using the nozzle forming microstructured pattern, with the nozzle pre-form comprising a plurality of nozzle pre-form holes, the second material comprising a plurality of different second materials, and the nozzle pre-form is formed by separately depositing each of the second materials as a separate layer or other portion onto all of, most of, or at least a substantial portion of the nozzle forming microstructured pattern so that the resulting nozzle pre-form, and therefore the nozzle, comprises a build-up of or otherwise comprises multiple layers or portions, with each layer or portion being a different second material; and
 (d) forming a nozzle from the nozzle pre-form, the forming the nozzle comprising removing (e.g., by electric discharge machining, mechanical grinding, etc.) enough of the second material to open an outlet opening in each of the nozzle pre-form holes and thereby form each of the nozzle pre-form holes into a finished nozzle through hole comprising an inlet opening and at least one outlet opening connected to (e.g., being in fluid communication with) the inlet opening by a hollow cavity defined by an interior surface.

24. The method according to embodiment 23, wherein the plurality of different second materials is at least three different second materials, and the first of the second materials deposited as a layer onto the nozzle forming microstructured pattern forms an electrically conductive layer.

25. The method according to embodiment 23 or 24, wherein none of the multiple layers is in the form of a thin electrically conductive seed layer.

26. The method according to any one of embodiments 23 to 25, wherein at least one of the multiple layers is a corrosion inhibitor, combustion byproduct deposit inhibitor, ceramic, or metal alloy.

27. The method according to according to any one of embodiments 23 to 26, wherein the providing a microstructured mold pattern comprises:
 (a) forming a third material into a mold forming microstructured pattern comprising a plurality of replica nozzle hole forming features;
 (b) sintering, metal injection molding (MIM), electro-depositing, or otherwise depositing or forming a fourth material into the microstructured mold pattern using the mold forming microstructured pattern, with the replica nozzle hole forming features being substantially negative replicas (i.e., a negative replica of all, most, or at least a substantial portion) of the replica nozzle holes.

28. The method according to embodiment 27, wherein the fourth material comprises a plurality of different fourth materials, and the microstructured mold pattern is formed by separately depositing each of the fourth materials as a layer onto all of, most of, or at least a substantial portion of the mold forming microstructured pattern so that the resulting microstructured mold pattern comprises a build-up of or otherwise comprises multiple layers, with each layer being a different fourth material.

29. The method according to embodiment 27 or 28, wherein the first material is different than the fourth material, the second material is different than the third and first materials, and the third material is different than the fourth material.

30. The method according to embodiment 29, wherein the first material is the same as or different than the third material, and the second material is the same as or different than the fourth material.

31. A method of making a nozzle, the method comprising:
 (a) providing a first material such as, for example, one that is capable of undergoing multiphoton reaction by simultaneously absorbing multiple photons;
 (a) forming a first material into a first microstructured pattern using (1) a multiphoton process that causes a multiphoton reaction in the first material by simultaneously absorbing multiple photons at desired/specified locations within the first material and/or (2) a sintering process, with the first microstructured pattern comprising a plurality of replica nozzle hole forming features for forming nozzle through holes;
 (b) sintering, metal injection molding (MIM), electro-depositing, or otherwise depositing or forming a second material into a second microstructured pattern using the first microstructured pattern, with the second microstructured pattern defining at least a portion of a mold cavity and comprising a substantially negative replica (i.e., a negative replica of all, most, or at least a substantial portion) of the first microstructured pattern; That is, the second microstructured pattern comprises a plurality of replica nozzle holes.
 (c) molding a third material into a third microstructured pattern using the second microstructured pattern of the mold, with the third microstructured pattern comprising a plurality of nozzle hole forming features. The third microstructured pattern comprises a substantially negative replica (i.e., a negative replica of all, most, or at least a substantial portion) of the second microstructured pattern. In other words, the third microstructured pattern comprises a substantially positive replica (i.e., a positive replica of all, most, or at least a substantial portion) of the first microstructured pattern, including the plurality of replica nozzle hole forming features;

(d) sintering, metal injection molding (MIM), electrodepositing, or otherwise depositing or forming a fourth material into a fourth microstructured pattern using the third microstructured pattern, with the fourth microstructured pattern comprising a plurality of nozzle pre-form holes, the fourth material comprising a plurality of different fourth materials, and the fourth microstructured pattern is formed by separately depositing each of the fourth materials as a layer onto all of, most of, or at least a substantial portion of the fourth microstructured pattern so that the resulting nozzle pre-form, and therefore the nozzle, comprises a build-up of or otherwise comprises multiple layers, with each layer being a different fourth material; and (e) forming a nozzle from the fourth microstructured pattern, the forming the nozzle comprising removing (e.g., by electric discharge machining, mechanical grinding, etc.) enough of the fourth material to open an outlet opening in each of the nozzle pre-form holes and thereby form each of the nozzle pre-form holes into a finished nozzle through hole comprising an inlet opening and at least one outlet opening connected to (e.g., being in fluid communication with) the inlet opening by a hollow cavity defined by an interior surface.

32. The method of embodiment 20 or 31, wherein the first material comprises poly(methyl methacrylate).

33. The method of embodiment 20 or 31, wherein the first material is capable of undergoing a two photon reaction.

34. The method of embodiment 20 or 31, wherein the first microstructured pattern comprises a plurality of discrete microstructures.

35. The method of embodiment 34, wherein the plurality of discrete microstructures comprises a discrete microstructure that is a three-dimensional rectilinear body.

36. The method of embodiment 34, wherein the plurality of discrete microstructures comprises a discrete microstructure that is a portion of a three-dimensional rectilinear body.

37. The method of embodiment 34, wherein the plurality of discrete microstructures comprises a discrete microstructure that is a three-dimensional curvilinear body.

38. The method of embodiment 34, wherein the plurality of discrete microstructures comprises a discrete microstructure that is a portion of a three-dimensional curvilinear body.

39. The method of embodiment 34, wherein the plurality of discrete microstructures comprises a portion of a polyhedron.

40. The method of embodiment 34, wherein the plurality of discrete microstructures comprises a portion of a cone.

41. The method of embodiment 34, wherein the plurality of discrete microstructures comprises a discrete tapered microstructure.

42. The method of embodiment 34, wherein the plurality of discrete microstructures comprises a discrete spiraling microstructure.

43. The method of embodiment 20 or 31, wherein the first microstructured pattern is formed in the first material using a two photon process.

44. The method of embodiment 20 or 31, wherein the step of forming the first microstructured pattern in the first material comprises exposing at least a portion of the first material to cause a simultaneous absorption of multiple photons.

45. The method of embodiment 44, wherein the step of forming the first microstructured pattern in the first material comprises removing the exposed portions of the first material.

46. The method of embodiment 44, wherein the step of forming the first microstructured pattern in the first material comprises removing the unexposed portions of the first material.

47. The method of embodiment 20 or 31, wherein replicating the first microstructured pattern in the second material comprises electroplating the first microstructured pattern.

48. The method of embodiment 20 or 31, wherein the second material comprises an electroplating material.

49. The method of embodiment 20 or 31, wherein the mold comprises a metal.

50. The method of embodiment 20 or 31, wherein the mold comprises Ni.

51. The method of embodiment 20 or 31, wherein the second microstructured pattern is at least substantially a negative replica of the first microstructured pattern.

52. The method of embodiment 20 or 31, wherein the third microstructured pattern is at least substantially a negative replica of the second microstructured pattern and at least substantially a positive replica of the first microstructured pattern.

53. The method of embodiment 20 or 31, wherein the step of molding a third material into a third microstructured pattern using the second microstructured pattern of the mold comprises injection molding.

54. The method of embodiment 20 or 31, wherein the third material comprises a polymer.

55. The method of embodiment 20 or 31, wherein the third material comprises polycarbonate.

56. The method of embodiment 20 or 31, wherein the second mold comprises a polymer.

57. The method of embodiment 20 or 31, wherein the third microstructured pattern is at least substantially a negative replica of the second microstructured pattern.

58. The method of embodiment 20 or 31, wherein the step of forming a fourth material into a fourth microstructured pattern using the third microstructured pattern comprises electroplating the third microstructured pattern with the fourth material.

59. The method of embodiment 20 or 31, wherein the step of forming a fourth material into a fourth microstructured pattern using the third microstructured pattern comprises coating the third microstructured pattern with the fourth material.

60. The method of embodiment 20 or 31, wherein the step of removing enough of the fourth material is performed by a mechanical grinding method or by electric discharge machining.

61. The method of embodiment 20 or 31, wherein the fourth material comprises an electroplating material.

62. The method of embodiment 20 or 31, wherein the nozzle comprises a metal, a ceramic or a combination of a metal and a ceramic.

63. The method of embodiment 20 or 31, wherein the nozzle comprises a ceramic selected from the group comprising silica, zirconia, alumina, titania, or oxides of yttrium, strontium, barium, hafnium, niobium, tantalum, tungsten, bismuth, molybdenum, tin, zinc, lanthanide elements having atomic numbers ranging from 57 to 71, cerium and combinations thereof.

Microstructured Pattern Embodiments

64. A microstructured pattern for forming a nozzle pre-form comprising a plurality of nozzle pre-form holes, sacrificial planar control cavities and an outer planar periphery, the microstructured pattern comprising:

a plurality of nozzle hole forming features that are substantially negative replicas of the nozzle pre-form holes, and a plurality of planar control cavity forming features that are substantially negative replicas of the sacrificial planar control cavities.

65. The microstructured pattern according to embodiment 64, wherein each nozzle hole forming feature may or may not be connected to at least one planar control cavity forming feature.

66. The microstructured pattern according to embodiment 64 or 65, further comprising an annular peripheral wall for defining the outer planar periphery of the nozzle pre-form.

67. The microstructured pattern according to embodiment 66, wherein the peripheral wall is connected to at least one planar control feature.

Nozzle Pre-Form Embodiments

68. A nozzle pre-form for forming a nozzle comprising a plurality of nozzle through-holes, each nozzle through-hole comprising an inlet opening and at least one outlet opening connected to (e.g., being in fluid communication with) the inlet opening by a hollow cavity defined by an interior surface, the nozzle pre-form comprising:

a plurality of nozzle pre-form holes corresponding to the nozzle through-holes; and a plurality of sacrificial planar control cavities, wherein each of the nozzle pre-form holes may or may not be connected to at least one of the sacrificial planar control cavities.

69. The nozzle pre-form according to embodiment 68, wherein each nozzle pre-form hole is in fluid communication with at least one sacrificial planar control cavity.

70. The nozzle pre-form according to embodiment 68 or 69, wherein the nozzle pre-form and therefore the nozzle comprises a build-up of multiple layers, with each layer being a different material.

71. The nozzle pre-form according to embodiment 70, wherein the multiple layers are deposited layers of different materials in the form of a monolithic structure.

72. The nozzle pre-form according to embodiment 70 or 71, wherein the multiple layers are at least three layers, with a first layer of the multiple layers being an electrically conductive layer.

73. The nozzle pre-form according to any one of embodiments 70 to 72, wherein none of the multiple layers is in the form of a thin electrically conductive seed layer.

74. The nozzle pre-form according to any one of embodiments 70 to 73, wherein the material forming at least one of the multiple layers is a corrosion inhibitor, combustion byproduct deposit inhibitor, ceramic, or metal alloy.

Nozzle Embodiments

75. A nozzle comprising a microstructured pattern comprising a plurality of nozzle through-holes, each nozzle through-hole comprising an inlet opening and at least one outlet opening connected to (e.g., being in fluid communication with) the inlet opening by a hollow cavity defined by an interior surface, wherein the microstructured pattern has an outer periphery, and the nozzle comprises a build-up of multiple layers, with each layer being a different material, and with either (a) none of the multiple layers being in the form of a thin electrically conductive seed layer, (b) the multiple layers being at least three layers, or (c) both (a) and (b).

76. The nozzle according to embodiment 75, wherein the multiple layers are deposited layers of different materials in the form of a monolithic structure.

77. The nozzle pre-form according to embodiment 75 or 76, wherein the multiple layers are at least three layers, with a first layer of the multiple layers being an electrically conductive layer.

78. The nozzle according to any one of embodiments 75 to 77, wherein the material forming at least one of the multiple layers is a corrosion inhibitor, combustion byproduct deposit inhibitor, ceramic, or metal alloy.

79. The nozzle according to any one of embodiments 75 to 78 further comprising a planar bottom surface and a planar top surface, wherein the planar bottom surface and planar top surface are either parallel to each other or at an acute angle to one another.

80. The nozzle according to any one of embodiments 75 to 79, wherein each of the multiple layers is an electro deposited layer of metallic material, inorganic non-metallic material, or a combination thereof.

81. The nozzle according to any one of embodiments 75 to 79, wherein each of the multiple layers is a layer of sintered metallic, inorganic non-metallic material, or a combination thereof.

82. The nozzle according to any one of embodiments 75 to 81, wherein none of the multiple layers is in the form of a thin electrically conductive seed layer.

83. The nozzle pre-form according to any one of embodiments 75 to 82, wherein the multiple layers are at least three layers.

84. The nozzle according to any one of embodiments 75 to 83, further comprising at least one or more fluid (i.e., a gas or liquid) channel or undercut features connecting at least one nozzle through-hole to (a) at least one other nozzle through-hole, (b) a portion of the outer periphery of the microstructured pattern, or (c) both (a) and (b).

85. The nozzle according to any one of embodiments 75 to 84, further comprising at least one fluid plume shape-control feature for controlling the shape of a plume formed by a fluid flowing through and exiting the outlet openings of the nozzle through-holes.

86. The nozzle according to embodiment 85, wherein the fluid plume shape-control feature is operatively adapted to break-up a fluid stream flowing out of the nozzle through-holes to control the size and distribution of fluid droplets forming the plume.

87. The nozzle according to embodiment 86, wherein the fuel plume shape-control feature comprises (a) at least one of the outlet openings having a cross shape or X-shape, (b) the interior surface of at least one of the nozzle through holes being rifled so as to impart a rotation to a fluid flowing through the nozzle through-hole in a direction around the longitudinal axis of the nozzle through-hole, before exiting through the corresponding outlet opening of the nozzle through hole, (c) at least one or a plurality of nozzle through hole having at least one, two or more curved interior surfaces (e.g., quarter-round shaped interior surfaces) and at least one, two or more slot-shaped outlet openings, where the curved interior surface(s) of the nozzle through-hole is configured to cause the fluid to exit through the outlet opening(s) at an angle (e.g., an acute angle) from the longitudinal axis of the nozzle through-hole, or (d) any combination of (a) to (c).

88. The nozzle according to any one of embodiments 75 to 87, further comprising at least one nozzle through-hole having an interior surface that comprises at least one or more fluid flow affecting features for inducing or otherwise causing cavitations, turbulence, or otherwise obstructing the flow of a fluid (e.g., a liquid fuel) through the nozzle so as to positively affect a plume of droplets formed by the fluid passing through the nozzle through-hole and exiting the corresponding outlet opening of the nozzle through-hole.

89. The nozzle according to embodiment 88, wherein the fluid flow affecting feature comprises at least one or any combination of bumps, continuous annular ridges, spaced apart discontinuous ridges, and riblets.

90. A nozzle comprising:
a microstructured pattern comprising a plurality of nozzle through-holes, with each nozzle through-hole comprising an inlet opening and at least one outlet opening connected to (e.g., being in fluid communication with) the inlet opening by a hollow cavity defined by an interior surface, and the microstructured pattern having an outer periphery; and
at least one or more fluid (i.e., a gas or liquid) channel or undercut features connecting at least one nozzle through-hole to (a) at least one other nozzle through-hole, (b) a portion of the outer periphery of the microstructured pattern, or (c) both (a) and (b).

91. A nozzle comprising:
a microstructured pattern comprising a plurality of nozzle through-holes, with each nozzle through-hole comprising an inlet opening and at least one outlet opening connected to (e.g., being in fluid communication with) the inlet opening by a hollow cavity defined by an interior surface, and the microstructured pattern having an outer periphery; and
at least one fluid plume shape-control feature for controlling the shape of a plume formed by a fluid flowing through and exiting the outlet openings of the nozzle through-holes.

92. The nozzle according to embodiment 91, wherein the fluid plume shape-control feature is operatively adapted to break-up a fluid stream flowing out of the nozzle through-holes to control the size and distribution of fluid droplets forming the plume.

93. The nozzle according to embodiment 92, wherein the fuel plume shape-control feature comprises (a) at least one of the outlet openings having a cross shape or X-shape, (b) the interior surface of at least one of the nozzle through holes being rifled so as to impart a rotation to a fluid flowing through the nozzle through-hole in a direction around the longitudinal axis of the nozzle through-hole, before exiting through the corresponding outlet opening of the nozzle through hole, (c) at least one or a plurality of nozzle through hole having at least one, two or more curved interior surfaces (e.g., quarter-round shaped interior surfaces) and at least one, two or more slot-shaped outlet openings, where the curved interior surface(s) of the nozzle through-hole is configured to cause the fluid to exit through the outlet opening(s) at an angle (e.g., an acute angle) from the longitudinal axis of the nozzle through-hole, or (d) any combination of (a) to (c).

94. A nozzle comprising:
a microstructured pattern comprising a plurality of nozzle through-holes, with each nozzle through-hole comprising an inlet opening and at least one outlet opening connected to (e.g., being in fluid communication with) the inlet opening by a hollow cavity defined by an interior surface, and the microstructured pattern having an outer periphery; and
at least one nozzle through-hole having an interior surface that comprises at least one or more fluid flow affecting features for inducing or otherwise causing cavitations, turbulence, or otherwise obstructing the flow of a fluid (e.g., a liquid fuel) through the nozzle so as to positively affect a plume of droplets formed by the fluid passing through the nozzle through-hole and exiting the corresponding outlet opening of the nozzle through-hole.

95. The nozzle according to embodiment 94, wherein the fluid flow affecting feature comprises at least one or any combination of bumps, continuous annular ridges, spaced apart discontinuous ridges, and riblets.

96. The nozzle according to any one of embodiments 75 to 95, wherein the inlet opening and the outlet opening of each the nozzle through-hole have different shapes.

97. The nozzle according to any one of embodiments 75 to 95, wherein the inlet opening and the outlet opening of each the nozzle through-hole have different shapes, the shapes being selected from the group of shapes consisting of an elliptical shape, a circular shape, a racetrack shape.

98. The nozzle according to any one of embodiments 75 to 95, wherein only one of the inlet opening and the outlet opening of at least one nozzle through-hole has a shape with a perimeter comprising outer arcs of closely packed circles, with the outer arcs being connected by curve-like fillets.

99. The nozzle according to any one of embodiments 75 to 98, wherein each inlet opening has a diameter of less than 300 microns, 200 microns, or less than or equal to 160 microns.

100. The nozzle according to any one of embodiments 75 to 99, wherein each outlet opening has a diameter of less than 300 microns, less than 100 microns, or less than or equal to 40 microns.

101. The nozzle according to any one of embodiments 75 to 100, wherein the nozzle is a fuel injector nozzle.

102. The nozzle according to any one of embodiments 75 to 101, wherein the nozzle comprises a metallic material, an inorganic non-metallic material (e.g., a ceramic), or a combination thereof.

103. The nozzle according to embodiment 102, wherein the nozzle comprises a ceramic selected from the group comprising silica, zirconia, alumina, titania, or oxides of yttrium, strontium, barium, hafnium, niobium, tantalum, tungsten, bismuth, molybdenum, tin, zinc, lanthanide elements having atomic numbers ranging from 57 to 71, cerium and combinations thereof.

104. The nozzle according to any one of embodiments 75 to 103, wherein the interior surface of at least one the nozzle through-hole has a cross-section that rotates from its inlet opening to its outlet opening.

105. The nozzle according to embodiment 104, wherein the cross-section has at least one of an increasing rotation rate, a decreasing rotation rate, a constant rotation rate, or a combination thereof.

106. The nozzle according to any one of embodiments 75 to 105, wherein the at least one nozzle through-hole is a plurality of the nozzle through-hole arranged in an array of concentric circles comprising an outermost circle, wherein the nozzle through-holes are arranged such that no diameter of the outermost circle comprises at least one nozzle through-hole from each circle in the array of concentric circles.

107. The nozzle according to embodiment 106, wherein each circle in the array of concentric circles comprises equally spaced nozzle through-holes.

Plated layer thicknesses;
Seed layer thickness preferred embodiment ≤50 μm or ≤100 μm with a maximum thickness of ≤200 μm.

Thickness range of (some) electroplating of protective materials:
Hard-chrome 0.0003" (8 μm) to 0.002" (50 μm).
Electroless Nickel 0.0001" (2.5 μm) to 0.005" (127 μm).
Zinc 0.0002" (5 μm) to 0.0006" (15 μm)
PTFE/Nickel/Phosphorus
Sputtering and Ion plating could be other coating methods. It can be desirable for the thickness of a fuel injector nozzle to be at least about 100 um, preferably greater than about 200 um; and less than about 3 mm, preferably less than about 1 mm, more preferably less than about 500 um.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

The invention claimed is:

1. A microstructured pattern for forming a nozzle pre-form comprising a plurality of nozzle pre-form holes, sacrificial planar control cavities, with each nozzle pre-form hole having an outlet end and a sacrificial planar control cavity being disposed at the outlet end of each nozzle pre-form hole, said microstructured pattern comprising:
    a plurality of nozzle hole forming features that are substantially negative replicas of the nozzle pre-form holes, with each nozzle hole forming feature having an outlet end, and
    a plurality of planar control cavity forming features that are substantially negative replicas of the sacrificial planar control cavities, with a planar control cavity forming feature being disposed at the outlet end of each nozzle hole forming feature,
    wherein the nozzle pre-form is formable by electroplating said microstructured pattern, and the resulting nozzle pre-form is suitable for forming a fluid injection nozzle, after the sacrificial planar control cavity is at least substantially removed.

2. The microstructured pattern according to claim 1, wherein said nozzle pre-form is for forming a fluid injection nozzle, with each nozzle pre-form hole corresponding to a nozzle through-hole of the fluid injection nozzle, and each planar control cavity forming feature is sized and configured to form a corresponding sacrificial planar control cavity that can be removed such that the corresponding nozzle through-hole has an outlet that can be opened in a desired manner.

3. The microstructured pattern according to claim 2, wherein each planar control cavity forming feature is sized and configured to form a corresponding sacrificial planar control cavity that can be removed such that the corresponding nozzle through-hole outlet can be opened so as to control the uniformity and size of the nozzle through-hole outlets.

4. The microstructured pattern according to claim 1, wherein each planar control cavity forming feature is sized and configured to form a corresponding sacrificial planar control cavity that can be removed and is cone shaped.

5. The microstructured pattern according to claim 1, wherein the resulting nozzle pre-form is suitable for forming a fluid injection nozzle that is a monolithic structure.

6. A nozzle pre-form for forming a fluid injection nozzle, with said nozzle pre-form being formed by electroplating said microstructured pattern according to claim 1, the fuel injection nozzle comprising a plurality of nozzle through-holes, each nozzle through-hole comprising an inlet opening and at least one outlet opening connected to the inlet opening by a hollow cavity defined by an interior surface, and said nozzle pre-form comprising:
    a plurality of nozzle pre-form holes corresponding to the nozzle through-holes; and
    a plurality of sacrificial planar control cavities,
    wherein each of said nozzle pre-form holes is connected to at least one of said sacrificial planar control cavities, and the fuel injection nozzle is formed by at least substantially removing each of said sacrificial planar control cavities.

7. A fluid injection nozzle having a planarized top surface, and being formed using the nozzle pre-form according to claim 6, with said nozzle comprising a microstructured pattern comprising a plurality of nozzle through-holes, each nozzle through-hole comprising an inlet opening and at least one outlet opening obtained by planarizing the top surface and connected to the inlet opening by a hollow cavity defined by an interior surface, wherein the at least one outlet opening of each nozzle through-hole is formed by at least substantially removing each of said sacrificial planar control cavities, said microstructured pattern has an outer periphery, and said nozzle comprises a build-up of multiple layers, with each layer being a different material, and with either (a) none of said multiple layers being in the form of a thin electrically conductive seed layer, (b) said multiple layers being at least three layers, or (c) both (a) and (b).

8. The nozzle according to claim 7, further comprising at least one fluid channel feature connecting at least one nozzle through-hole to (a) at least one other nozzle through-hole, (b) a portion of the outer periphery of said microstructured pattern, or (c) both (a) and (b).

9. The nozzle according to claim 7, further comprising at least one fluid plume shape-control feature for controlling the shape of a plume formed by a fluid flowing through and exiting the outlet openings of said nozzle through-holes, wherein said fluid plume shape-control feature is operatively adapted to break-up a fluid stream flowing out of said nozzle through-holes to control the size and distribution of fluid droplets forming the plume.

10. A fluid injection nozzle having a planarized top surface, and being formed using the nozzle pre-form according to claim 6, with said nozzle comprising:
    a microstructured pattern comprising a plurality of nozzle through-holes, with each nozzle through-hole comprising an inlet opening and at least one outlet opening obtained by planarizing the top surface and connected to the inlet opening by a hollow cavity defined by an interior surface, and said microstructured pattern having an outer periphery; and
    at least one fluid plume shape-control feature for controlling the shape of a plume formed by a fluid flowing through and exiting the outlet openings of said nozzle through-holes,
    wherein the at least one outlet opening of each nozzle through-hole is formed by at least substantially removing each of said sacrificial planar control cavities.

11. The nozzle according to claim 10, wherein said fluid plume shape-control feature is operatively adapted to break-up a fluid stream flowing out of said nozzle through-holes to control the size and distribution of fluid droplets forming the plume.

12. A fluid injection nozzle having a planarized top surface, and being formed using the nozzle pre-form according to claim 6, with said nozzle comprising:

a microstructured pattern comprising a plurality of nozzle through-holes, with each nozzle through-hole comprising an inlet opening and at least one outlet opening obtained by planarizing the top surface and connected to the inlet opening by a hollow cavity defined by an interior surface, and said microstructured pattern having an outer periphery; and at least one fluid channel feature connecting at least one nozzle through-hole to (a) at least one other nozzle through-hole, (b) a portion of the outer periphery of said microstructured pattern, or (c) both (a) and (b), wherein the at least one outlet opening of each nozzle through-hole is formed by at least substantially removing each of said sacrificial planar control cavities.

13. A fluid injection nozzle having a planarized top surface, and being formed using the nozzle pre-form according to claim 6, with said nozzle comprising:

a microstructured pattern comprising a plurality of nozzle through-holes, with each nozzle through-hole comprising an inlet opening and at least one outlet opening obtained by planarizing the top surface and connected to the inlet opening by a hollow cavity defined by an interior surface, and said microstructured pattern having an outer periphery; and at least one nozzle through-hole having an interior surface that comprises at least one fluid flow affecting feature for causing cavitations, turbulence, or otherwise obstructing the flow of a fluid through said nozzle so as to positively affect a plume of droplets formed by the fluid passing through said nozzle through-hole and exiting the corresponding outlet opening of said nozzle through-hole, wherein the at least one outlet opening of each nozzle through-hole is formed by at least substantially removing each of said sacrificial planar control cavities.

* * * * *

UNITED STATES PATENT AND TRADEMARK OFFICE
CERTIFICATE OF CORRECTION

PATENT NO. : 10,054,094 B2
APPLICATION NO. : 13/982866
DATED : August 21, 2018
INVENTOR(S) : Barry Carpenter et al.

Page 1 of 2

It is certified that error appears in the above-identified patent and that said Letters Patent is hereby corrected as shown below:

In the Specification

Column 19
Line 64, delete "Nuffield" and insert -- Nutfield --, therefor.

Column 22
Line 36, delete "microns," and insert -- microns. --, therefor.

Column 24
Line 21, delete "4-vinyl-1-cylcohexene" and insert -- 4-vinyl-1-cyclohexene --, therefor.
Line 26, delete "cylcohexylmethyl-3,4-epoxy-6-methyl-cylcohexane" and insert
-- cyclohexylmethyl-3,4-epoxy-6-methyl-cyclohexane --, therefor.
Line 32, delete "clyclohexylmethyl)adipate;" and insert -- cyclohexylmethyl)adipate; --, therefor.
Line 37, delete "3,4-epoxycylclohexylethyltrimethoxysilane" and insert
-- 3,4-epoxycyclo hexylethyltrimethoxysilane --, therefor.
Line 57, delete "MODFIER" and insert -- MODIFIER --, therefor.

Column 27
Line 8-9, delete "[isobenzofuran-[(3H)," and insert -- [isobenzofuran-1(3H), --, therefor.
Line 10 (approx.), delete "50×10$^{-5\text{o}}$" and insert -- 50×10$^{-50}$ --, therefor.

Column 32
Line 13, after "n-" delete "C$_4$B-".

Column 34
Line 36, delete "(C$_6$F$_5$)F$_5$P-," and insert -- F$_6$P-, --, therefor.
Line 56, delete "tritolysulfonium" and insert -- tritolylsulfonium --, therefor.

Signed and Sealed this
Twentieth Day of November, 2018

Andrei Iancu
*Director of the United States Patent and Trademark Office*

Column 35
Line 8, delete "10-methylphenoxathiinium" and insert -- 10-methylphenoxathinium --, therefor.

Column 44
Line 41, delete "thereon;" and insert -- thereon. --, therefor.